(12) United States Patent
Yoshida et al.

(10) Patent No.: US 9,678,249 B2
(45) Date of Patent: Jun. 13, 2017

(54) POLARIZING PLATE PROTECTIVE FILM, POLARIZING PLATE AND DISPLAY DEVICE

(71) Applicant: FUJIFILM Corporation, Tokyo (JP)

(72) Inventors: Aiko Yoshida, Kanagawa (JP); Naoya Shimoju, Kanagawa (JP); Naoki Sano, Kanagawa (JP); Nobutaka Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/082,730

(22) Filed: Mar. 28, 2016

(65) Prior Publication Data

US 2016/0291211 A1 Oct. 6, 2016

(30) Foreign Application Priority Data

Mar. 30, 2015 (JP) ................................ 2015-070020

(51) Int. Cl.
*G02B 1/00* (2006.01)
*G02B 1/14* (2015.01)
*G02B 5/30* (2006.01)

(52) U.S. Cl.
CPC ............ *G02B 1/14* (2015.01); *G02B 5/3033* (2013.01)

(58) Field of Classification Search
CPC . G02B 1/10; G02B 1/14; G02B 5/305; G02B 5/3033; G02B 1/3025; G02B 5/30;
(Continued)

(56) References Cited

U.S. PATENT DOCUMENTS

2008/0113121 A1* 5/2008 Takada .................. C08J 5/18
428/1.31

FOREIGN PATENT DOCUMENTS

JP 2008-107499 A 5/2008

* cited by examiner

*Primary Examiner* — Euncha Cherry
(74) *Attorney, Agent, or Firm* — Edwards Neils LLC; Jean C. Edwards, esq.

(57) ABSTRACT

A polarizing plate protective film contains a compound represented by general formula (II-1) or (II-2). In general formulas (II-1) and (II-2), X represents a 6-membered cyclic acetal group; n represents an integer of 2 or more; and a plurality of Xs may be identical or different. In general formula (II-1), $Z^2$ represents a linking group having a valence of n; $R^1$ represents a substituent, when there are a plurality of $R^1$s, at least two of the plurality of $R^1$s may be taken together to form a ring, $R^1$s in different benzene rings may be taken together to form a single bond; m represents an integer of 0-4; and the plurality of $R^1$s may be identical or different. In general formula (II-2), $Z^3$ represents an alkylene group having a valence of n, provided that $Z^3$ does not have a ring structure.

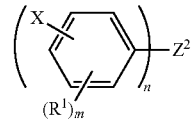

General formula (II-1)

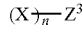

General formula (II-2)

20 Claims, 1 Drawing Sheet

(58) Field of Classification Search
CPC .... G02B 1/105; C08J 5/18; C08L 1/10; Y10T 428/1041; C09K 19/54; C08K 5/3435; C08K 5/15
USPC .............................. 359/507; 428/1.31, 411.1
See application file for complete search history.

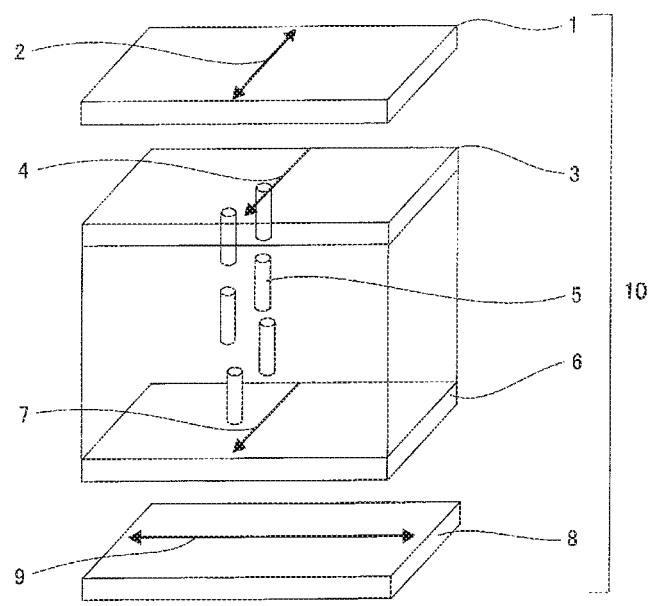

POLARIZING PLATE PROTECTIVE FILM, POLARIZING PLATE AND DISPLAY DEVICE

CROSS-REFERENCE TO RELATED APPLICATIONS

The present application claims priority under 35 U.S.C. §119 to Japanese Patent Application No. 2015-070020, filed on Mar. 30, 2015. The above application is hereby expressly incorporated by reference, in its entirety, into the present application.

BACKGROUND OF THE INVENTION

The present invention relates to a polarizing plate protective film, a polarizing plate, and a display device.

Liquid crystal display devices are getting more widely used year after year as image display devices consuming less electricity and requiring less space. As not only markets of television sets and the like requiring high-quality images but also markets of so-called mobile uses such as cellular phones and tablet personal computers are enlarged, needs for thickness reduction are further increasing.

Polarizing plates are formed on both sides of a liquid crystal cell, which is the basic configuration of a liquid crystal display device. A polarizing plate plays a role in passing only light on a plane of polarization in a given direction and the performance of a liquid crystal display device depends largely on the performance of the polarizing plate. A polarizing plate generally has a structure that includes a polarizer formed of a polyvinyl alcohol film in which iodine and a dye are adsorbed and aligned, and transparent protective films (polarizing plate protective films) applied to both front and back sides of the polarizer (e.g., JP 2008-107499 A).

SUMMARY OF THE INVENTION

Recently, the level required of liquid crystal display devices for their display performance is further raised and polarizing plates are also required to have improved characteristics. For example, when a polarizing plate is used for a long period of time in a high temperature environment or in a heat and humidity environment, the polarization degree may be changed due to deterioration of a polarizer in the polarizing plate, thus leading to deterioration of the display performance. Therefore, a polarizing plate which is less likely to cause a change in polarization degree even when used in a high temperature environment or in a heat and humidity environment has been required. In other words, a polarizing plate having excellent durability has been required.

Under these circumstances, the inventors of the present invention have prepared polarizing plates by reference to JP 2008-107499 A and as a result found that their durability is not necessarily enough in consideration of the required level that is expected to be further raised in the future.

Accordingly, in view of the situation as described above, an object of the present invention is to provide a protective film for a polarizing plate capable of imparting excellent durability to the polarizing plate. Another object of the present invention is to provide the polarizing plate including the protective film. Still another object of the present invention is to provide a display device including the protective film.

The inventors of the present invention have analyzed causes of polarizing plate deterioration at high temperature and high humidity and found that physical properties of a resin constituting a polarizer of a polarizing plate considerably change at high temperature and high humidity. One of the causes was presumed to be as follows: When the polarizer is placed under high temperature and high humidity, a linking between the resin and a crosslinking agent for use in crosslinking the resin is partially cut to reduce the degree of crosslinking in the resin, thus causing crystallization of the resin to proceed.

Based on the foregoing finding, the inventors of the present invention have made various studies on a polarizing plate protective film particularly from the viewpoint of suppressing changes in the physical properties of the resin due to the crystallization. As a result, it has been found that a specific compound is diffused and moved to the polarizer from the polarizing plate protective film at high temperature and high humidity to allow the crystallization of the resin to be suppressed to considerably improve the durability of the polarizing plate while preventing the polarization performance from being deteriorated.

Specifically, the inventors of the present invention have found that the foregoing objects can be achieved by the characteristic features as described below.

(1) A polarizing plate protective film comprising:
a compound represented by general formula (II-1) or (II-2) shown below:

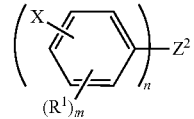

General formula (II-1)

General formula (II-2)

[(in general formulas (II-1) and (II-2), X represents a group represented by general formula (I-A-3) shown below; n represents an integer of 2 or more; and a plurality of Xs may be identical or different;

in general formula (II-1), $Z^2$ represents a linking group having a valence of n; $R^1$ represents a substituent, and when there are a plurality of $R^1$s, at least two may be taken together to form a ring, or $R^1$s in different benzene rings may be taken together to form a single bond; m represents an integer of 0-4; and the plurality of $R^1$s may be identical or different;

in general formula (II-2), $Z^3$ represents an alkylene group having a valence of n, provided that $Z^3$ does not have a ring structure;

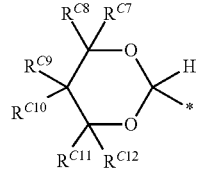

General formula (I-A-3)

(in general formula (I-A-3), $R^{C7}$ to $R^{C12}$ each independently represent a hydrogen atom, an alkyl group, a cycloalkyl group, an aryl group, an acyl group, an alkoxy group, or an alkoxycarbonyl group, and at least two of $R^{C7}$ to $R^{C12}$ may be taken together to form a ring; * indicates a bonding arm which is bonded to a benzene ring in general formula (II-1) or $Z^3$ in general formula (II-2))].

(2) The polarizing plate protective film according to (1), wherein the compound represented by general formula (II-1) or (II-2) has 2 to 4 Xs and a total number of carbon atoms in a constituent moiety other than the Xs is 40 or less.

(3) The polarizing plate protective film according to (1) or (2), wherein a number of atoms in a shortest linking path linking two Xs together is 20 or less in every path between two Xs.

(4) The polarizing plate protective film according to any one of (1) to (3), wherein $Z^2$ shown above is any one of or any combination of —O—, —S—, —SO—, —SO$_2$—, —C(=O)—, —OC(=O)—, —C(R$^{11}$)(R$^{12}$)—, >C<, (—OCH$_2$CH$_2$)$_2$C(CH$_2$CH$_2$O—)$_2$, >C(R$^{13}$)—, >N—, and —N(Ra)—, where R$^{11}$ to R$^{13}$ each independently represent a hydrogen atom, an alkyl group or an aryl group, and Ra represents a hydrogen atom, an alkyl group, an aryl group, or an acyl group.

(5) The polarizing plate protective film according to any one of (1) to (4), further comprising cellulose acylate.

(6) A polarizing plate comprising:
a polarizer; and
one or more polarizing plate protective films applied on one or both surfaces of the polarizer,
wherein at least one of the one or more polarizing plate protective films is the polarizing plate protective film according to any one of (1) to (5).

(7) The polarizing plate according to (6), wherein the at least one of the one or more polarizing plate protective films contains a compound represented by general formula (A) shown below:

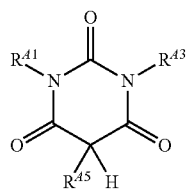

General formula (A)

(in general formula (A), $R^{41}$ and $R^{43}$ each independently represent a hydrogen atom, an alkyl group, a cycloalkyl group, an alkenyl group or an aromatic group, and the alkyl group, the cycloalkyl group, the alkenyl group and the aromatic group may each have a substituent; $R^{45}$ represents a hydrogen atom or a substituent).

(8) A display device comprising:
at least one polarizing plate according to (6) or (7).

A numerical value range expressed using a hyphen (-) in the specification refers to a range including numerical values given before and after the hyphen as a lower limit and an upper limit, respectively.

In the specification, unless otherwise specified, a group capable of having a substituent (e.g., group having an alkyl moiety, an aryl moiety, or a heterocyclic moiety) may have a substituent. For example, an alkyl group is an alkyl group which may have a substituent, and an aryl group or an aromatic group is an aryl group or an aromatic group which may have a substituent.

When a single atom has at least two substituents, these substituents may be taken together to form a ring. Alternatively, when each of adjacent bonded atoms has a substituent, these substituents may be taken together to form a ring.

In addition, when a plurality of groups of the same sign are present, or when a plurality of groups of the same sign are present as a result of a plurality of repetitions, these may be identical or different.

In the specification, when a plurality of substituents or linking groups (hereinafter referred to as "substituents and the like") are defined simultaneously or alternatively, the respective substituents and the like may be identical or different.

Unless otherwise specified, reference is made to substituents S for the substituents.

The present invention can provide a protective film for a polarizing plate capable of imparting excellent durability to the polarizing plate, and the polarizing plate and a display device including the protective film.

BRIEF DESCRIPTION OF THE DRAWINGS

FIG. 1 is a schematic view illustrating an example of an embodiment of a liquid crystal display device including a polarizing plate according to the present invention.

DETAILED DESCRIPTION OF THE INVENTION

The present invention is described below in detail.
<<Polarizing Plate Protective Film>>

A polarizing plate protective film may be in the form of a single layer or of a laminate having a plurality of layers.

In a case where the polarizing plate protective film is a laminate of two or more layers, a two-layer structure or a three-layer structure is more preferred and a three-layer structure is even more preferred. In the case of a three-layer structure, the polarizing plate protective film preferably has a single core layer (i.e., a layer having the largest thickness; hereinafter referred to also as "base layer") and a skin layer A and a skin layer B between which the core layer is sandwiched. According to the invention, the polarizing plate protective film is preferably of a three-layer structure including the skin layer B, the core layer, and the skin layer A. When the polarizing plate protective film is manufactured by a solvent casting method, the skin layer B is a layer that comes into contact with a metal support to be described later and the skin A is an air interface layer that is opposite to the metal support. The skin layer A and the skin layer B are also collectively referred to as "skin layers (or surface layers)."

The polarizing plate protective film according to the invention comprises a compound represented by general formula (II-1) or general formula (II-2).

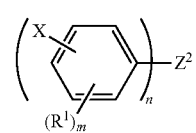

General formula (II-1)

In general formula (II-1), X represents a group represented by general formula (I-A-3) shown below and n represents an integer of 2 or more. A plurality of Xs may be identical or different. $Z^2$ represents a linking group having a valence of n. $R^1$ represents a substituent, and when there are a plurality of $R^1$s, at least two of the plurality of $R^1$s may be taken together to form a ring. Alternatively, $R^1$s in different benzene rings may be taken together to form a single bond. m represents an integer of 0-4. The plurality of $R^1$s may be identical or different.

General formula (II-2)

In general formula (II-2), definitions of X and n are the same as those of X and n in general formula (II-1) shown above. $Z^3$ represents an alkylene group having a valence of n, provided that $Z^3$ does not have a ring structure.

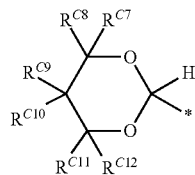

General formula (I-A-3)

In general formula (I-A-3), $R^{C7}$ to $R^{C12}$ each independently represent a hydrogen atom, an alkyl group, a cycloalkyl group, an aryl group, an acyl group, an alkoxy group, or an alkoxycarbonyl group. At least two of $R^{C7}$ to $R^{C12}$ may be taken together to form a ring. * indicates a bonding arm which is bonded to a benzene ring in general formula (II-1) or $Z^3$ in general formula (II-2).

In general, a polarizing plate is in the form of a laminate obtained by applying one or more polarizing plate protective films to one or both surfaces of a polarizer. The durability of the polarizing plate under high-temperature and high-humidity conditions can be improved by incorporating the compound represented by general formula (II-1) or general formula (II-2) in the one or more polarizing plate protective films to be applied to the polarizer.

As described above, the inventors of the invention found out that after a resin constituting a polarizer swells under high-temperature and high-humidity conditions, physical properties of the resin are changed. Such a change was presumed to be caused by a decrease in the degree of crosslinking of the crosslinked resin that was based on the reduction of the crosslinking agent.

Particularly in a case where the resin constituting the polarizer is polyvinyl alcohol, the compound represented by general formula (II-1) or general formula (II-2) is highly effective in improving the polarizing plate durability, and hence the following mechanism is mainly presumed to work.

More specifically, when the polarizer is placed under high-temperature and high-humidity conditions, partial degradation occurs at the boric acid-crosslinked structure, thus causing a polyvinyl alcohol-iodine complex to flow out. Further, reduction of the boric acid causes crystallization of the polyvinyl alcohol to proceed. If the compound represented by general formula (II-1) or general formula (II-2) according to the invention is used in this step, this compound is diffused from the polarizing plate protective film and moved to the polarizer at high temperature and high humidity to allow the polyvinyl alcohol to be crosslinked through an acetal linkage, whereby the crystallization of the polyvinyl alcohol can be suppressed.

As a result, deterioration of the polarizer is more effectively minimized and hence the durability of the polarizing plate including the polarizing plate protective film as described above is presumed to be improved.

<Compound Represented by General Formula (II-1) or General Formula (II-2)>

The compound represented by general formula (II-1) or general formula (II-2) is described below in detail.

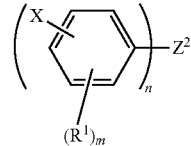

General formula (II-1)

In general formula (II-1), X represents a group represented by general formula (I-A-3) shown below and n represents an integer of 2 or more. A plurality of Xs may be identical or different. $Z^2$ represents a linking group having a valence of n. $R^1$ represents a substituent, and when there are a plurality of $R^1$s, at least two of the plurality of $R^1$s may be taken together to form a ring. Alternatively, $R^1$s in different benzene rings may be taken together to form a single bond. m represents an integer of 0-4. The plurality of $R^1$s may be identical or different.

General formula (II-2)

In general formula (II-2), definitions of X and n are the same as those of X and n in general formula (II-1) shown above. $Z^3$ represents an alkylene group having a valence of n, provided that $Z^3$ does not have a ring structure.

In general formulas (II-1) and general formula (II-2), n represents an integer of 2 or more, preferably 2-6, more preferably 2-4, and most preferably 2.

In general formula (II-1), $Z^2$ represents a linking group having a valence of n.

Examples of the divalent linking group include —O—, —S—, —SO—, —SO$_2$—, —N(Ra)—, —OC(=O)—, —C(=O)O—, an alkylene group, —O— alkylene group-O—, —O-[alkylene group-O]$_p$—O—, an arylene group, a heteroarylene group, —C(=O)O—Y—OC(=O)—, —OC(=O)—Y—C(=O)O—, and —OC(=O)—Y—OC(=O)—. As used herein, Ra represents a hydrogen atom, an alkyl group or an acyl group, p represents an integer of 1-10, and Y represents an alkylene group, a cycloalkylene group, an arylene group or a divalent heterocyclic group. As used herein, the alkylene group is also preferably —C($R^{11}$)($R^{12}$)—, and $R^{11}$ and $R^{12}$ each independently represent a hydrogen atom, an alkyl group or an aryl group.

Examples of the trivalent linking group include >C($R^{13}$)—, >N—, a trivalent cycloalkyl group, a trivalent aryl group, and a trivalent heteroaryl group. As use herein, $R^{13}$ represents a hydrogen atom, an alkyl group or an aryl group.

Examples of the tetravalent linking group include >C<, (—OCH$_2$CH$_2$)$_2$C(CH$_2$CH$_2$O—)$_2$, and a tetravalent arylene group.

Among these, $Z^2$ is preferably any one of or any combination of —O—, —S—, —SO—, —SO$_2$—, —C(=O)—, —OC(=O)—, —C($R^{11}$)($R^{12}$)—, >C<, (—OCH$_2$CH$_2$)$_2$C(CH$_2$CH$_2$O—)$_2$, >C($R^{13}$)—, >N—, and —N(Ra)—. $R^{11}$ to $R^{13}$ each independently represent a hydrogen atom, an alkyl group, or an aryl group, and Ra represents a hydrogen atom, an alkyl group, an aryl group, or an acyl group.

In general formula (II-1), $R^1$ represents a substituent. Exemplary substituents in $R^1$ include those selected from the substituents S. When there are a plurality of $R^1$s, at least two may be taken together to form a ring. Alternatively, $R^1$s in different benzene rings may be taken together to form a single bond.

$R^1$ is preferably an alkyl group, an alkoxy group, an acyloxy group, an alkoxycarbonyl group, a cyano group, or a halogen atom.

In general formula (II-1), m represents an integer of 0-4 and more preferably 0-2.

In general formula (II-2), $Z^3$ represents an alkylene group having a valence of n, provided that $Z^3$ does not have a ring structure.

$Z^3$ is preferably a divalent alkylene group. Examples of the divalent alkylene group include those containing 1-12 carbon atoms each of which may have a substituent (examples of the substituent include the substituents S to be described later), as exemplified by ethylene group, propylene group, butylene group, hexylene group, and octylene group. Ethylene group or propylene group which may have a substituent is preferred. The alkylene group may contain a heteroatom. Examples of such a heteroatom include oxygen atom, sulfur atom, and nitrogen atom.

General formula (I-A-3)

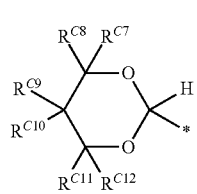

In general formula (I-A-3), $R^{C7}$ to $R^{C12}$ each independently represent a hydrogen atom, an alkyl group, a cycloalkyl group, an aryl group, an acyl group, an alkoxy group, or an alkoxycarbonyl group. At least two of $R^{C7}$ to $R^{C12}$ may be taken together to form a ring. * indicates a bonding arm which is bonded to a benzene ring in general formula (II-1) or $Z^3$ in general formula (II-2).

In general formula (I-A-3), the alkyl group in each of $R^{C7}$ to $R^{C12}$ may be linear or branched and preferably contains 1-12 carbon atoms and more preferably 1-8 carbon atoms. Examples of the alkyl group include methyl, ethyl, n-propyl, isopropyl, n-butyl, isobutyl, s-butyl, t-butyl, n-hexyl, n-octyl, 2-ethylhexyl, n-decyl, n-dodecyl, benzyl, phenoxyethyl, and methoxyethyl.

The cycloalkyl group in each of $R^{C7}$ to $R^{C12}$ preferably contains 3-12 carbon atoms, more preferably 5-12 carbon atoms, and even more preferably 5-8 carbon atoms. Examples of the cycloalkyl group include cyclopropyl, cyclopentyl, and cyclohexyl. Cyclopentyl and cyclohexyl are preferred.

The aryl group in each of $R^{C7}$ to $R^{C12}$ preferably contains 6-20 carbon atoms, more preferably 6-16 carbon atoms, and even more preferably 6-12 carbon atoms. Examples of the aryl group include phenyl and naphthyl, and phenyl group is preferred.

The acyl group in each of $R^{C7}$ to $R^{C12}$ preferably contains 2-20 carbon atoms. The acyl group may be any of an alkylcarbonyl group, an alkenylcarbonyl group, a cycloalkylcarbonyl group, a cycloalkenylcarbonyl group, an arylcarbonyl group, and a heterocyclic carbonyl group. Examples of the acyl group include acetyl, propionyl, butyryl, isobutyryl, valeryl, isovaleryl, pivaloyl, benzoyl, naphthoyl, acryloyl, nicotinoyl, cyclopropylcarbonyl, and cyclohexylcarbonyl.

Among these acyl groups, an alkylcarbonyl group and an arylcarbonyl group are preferred.

The alkoxy group in each of $R^{C7}$ to $R^{C12}$ preferably contains 1-20 carbon atoms, and more preferably 2-16 carbon atoms. Examples of the alkoxy group include methoxy, ethoxy, isopropoxy, hexyl, and 2-ethylhexyloxy. The alkoxy group may have a substituent as will be described later or may form a ring.

The alkoxycarbonyl group in each of $R^{C7}$ to $R^{C12}$ preferably contains 2-12 carbon atoms, more preferably 2-8 carbon atoms, and even more preferably 2-6 carbon atoms. Examples of the alkoxycarbonyl group include methoxycarbonyl, ethoxycarbonyl, isopropoxycarbonyl, n-butoxycarbonyl, t-butoxycarbonyl, 2-ethylhexyloxycarbonyl, and benzyloxycarbonyl.

The alkyl group, the cycloalkyl group, the aryl group, the acyl group, the alkoxy group, and the alkoxycarbonyl group in each of $R^{C7}$ to $R^{C12}$ may further have a substituent, examples thereof including groups selected from the substituents S. Among such substituents, an alkyl group, a cycloalkyl group, an aryl group, an alkoxy group, an aryloxy group, an alkylthio group, an arylthio group, an acyl group, an alkoxycarbonyl group, a carbamoyl group, a sulfamoyl group, a sulfonyl group, a cyano group, a halogen atom, and a hydroxy group are preferred.

A ring formed by bonding together at least two of $R^{C7}$ to $R^{C12}$ is preferably a 5- or 6-membered ring.

The ring formed may have a substituent and examples of such a substituent include groups selected from the substituents S.

In particular, $R^{C7}$ to $R^{C12}$ are each preferably a hydrogen atom or an alkyl group.

The number of benzene rings contained in the compound represented by general formula (II-1) is preferably 2-4, more preferably 2 or 3, and particularly preferably 2.

The number of Xs contained in the compound represented by general formula (II-1) or general formula (II-2) is preferably 2-4, more preferably 2 or 3, and even more preferably 2.

The total number of carbon atoms in the constituent moiety except X in the compound represented by general formula (II-1) or general formula (II-2) is preferably up to 40, more preferably 6-40, and even more preferably 12-24 from the viewpoint of improving the diffusion into the polarizer. Above all, a case where n is 2-4 is particularly preferred.

In the compound represented by general formula (II-1) or general formula (II-2), the number of atoms in the shortest linking path linking two Xs together is preferably up to 20, more preferably 2-20, even more preferably 6-20, and particularly preferably 8-20 in every path between two Xs.

For example, in the following case, starting from the first carbon atom to which a 6-membered cyclic acetal group is bonded, the number of the carbon atom to which the other 6-membered cyclic acetal group is bonded is 10. Therefore, the number of atoms in the shortest linking path linking two Xs together is 10.

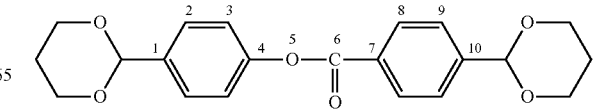

In general formula (II-1), $R^1$ and $Z^2$ are each preferably an electron-withdrawing group with respect to X.

The electron-withdrawing group is preferably a group having a σ value in the Hammett's rule of −0.10 or more and more preferably 0 or more.

Examples of the substituent having a positive σp value include halogen atoms such as fluorine (0.06), chlorine (0.30), bromine (0.27), and iodine (0.30); carbonyl-containing groups such as —CHO (0.22), —COCH$_3$ (0.50), —COC$_6$H$_5$ (0.46), —CONH$_2$ (0.36), —COO— (0.30), —COOH (0.41), —COOCH$_3$ (0.39), and —COOC$_2$H$_5$ (0.45); sulfonyl- or sulfinyl-containing groups such as —SOCH$_3$ (0.49), —SO$_2$CH$_3$ (0.72), —SO$_2$C$_6$H$_5$ (0.68), —SO$_2$CF$_3$ (0.93), —SO$_2$NH$_2$ (0.57), —SO$_2$OC$_6$H$_5$ (0.23), —SO$_3$— (0.09), and —SO$_3$H (0.50); nitrogen-containing substituents such as —CN (0.66), —NO$_2$ (0.78), —N(CH$_3$)$_3^+$ (0.82), and —N(CF$_3$)$_2$ (0.53); and halogen atom-substituted alkyl groups such as —CCl$_3$ (0.46), —CH$_2$Cl (0.18), —CHCl$_2$ (0.32), and —CF$_3$ (0.54). Numerals in parentheses in these substituents indicate σp values.

The Hammett σ value is also described in, for example, C. Harsch et al., J. Med. Chem., 16, 1207 (1973), J. Med. Chem., 20, 304 (1977), and Chem. Rev. 91, 165 (1991).

Above all, at least one selected from $Z^2$ and $R^1$ preferably has a Hammett σp value of 0.20 or more.

Specific examples of such a group include an acyl group; an alkoxycarbonyl group; an aryloxycarbonyl group; a carbamoyl group in which at least one of hydrogen atoms is substituted with an alkyl or an aryl (e.g., —CONHCH$_3$ (0.32)); a thioacyl group; an alkoxythiocarbonyl group; an aryloxythiocarbonyl group; a thiocarbamoyl group in which at least one of hydrogen atoms is substituted with an alkyl or an aryl (e.g., —CSNHCH$_3$ (0.34)); a sulfamoyl group in which at least one of hydrogen atoms is substituted with an alkyl or an aryl (e.g., —SO$_2$N(CH$_3$)$_2$ (0.65)); an alkyl- or aryl-sulfonyl group (e.g., —SO$_2$CH$_3$ (0.72)); an alkyl- or aryl-sulfinyl group (e.g., —SOCH$_3$ (0.49)); a cyano group; a nitro group; and a phosphono group.

The electron-withdrawing group is preferably an acyl group; an alkoxycarbonyl group; an aryloxycarbonyl group; an alkyl- or aryl-sulfonyl group; a cyano group; a nitro group; a carbamoyl group in which at least one of hydrogen atoms is substituted with a group independently selected from alkyl groups, cycloalkyl groups and aryl groups; or an alkyl- or aryl-sulfamoyl group.

Preferred basic skeletons and acetal moieties ($X^1$ to $X^4$) are illustrated below. According to the invention, combinations thereof are all preferred. It should be noted that in compounds (23) and (24), $R^1$s in different benzene rings are taken together to form a single bond.

Basic Skeletons

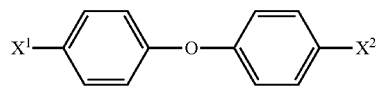
(7)

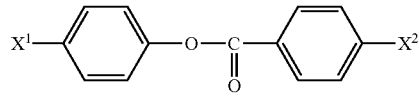
(8)

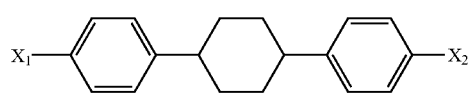
(9)

-continued

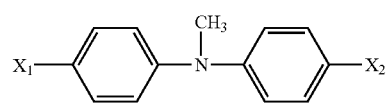
(10)

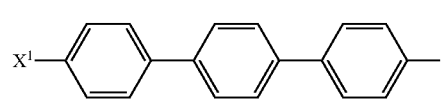
(11)

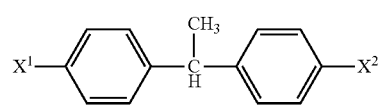
(12)

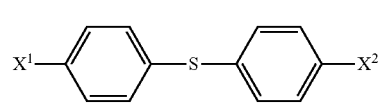
(13)

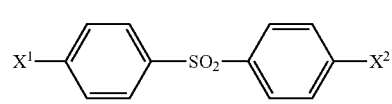
(14)

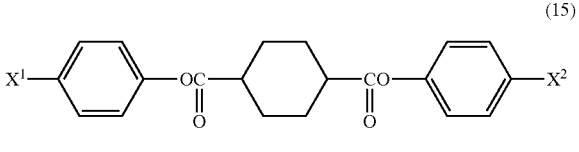
(15)

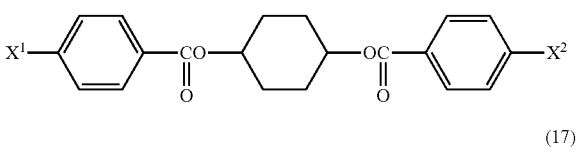
(16)

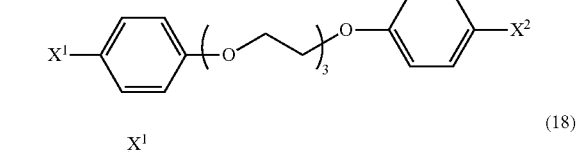
(17)

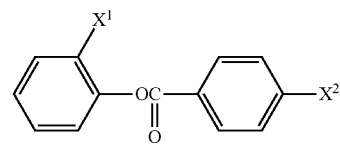
(18)

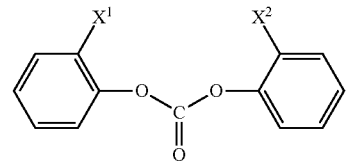
(19)

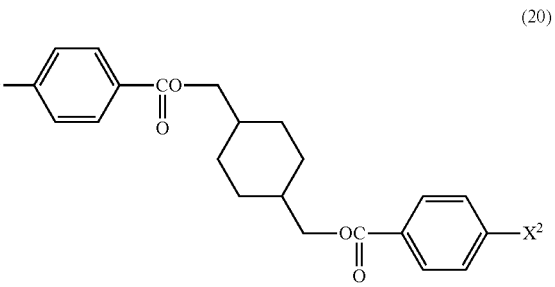
(20)

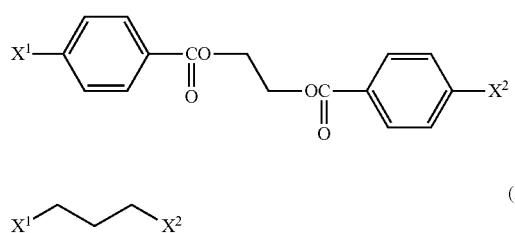
(21)
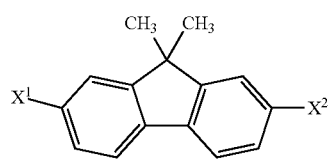
(22)
(23)
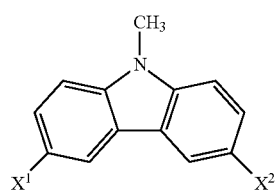
(24)
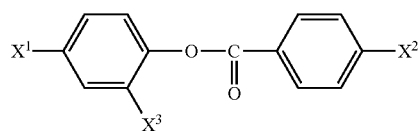
(25)
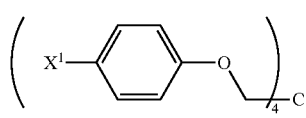
(26)
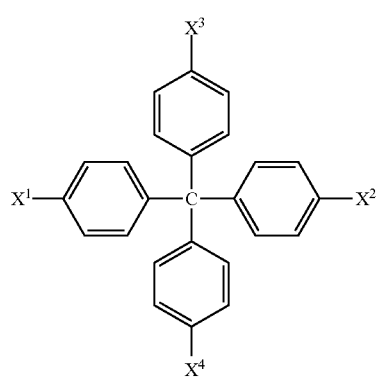
(27)
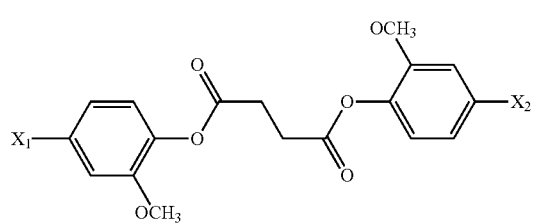
(28)
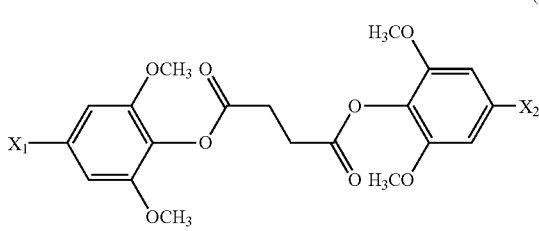
(29)
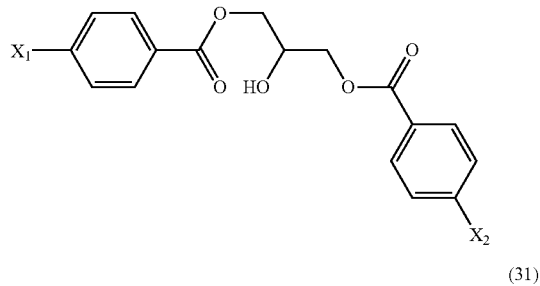
(30)
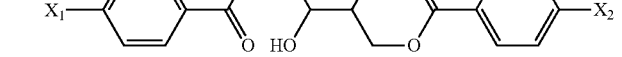
(31)
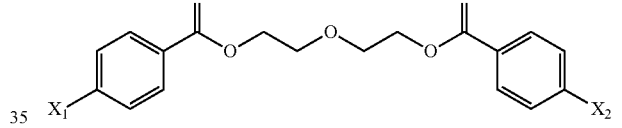
(32)
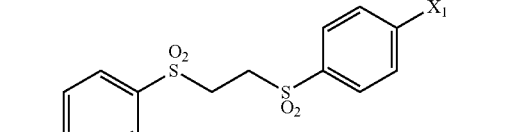
(33)
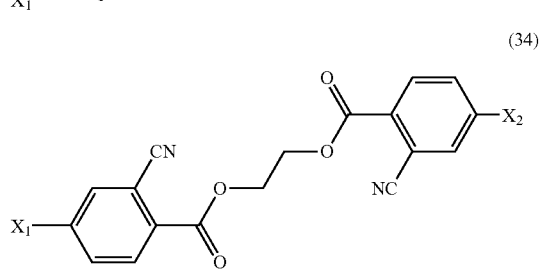
(34)
(35)
Acetal Moieties ($X^1$ to $X^4$)
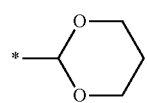
(A-401)

-continued

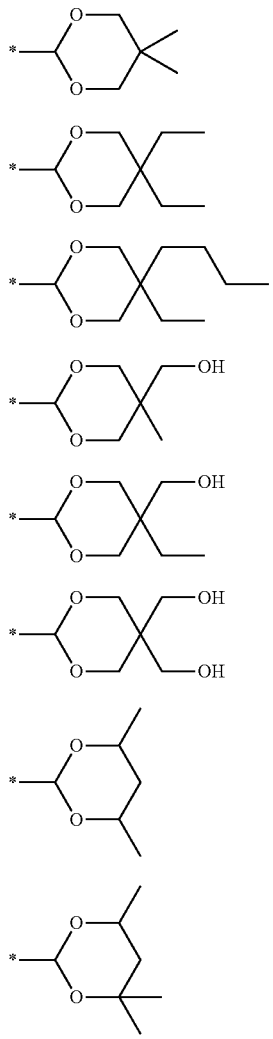

* indicates a bonding arm which is bonded to a basic skeleton.

Specific examples of the compound represented by general formula (II-1) or general formula (II-2) are illustrated below but the present invention is not limited thereto.

Table 1 below illustrates specific examples using the basic skeletons and acetal moieties ($X^1$ to $X^4$) shown above.

TABLE 1

| Compound No. | Basic skeleton formula No. | $X^1$ | $X^2$ | $X^3$ | $X^4$ |
|---|---|---|---|---|---|
| D-1 | 7 | A-402 | A-402 | — | — |
| D-2 | 8 | A-402 | A-402 | — | — |
| D-3 | 9 | A-402 | A-402 | — | — |
| D-4 | 10 | A-402 | A-402 | — | — |
| D-5 | 11 | A-402 | A-402 | — | — |
| D-6 | 12 | A-402 | A-402 | — | — |
| D-7 | 13 | A-402 | A-402 | — | — |
| D-8 | 14 | A-402 | A-402 | — | — |
| D-9 | 15 | A-402 | A-402 | — | — |
| D-10 | 16 | A-402 | A-402 | — | — |
| D-11 | 17 | A-402 | A-402 | — | — |
| D-12 | 18 | A-402 | A-402 | — | — |
| D-13 | 19 | A-402 | A-402 | — | — |
| D-14 | 20 | A-402 | A-402 | — | — |
| D-15 | 21 | A-402 | A-402 | — | — |
| D-16 | 22 | A-402 | A-402 | — | — |
| D-17 | 23 | A-402 | A-402 | — | — |
| D-18 | 24 | A-402 | A-402 | — | — |
| D-19 | 25 | A-402 | A-402 | A-402 | — |
| D-20 | 26 | A-402 | — | — | — |
| D-21 | 27 | A-402 | A-402 | A-402 | A-402 |
| D-22 | 28 | A-402 | A-402 | — | — |
| D-23 | 29 | A-402 | A-402 | — | — |
| D-24 | 30 | A-402 | A-402 | — | — |
| D-25 | 31 | A-402 | A-402 | — | — |
| D-26 | 8 | A-401 | A-401 | — | — |
| D-27 | 8 | A-403 | A-403 | — | — |
| D-28 | 8 | A-404 | A-404 | — | — |
| D-29 | 20 | A-405 | A-405 | — | — |
| D-30 | 20 | A-406 | A-406 | — | — |
| D-31 | 21 | A-407 | A-407 | — | — |
| D-32 | 21 | A-408 | A-408 | — | — |
| D-33 | 8 | A-409 | A-409 | — | — |
| D-34 | 32 | A-401 | A-401 | — | — |
| D-35 | 33 | A-405 | A-405 | — | — |
| D-36 | 34 | A-406 | A-406 | — | — |
| D-37 | 35 | A-401 | A-401 | A-401 | A-401 |
| D-38 | 21 | A-405 | A-405 | — | — |
| D-39 | 21 | A-408 | A-408 | — | — |

A commercially available product may be purchased as the compound represented by general formula (II-1) or general formula (II-2) or a known method may be used to synthesize the compound represented by general formula (II-1) or general formula (II-2). For example, the compound represented by general formula (II-1) or general formula (II-2) can be synthesized by acetalizing a formyl group-containing compound according to a common method. The compound represented by general formula (II-1) or general formula (II-2) can be easily synthesized by subjecting a substituent-containing formyl compound used as a material to a common synthesis reaction such as esterification, amidation or alkylation to obtain a formyl compound having any of various skeletons and then acetalizing the formyl compound. Further, the formyl compound as the material can be synthesized by oxidizing a corresponding alcohol with a common oxidizing agent such as manganese dioxide.

The compound represented by general formula (II-1) or general formula (II-2) is preferably blended in an amount of 0.1-30 parts by weight, more preferably 1-25 parts by weight, and most preferably 1.5-20 parts by weight with respect to 100 parts by weight of the resin constituting the polarizing plate protective film. The compounds represented by general formula (II-1) or general formula (II-2) may be used singly or in combination of two or more thereof.

The substituents S are now described.

Examples of the substituents S include substituents illustrated below.

[Substituents S]

Examples of the substituents S include: alkyl groups (preferably containing 1-20 carbon atoms, as exemplified by methyl, ethyl, isopropyl, tert-butyl, pentyl, heptyl, 1-ethylpentyl, 2-ethylhexyl, benzyl, 2-ethoxyethyl, and 1-carboxymethyl); alkenyl groups (preferably containing 2-20 carbon atoms, as exemplified by vinyl, allyl, and oleyl); alkynyl groups (preferably containing 2-20 carbon atoms, as exemplified by ethynyl, 2-propynyl, 2-butynyl, and phenylethynyl); cycloalkyl groups (preferably containing 3-20 carbon atoms, as exemplified by cyclopropyl, cyclopentyl, cyclohexyl, and 4-methylcyclohexyl); aryl groups (preferably containing 6-20 carbon atoms, as exemplified by phenyl, 1-naphthyl, 4-methoxyphenyl, 2-chlorophenyl, and 3-methylphenyl); heterocyclic groups (preferably heterocyclic groups containing 0-20 carbon atoms, each of which preferably contains ring-constituting heteroatoms such as oxygen atom, nitrogen atom and sulfur atom, and is a 5- or 6-membered ring which may be condensed with a benzene ring or a heterocyclic ring, and may be a saturated ring, an unsaturated ring or an aromatic ring, examples thereof including 2-pyridyl, 4-pyridyl, 2-imidazolyl, 2-benzimidazolyl, 2-thiazolyl, and 2-oxazolyl); alkoxy groups (preferably containing 1-20 carbon atoms, as exemplified by methoxy, ethoxy, isopropyloxy, and benzyloxy); aryloxy groups (preferably containing 6-20 carbon atoms, as exemplified by phenoxy, 1-naphthyloxy, 3-methylphenoxy, and 4-methoxyphenoxy); alkylthio groups (preferably containing 1-20 carbon atoms, as exemplified by methylthio, ethylthio, isopropylthio, and benzylthio); arylthio groups (preferably containing 6-20 carbon atoms, as exemplified by phenylthio, 1-naphthylthio, 3-methylphenylthio, and 4-methoxyphenylthio); formyl group; acyl groups (including alkylcarbonyl groups, alkenylcarbonyl groups, arylcarbonyl groups, and heterocyclic carbonyl groups, and preferably containing up to 20 carbon atoms, as exemplified by acetyl, pivaloyl, acryloyl, methacryloyl, benzoyl, and nicotinoyl); alkoxycarbonyl groups (preferably containing 2-20 carbon atoms, as exemplified by ethoxycarbonyl, and 2-ethylhexyloxycarbonyl); aryloxycarbonyl groups (preferably containing 7-20 carbon atoms, as exemplified by phenyloxycarbonyl, and naphthyloxycarbonyl); amino groups (including amino group, alkylamino groups, arylamino groups, and heterocyclic amino groups, and preferably containing 0-20 carbon atoms, as exemplified by amino, N,N-dimethylamino, N,N-diethylamino, N-ethylamino, anilino, 1-pyrrolidinyl, piperidino, and morphonyl); alkyl- or aryl-sulfonamide groups (preferably containing 0-20 carbon atoms, as exemplified by N,N-dimethylsulfonamide, and N-phenylsulfonamide); sulfamoyl groups (preferably containing 0-20 carbon atoms, $-SO_2NH_2$ or an alkyl- or aryl-sulfamoyl group being preferred, examples thereof including N,N-dimethylsulfamoyl, and N-phenylsulfamoyl); acyloxy groups (preferably containing 1-20 carbon atoms, as exemplified by acetyloxy, and benzoyloxy); carbamoyl groups [preferably containing 1-20 carbon atoms, $-C(=O)NH_2$ or an alkyl- or aryl-carbamoyl group being preferred, examples thereof including N,N-dimethylcarbamoyl, and N-phenylcarbamoyl]; acylamino groups (preferably containing 1-20 carbon atoms, as exemplified by acetylamino, acryloylamino, benzoylamino, and nicotinamide); thioacyl groups, alkoxythiocarbonyl groups, aryloxythiocarbonyl groups, and thiocarbamoyl group [preferable ranges and specific examples thereof include those which are only different in that $C(=O)$ moieties in corresponding acyl groups, alkoxycarbonyl groups, aryloxycarbonyl groups and carbamoyl group are substituted with $(C=S)$]; silyl groups (silyl groups containing 3-20 carbon atoms are preferred, alkoxy- or aryloxy-substituted silyl groups are more preferred, and trialkoxysilyl groups are even more preferred, examples thereof including trimethoxysilyl and triethoxysilyl); trialkoxysilyl groups, halogen atoms (e.g., fluorine atom, chlorine atom, bromine atom, and iodine atom); acylsulfamoyl groups (including alkylcarbonylsulfamoyl groups, alkenylcarbonylsulfamoyl groups, arylcarbonylsulfamoyl groups, and heterocyclic carbonylsulfamoyl groups, and preferably containing up to 20 carbon atoms, as exemplified by acetylsulfamoyl, pivaloylsulfamoyl, acryloylsulfamoyl, methacryloylsulfamoyl, benzoylsulfamoyl, and nicotinoylsulfamoyl); alkyl- or aryl-sulfonylsulfamoyl groups (preferably containing 1 to 20 carbon atoms, as exemplified by methylsulfonylsulfamoyl, ethylsulfonylsulfamoyl, phenylsulfonylsulfamoyl, and tolylsulfonylsulfamoyl); cyano group, nitro group, hydroxy group or an anion thereof, mercapto group or an anion thereof, sulfo group or a salt thereof, carboxy group or a salt thereof, phosphoric acid group or a salt thereof, boronic acid group or a salt thereof, boronic acid ester group, onio groups (e.g., sulfonio group of a sulfonium salt, ammonio group of an ammonium salt, iodonio group of an iodonium salt, and phosphonio group of a phosphonium salt).

These substituents may be further substituted with substituents, and such exemplary substituents include the above-described substituents S.

Examples thereof include aralkyl groups which are alkyl groups each substituted with an aryl group (e.g., benzyl, phenethyl, and diphenylmethyl); alkyl groups each substituted with an alkoxycarbonyl group or a cyano group (e.g., benzoylmethyl); perfluoroalkyl groups each containing an alkyl group substituted with a fluorine atom, as exemplified by trifluoromethyl; and substituted aryl groups each containing an aryl group substituted with any of the above-described substituents S. Other preferred examples include active methine or active methylene structure-containing groups (electron-withdrawing group-substituted alkyl groups; groups each having a moiety in which methine or methylene is bonded to an electron-withdrawing group, and groups each having a methine or methylene moiety sandwiched between electron-withdrawing groups.

<Resin>

The polarizing plate protective film according to the invention preferably contains a resin and is in film form.

There is no particular limitation on the resin that may be used for the polarizing plate protective film and a known resin may be used unless it goes against the spirit of the invention. Examples of the resin include cellulose acylate resin, acrylic resin, and cycloolefin resin. Among these resins, acrylic resin and cellulose acylate resin are preferred, and cellulose acylate resin is particularly preferred in terms of the excellent compatibility with the compound represented by general formula (II-1) or general formula (II-2).

These resins may be used singly or in combination of two or more but when used in combination of two or more, an ingredient contained in the largest amount among the resin ingredients is deemed to be a main ingredient.

(Cellulose Acylate)

According to the invention, one type of cellulose acylate or two or more types of cellulose acylates may be used to make up a main ingredient of a cellulose acylate film. For example, the cellulose acylate may be a cellulose acetate only including acetyl group as the acyl substituent. Alternatively, a cellulose acylate having a plurality of different acyl substituents or a mixture of different cellulose acylates may be used. The main ingredient refers to the one containing at least 50 wt % of cellulose acylate among the resin ingredients constituting a film or a layer, and the cellulose acylate content in the resin ingredients is preferably at least 60 wt %, and more preferably at least 80 wt %.

Examples of the cellulose that may be used in the invention as the material of the cellulose acylate include cotton linters and wood pulps (hardwood pulp and soft wood pulp). The cellulose that can be used may be obtained by any cellulose material and such cellulose materials may be optionally mixed and used. As the cellulose materials, use may be made of celluloses described in, for example, Marusawa and Uda, "Plastic Material Course (17) Cellulose-Based Resins," The Nikkan Kogyo Shinbun, Ltd., (1970), and Journal of Technical Disclosure No. 2001-1745 (pp. 7-8) published by the Japan Institute of Invention and Innovation.

According to the invention, the cellulose acylate which contains only one type of acyl group, or two or more types of acyl groups may be used. The cellulose acylate that may be used in the invention preferably includes an acyl group containing 2 or more carbon atoms as the substituent. The acyl group containing 2 or more carbon atoms is not particularly limited but may be an aliphatic acyl group or an aromatic acyl group. Examples thereof include an alkylcarbonyl group, an alkenylcarbonyl group, an aromatic carbonyl group, and an aromatic alkylcarbonyl group of the cellulose, and these groups may each further have a substituent. Preferred examples thereof include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexanecarbonyl, oleoyl, benzoyl, naphthylcarbonyl, and cinnamoyl. Among these, acetyl, propionyl, butanoyl, dodecanoyl, octadecanoyl, tert-butanoyl, oleoyl, benzoyl, naphthylcarbonyl, and cinnamoyl are more preferred and acetyl, propionyl, and butanoyl are even more preferred.

The cellulose acylate that may be used in the invention preferably includes an acyl group containing 2-4 carbon atoms as the substituent. When two or more types of acyl groups are used, one of them is preferably acetyl group, and another acyl group containing 2-4 carbon atoms that may be used is preferably propionyl group or butyryl group. Through the use of these cellulose acylates, a solution having good solubility can be prepared, and a good solution can be prepared particularly in a non-chlorine-based organic solvent. In addition, a solution having a low viscosity and good filtering properties can be prepared.

According to the invention, the cellulose acylate particularly preferably includes solely acetyl group as the acyl group.

The cellulose acylate that may be preferably used in the invention is described below in detail.

A glucose unit having a β-1,4 linkage that constitutes the cellulose has free hydroxy groups at the 2-, 3- and 6-positions. The cellulose acylate is a polymer obtained by acylating some or all of these hydroxy groups with acyl groups.

The acyl group substitution degree indicates to what degree hydroxy groups of the cellulose at the 2-, 3-, and 6-positions are acylated. In a case where all hydroxy groups at the 2-, 3-, and 6-positions of all glucose units are acylated, the total acyl group substitution degree is 3. For example, in a case where hydroxy groups only at the 6-position are all acylated in all glucose units, the total acyl group substitution degree is 1. Likewise, also in a case where all hydroxy groups at one of the 6- and 2-positions are acylated in all glucose units, the total acyl group substitution degree is 1.

In other words, the acylation degree is indicated assuming that the total acyl group substitution degree of the case where all hydroxy groups in a glucose molecule are acylated is 3.

The acyl group substitution degree can be measured according to a method described in detail in Tezuka et al., Carbohydrate. Res., 273, 83-91 (1995) or a method specified in detail in ASTM-D817-96.

When the total acyl group substitution degree of the cellulose acylate for use in the invention is denoted by A, A is preferably at least 1.5 but up to 3.0 ($1.5 \leq A \leq 3.0$). According to the invention, however, A is preferably in a range of 2.80-2.97 in terms of the compatibility with the compound represented by general formula (II-1) or general formula (II-2) and haze reduction.

When the total acetyl substitution degree of the cellulose acetate in which acetyl group is only used as the acyl group of the cellulose acylate is denoted by B, B is preferably at least 2.0 but up to 3.0 ($2.0 \leq B \leq 3.0$). According to the invention, however, B is preferably in a range of 2.80-2.97 in terms of the compatibility with the compound represented by general formula (II-1) or general formula (II-2) and haze reduction.

In a case where the polarizing plate protective film according to the invention is a laminate (is composed of a plurality of layers), the acyl group substitution degree of the cellulose acylate in each layer of the cellulose acylate film may be the same. Alternatively, one layer may include a plurality of types of cellulose acylates having different acyl group substitution degrees or different acyl groups.

In a case where an acid anhydride or an acid chloride is used as the acylating agent in acylation of the cellulose, organic solvents serving as reaction solvents, as exemplified by methylene chloride, and an organic acid such as acetic acid are used.

As for the catalyst, in a case where an acid anhydride is used as the acylating agent, a protonic catalyst such as sulfuric acid is preferably used, and in a case where an acid chloride (e.g., $CH_3CH_2COCl$) is used as the acylating agent, a basic compound is used.

The most common method for industrially synthesizing a cellulose mixed fatty acid ester is a method which involves acylating cellulose with a mixed organic acid ingredient containing fatty acids (acetic acid, propionic acid, and valeric acid) corresponding to acetyl group and other acyl groups or acid anhydrides thereof.

The cellulose acylate can be synthesized by, for example, a method described in JP 10-45804 A.

The polarizing plate protective film according to the invention, and particularly the cellulose acylate film that may be preferably used in the invention preferably contain 5-99 wt % of cellulose acylate with respect to the total solids in terms of water vapor permeability. The cellulose acylate content is more preferably 20-99 wt %, and particularly preferably 50-95 wt %.

(Additives)

The polarizing plate protective film according to the invention, and particularly the cellulose acylate film may also include, together with the compound represented by general formula (II-1) or general formula (II-2), retardation adjusters (a retardation developer and a retardation reducer), plasticizers such as a polycondensed ester compound (polymer), and a polyvalent ester, a phthalic acid ester, a phosphoric acid ester and a sugar ester of a polyhydric alcohol, and other additives such as a UV absorber, an antioxidant, and a matting agent.

In the specification, the term "-based" may be used to represent a compound group, as exemplified by a phosphoric acid ester-based compound. However, in the above case, the phosphoric acid ester-based compound has the same meaning as that of the phosphoric acid ester compound.

Compounds and materials described in paragraphs 0061 to 0126 of JP 2013-28782 A are preferred as the retardation reducers, the retardation developers, the plasticizers, the polyhydric alcohol ester-based and polycondensed ester-based hydrophobizing agents, carbohydrate derivative-based plasticizers, the antioxidants, the UV absorbers, and the matting agents, and the disclosure including their contents are preferably totally incorporated herein by reference.

(Radical Scavenger)

The polarizing plate protective film preferably contains a radical scavenger. Examples of the radical scavenger that may be preferably used include HALSs and reductones.

2,2,6,6-Tetramethyl-piperidine ring-containing compounds are particularly preferred for the HALSs. A compound having a hydrogen atom, an alkyl group, an alkoxy group, a hydroxy group, an oxy radical group (—O.), an acyloxy group, or an acyl group at the 1-position of piperidine is preferred, and a compound having a hydrogen atom, a hydroxy group, an acyloxy group, an optionally substituted amino group, an alkoxy group or an aryloxy group at the 4-position of piperidine is more preferred. A compound having 2 to 5 2,2,6,6-tetramethyl-piperidine rings in the molecule is also preferred.

Such exemplary compounds include Sunlizer HA-622 (trade name, manufactured by Sort Co., Ltd.), CHIMASSORB 2020FDL, TINUVIN 770DF, TINUVIN 152, TINUVIN 123, and FLAMESTAB NOR 116 FF [trade names, all manufactured by BASF (previously Ciba Specialty Chemicals Inc.)], and CYASORB UV-3346, and CYASORB UV-3529 (trade names, both manufactured by Sun Chemical Co., Ltd.).

Exemplary reductones include compounds illustrated in paragraphs 0014 to 0034 of JP 6-27599 A, compounds illustrated in paragraphs 0012 to 0020 of JP 6-110163 A, and compounds illustrated in paragraphs 0022 to 0031 of JP 8-114899 A.

Oil-solubilized derivatives of ascorbic acid and erythorbic acid can also be preferably used, and examples thereof include L-ascorbyl stearate ester, L-ascorbyl tetraisopalmitate ester, L-ascorbyl palmitate ester, erythorbyl palmitate ester, and erythorbyl tetraisopalmitate ester. Among these, a compound having an ascorbic acid skeleton is preferred, and L-ascorbyl myristate ester, L-ascorbyl palmitate ester and L-ascorbyl stearate ester are particularly preferred.

The radical scavenger content in the polarizing plate protective film is preferably 0.001-2.0 parts by weight, and more preferably 0.01-1.0 part by weight with respect to 100 parts by weight of the resin constituting the polarizing plate protective film.

(Deterioration Inhibitor)

The polarizing plate protective film may contain deterioration inhibitors (e.g., an antioxidant, a peroxide decomposer, a radical inhibitor, a metal deactivator, an acid scavenger, and an amine). A UV absorber is also one of the deterioration inhibitors. These deterioration inhibitors are described in JP 60-235852 A, JP 3-199201 A, JP 5-1907073 A, JP 5-194789 A, JP 5-271471 A, JP 6-107854 A, JP 6-118233 A, JP 6-148430 A, JP 7-11056 A, JP 7-11055 A, JP 7-11056 A, JP 8-29619 A, JP 8-239509 A, JP 2000-204173 A, and JP 2006-251746 A.

The above-described radical scavengers also exhibit the deterioration inhibiting effect. However, amines are also known as deterioration inhibitors, examples thereof including compounds described in paragraphs 0009 to 0080 of JP 5-194789 A, and aliphatic amines such as tri-n-octylamine, triisooctylamine, tris(2-ethylhexyl)amine, and N,N-dimethyldodecylamine.

It is also preferred to use polyamines containing 2 or more amino groups, and the polyamines preferably contain 2 or more primary or secondary amino groups. Exemplary compounds containing 2 or more amino groups include nitrogen-containing heterocyclic compounds (compounds having rings such as a pyrazolidine ring and a piperazine ring), and polyamine-based compounds (chain or cyclic polyamines, for example, diethylenetriamine, tetraethylenepentamine, N,N'-bis(aminoethyl)-1,3-propanediamine, N,N,N',N'',N''-pentakis(2-hydroxypropyl)diethylenetriamine, polyethyleneimine, modified polyethyleneimine, and a compound containing cyclam as a basic skeleton).

The deterioration inhibitor content in the polarizing plate protective film on a weight basis is preferably 1 ppm-10%, more preferably 1 ppm-5.0%, and even more preferably 10 ppm-1.0%.

(Peeling Promoter)

The polarizing plate protective film may contain a known peeling promoter.

The peeling promoter is preferably an organic acid, a polycarboxylic acid derivative, a surfactant or a chelating agent. For example, compounds described in paragraphs 0048 to 0081 of JP 2006-45497 A, compounds described in paragraphs 0077 to 0086 of JP 2002-322294 A, and compounds described in paragraphs 0030 to 0056 of JP 2012-72348 A can be preferably used. The peeling promoter content in the polarizing plate protective film on a weight basis is preferably 1 ppm-5.0%, and more preferably 1 ppm-2.0%.

(Matting Agent)

The polarizing plate protective film according to the invention preferably contains fine particles as a matting agent. Exemplary fine particles that may be used in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Silicon-containing fine particles are preferred in terms of the reduced turbidity, and silicon dioxide fine particles are particularly preferred. Silicon dioxide fine particles having an average primary particle size of up to 20 nm and an apparent specific gravity of 70 g/L or more are preferred. The apparent specific gravity is preferably 90-200 g/L and more preferably 100-200 g/L. Such fine particles preferably have a larger apparent specific gravity because a dispersion having a higher concentration can be prepared, and the haze and the aggregated particles are improved.

(Barbituric Acid-Based Additive)

The polarizing plate protective film according to the invention preferably uses a compound represented by general formula (A) shown below. This is particularly preferred in a case where the resin constituting the polarizing plate protective film is cellulose acylate. The compound represented by general formula (A) shown below can exhibit a lot of functions and is effective in, for example, improving the durability of the polarizing plate against light, heat or heat and humidity, or improving the hardness of the polarizing plate protective film.

General formula (A)

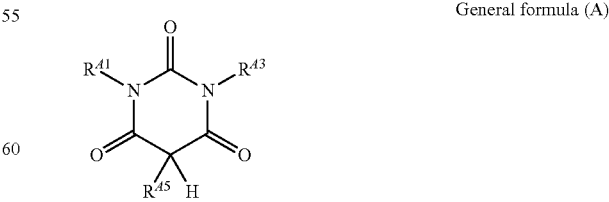

In general formula (A), $R^{41}$ and $R^{43}$ each independently represent a hydrogen atom, an alkyl group, a cycloalkyl group, an alkenyl group or an aromatic group. The alkyl group, the cycloalkyl group, the alkenyl group and the aromatic group may each have a substituent. $R^{45}$ represents a hydrogen atom or a substituent.

The compound represented by general formula (A) includes a tautomer having a structure in which a hydrogen atom in a ring structure is enolized with carbonyl in a neighboring ring structure and a tautomer having an imide-oxidized structure when $R^{41}$ and $R^{43}$ are each a hydrogen atom, or salts thereof.

The alkyl group in each of $R^{41}$, $R^{43}$ and $R^{45}$ preferably contains 1-20 carbon atoms, more preferably 1-10 carbon atoms, even more preferably 1-5 carbon atoms, and particularly preferably 1-3 carbon atoms. Among these, methyl group or ethyl group is preferred. However, in a case where a ring structure-containing group is a substituted alkyl group, the alkyl group preferably contains 7-20 carbon atoms, more preferably 7-12 carbon atoms, and even more preferably 7-10 carbon atoms. The ring structure in the ring structure-containing alkyl group may be an aromatic ring (including a heteroaromatic ring) or an aliphatic ring but an aromatic hydrocarbon ring or an aliphatic ring is preferred. Specific examples of the ring structure-containing alkyl group include benzyl group and phenethyl group, and benzyl group is particularly preferred.

The cycloalkyl group in each of $R^{41}$ and $R^{43}$ preferably contains 3-20 carbon atoms, more preferably 3-10 carbon atoms, even more preferably 4-8 carbon atoms, and particularly preferably 5 or 6 carbon atoms. Specific examples of the cycloalkyl group include cyclopropyl, cyclopentyl, and cyclohexyl. Cyclohexyl is particularly preferred.

The alkenyl group in each of $R^{41}$ and $R^{43}$ preferably contains 2-20 carbon atoms, more preferably 2-10 carbon atoms, and even more preferably 2-5 carbon atoms. Examples thereof include vinyl and allyl.

The aromatic group in each of $R^{41}$ and $R^{43}$ may be an aromatic hydrocarbon group or a heteroaromatic group, but an aromatic hydrocarbon group is preferred.

The aromatic hydrocarbon group preferably contains 6-20 carbon atoms, more preferably 6-16 carbon atoms, and even more preferably 6-12 carbon atoms. Phenyl and naphthyl are preferred aromatic hydrocarbon groups, and phenyl is more preferred.

The heteroaromatic group is preferably a 5- or 6-membered ring, and a benzene ring or a heterocyclic ring may be condensed. Heteroatoms constituting a heterocyclic ring in the heteroaromatic group are preferably nitrogen atom, oxygen atom, and sulfur atom, and the heteroaromatic group preferably contains 0-20 carbon atoms, more preferably 1-16 carbon atoms, and even more preferably 3-12 carbon atoms. Such exemplary heterocyclic rings include a pyrrole ring, a thiophene ring, a furan ring, a pyrazole ring, an oxazole ring, a thiazole ring, a pyridine ring, and an indole ring.

Examples of the substituent in $R^{45}$ include groups illustrated as the substituents S, and the substituent is preferably an alkyl group, a cycloalkyl group, an alkenyl group, an aromatic group, a halogen atom, a formyl group, an acyl group, a cyano group, or a water-soluble group.

The water-soluble group is a group for enhancing the solubility of the compound in water and is an anionic or cationic group, or a group that can be anionized by dissociation (e.g., pKa is preferably 10 or less).

Such exemplary groups include sulfo group or a salt thereof, carboxy group or a salt thereof, phosphoric acid group or a salt thereof, hydroxy group, mercapto group, amino group, onio group (preferably ammonio group), sulfonamide group, acylsulfamoyl group, alkyl- or aryl-sulfonylsulfamoyl group, and a group having an active methine- or methylene structure.

It should be noted that hydroxy group, mercapto group, amino group, sulfonamide group, acylsulfamoyl group, alkyl- or aryl-sulfonylsulfamoyl group, and a group having an active methine- or methylene structure also include those in a salt state.

$R^{45}$ is preferably a hydrogen atom, an alkyl group, a cycloalkyl group, an alkenyl group, an aromatic group, a formyl group, or an acyl group.

In a case where $R^{41}$, $R^{43}$ and $R^{45}$ are each an alkyl group, a cycloalkyl group, an alkenyl group, or an aromatic group, exemplary substituents that these groups may have include groups illustrated as the substituents S. Among these, an alkyl group, a cycloalkyl group, an alkenyl group, an aromatic group, a heterocyclic group, an alkoxy group, an alkylthio group, an alkylsulfonyl group, a halogen atom, a formyl group, an acyl group, a silyl group, and a water-soluble group are preferred, an alkyl group, a cycloalkyl group, an aryl group, a heterocyclic group, an alkoxy group, an alkylthio group, an alkylsulfonyl group, a halogen atom, a formyl group, an acyl group, a silyl group, and a water-soluble group are more preferred, and an alkyl group, a cycloalkyl group, an aryl group, a heterocyclic group, an alkoxy group, an alkylthio group, an alkylsulfonyl group, a halogen atom, a formyl group, an acyl group, a hydroxy group, a sulfo group or a salt thereof, a carboxy group or a salt thereof, a boronic acid group or a salt thereof, a carbamoyl group, a sulfamoyl group, and an onio group (preferably an ammonio group including a quaternary ammonio group) are even more preferred.

The compound represented by general formula (A) that falls within a preferred range is broadly classified into two types although it depends on the intended purpose.

A first preferred embodiment includes a compound composed of a combination of the following substituents.

In such a compound, $R^{41}$, $R^{43}$ and $R^{45}$ are each independently a hydrogen atom, an alkyl group, a cycloalkyl group, an alkenyl group or an aromatic group, and these alkyl, cycloalkyl, alkenyl and aromatic groups may each have a substituent, and the substituent is preferably a compound having a substituent other than the above-described water-soluble group among the substituents S.

The substituent that each of the above-described groups may have is preferably an alkyl group, a cycloalkyl group, an alkenyl group, aromatic group, a heterocyclic group, an alkoxy group, an alkylthio group, an acyl group, a silyl group, or a halogen atom.

Any one of $R^{41}$, $R^{43}$ and $R^{45}$ is preferably a group having a ring structure, and the number of ring structures is preferably 1-6, more preferably 2-6, even more preferably 2-5, and particularly preferably 3-5.

As such a ring, an aliphatic hydrocarbon ring, and an aromatic hydrocarbon ring are preferred, a cyclopentane ring, a cyclohexane ring, a benzene ring, and a naphthalene ring are more preferred, and a cyclohexane ring and a benzene ring are even more preferred.

When $R^{41}$, $R^{43}$ and $R^{45}$ are each a cyclic group, a cycloalkyl group, and an aryl group are preferred. When $R^{41}$, $R^{43}$ and $R^{45}$ are each a group having a ring structure, an exemplary substituent is a group having a cycloalkyl moiety or an aryl moiety among groups illustrated as the substituents S. A group having a cycloalkyl group or an aryl group as the substituent is preferred, a cycloalkyl-substituted alkyl group and an aralkyl group are particularly preferred, and benzyl group is most preferred.

Among these, a cycloalkyl group, an aryl group, and an aralkyl group are preferred as cyclic groups or groups having a ring structure.

The compound according to the first embodiment preferably has a molecular weight of 250-1,200, more preferably 300-800, and particularly preferably 350-600.

By combining substituents and defining the molecular weight in such a preferred range, the compound represented by general formula (A) is less likely to volatilize from the polarizing plate protective film and can be held in the polarizing plate protective film, thus allowing a film with high transparency to be obtained.

A second preferred embodiment includes a compound composed of a combination of the following substituents.

This embodiment makes use of a polar effect and also takes the diffusion properties into account contrary to the first embodiment.

$R^{41}$ and $R^{43}$ are each independently a hydrogen atom, an alkyl group, a cycloalkyl group, an alkenyl group, or an aromatic group, and $R^{45}$ is a hydrogen atom or a substituent, and this embodiment includes 1) a compound in which any one of $R^{41}$, $R^{43}$ and $R^{45}$ is a water-soluble group or a group having a water-soluble group, 2) a compound having a molecular weight of 128 or more but less than 250, and/or 3) a compound in which one or two of $R^{41}$, $R^{43}$ and $R^{45}$ are hydrogen atoms.

The compound according to the second embodiment preferably has a molecular weight of 128-1,200, and more preferably 150-800.

Specific examples of the compound represented by general formula (A) are illustrated below but the present invention is not limited thereto.

Further, compounds described in JP 2011-118135 A, particularly in paragraphs 0030 to 0033, compounds described in JP 2011-126968 A, particularly in paragraphs 0017 to 0025, compounds described in WO 2014/034709, particularly in paragraphs 0024 to 0050, and compounds described in JP 2014-194529 A, particularly in paragraphs 0014 to 0037 are also preferably used in combination with the above-described specific compounds.

In the following, Ph denotes phenyl group, cHex denotes cyclohexyl group, $cC_5H_{11}$ denotes cyclopentyl group, $C_6H_4$ denotes phenylene group, a group in parentheses as in $CH_4$ ($p$-$CH_3$) denotes a substituent bonded to phenyl group, and p-denotes p-position.

Further, * is a bonding arm.

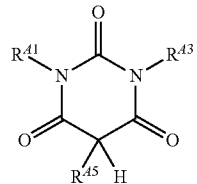

| Compound No. | $R^{41}$ | $R^{43}$ | $R^{45}$ |
| --- | --- | --- | --- |
| A-1 | Ph | CH$_2$Ph | Ph |
| A-2 | Ph | Ph | CH$_2$Ph |
| A-3 | Ph | CH$_2$Ph | CH$_2$Ph |
| A-4 | CH$_2$Ph | CH$_2$Ph | Ph |
| A-5 | CH$_2$Ph | CH$_2$Ph | CH$_2$Ph |
| A-6 | Ph | CH$_2$CH$_2$Ph | Ph |
| A-7 | Ph | CH$_2$CH$_2$Ph | CH$_2$Ph |
| A-8 | C$_6$H$_4$(m-CH$_3$) | C$_6$H$_4$(m-CH$_3$) | CH$_2$Ph |
| A-9 | Ph | CH$_2$Ph | CH$_2$C$_6$H$_4$(p-OCH$_3$) |
| A-10 | Ph | CH$_2$ C$_6$H$_4$(p-CH$_3$) | Ph |
| A-11 | Ph | CH$_2$ C$_6$H$_4$(p-t-Bu) | Ph |
| A-12 | Ph | CH$_2$ C$_6$H$_4$(p-CF$_3$) | CH$_2$ C$_6$H$_4$(p-CH$_3$) |
| A-13 | Ph | cHex | Ph |
| A-14 | Ph | cHex | CH$_2$Ph |
| A-15 | CH$_2$Ph | cHex | Ph |
| A-16 | CH$_2$CH$_2$Ph | cHex | CH$_2$Ph |
| A-17 | CH$_2$Ph | cHex | CH$_2$ C$_6$H$_4$(p-CH$_3$) |
| A-18 | cHex | cHex | Ph |
| A-19 | cHex | cHex | CH$_2$Ph |
| A-20 | CH$_2$Ph | Ph | cHex |
| A-21 | H | CH$_2$Ph | CH$_2$Ph |
| A-22 | H | CHPh$_2$ | CH$_2$ C$_6$H$_4$(p-OCH$_3$) |
| A-23 | H | CH$_2$Ph | CHPh$_2$ |
| A-24 | H | Ph | ![structure] |
| A-25 | H | cHex | CHPh$_2$ |
| A-26 | H | cHex | ![structure] |

-continued

| Compound No. | $R^{A1}$ | $R^{A3}$ | $R^{A5}$ |
|---|---|---|---|
| A-27 | H | CHPh$_2$ | CHPh$_2$ |
| A-28 | Ph | Ph | CHPh$_2$ |
| A-29 | Ph | Ph | 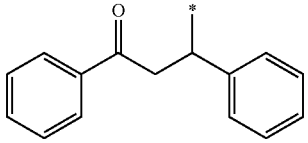 [SMILES: *C(CC(=O)c1ccccc1)c1ccccc1] |
| A-30 | CH$_2$Ph | CH$_2$Ph | cHex |

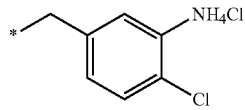

| Compound No. | $R^{A1}$ | $R^{A3}$ | $R^{A5}$ |
|---|---|---|---|
| A-31 | cHex | cHex | cHex |
| A-32 | CH$_2$ C$_6$H$_4$(p-CH$_3$) | CH$_2$ C$_6$H$_4$(p-CH$_3$) | CH$_2$ C$_6$H$_4$(p-CH$_3$) |
| A-33 | C$_6$H$_4$(p-CH$_3$) | CH$_2$ C$_6$H$_4$(p-CH$_3$) | CH$_2$ C$_6$H$_4$(p-CH$_3$) |
| A-34 | C$_6$H$_4$(p-CH$_3$) | CH$_2$ C$_6$H$_4$(p-CH$_3$) | CH$_2$Ph |
| A-35 | C$_6$H$_4$(p-Cl) | CH$_2$Ph | CH$_2$Ph |
| A-36 | C$_6$H$_4$(p-S CH$_3$) | CH$_2$Ph | CH$_2$Ph |
| A-37 | C$_6$H$_4$(p-SO$_2$CH$_3$) | CH$_2$Ph | CH$_2$Ph |
| A-38 | C$_6$H$_4$(p-C$_6$H$_5$) | CH$_2$Ph | CH$_2$Ph |
| A-39 | cC$_5$ H$_{11}$ | CH$_2$Ph | CH$_2$Ph |
| A-40 | cC$_5$ H$_{11}$ | cC$_5$ H$_{11}$ | CH$_2$Ph |
| A-41 | Ph | 4-Pyridyl | CH$_2$Ph |
| A-42 | 2-Pyridyl | CH$_2$Ph | CH$_2$Ph |
| A-43 | Ph | CH$_2$Ph | 2-Pyridyl |
| A-44 | CH$_2$Ph | CH$_2$Ph | 4-Pyridyl |
| A-45 | Ph | CH$_2$Ph | CH$_2$-(3-indolenyl) |
| A-46 | Ph | CH$_2$Ph | CH$_2$-(2-naphthyl) |
| A-47 | Ph | CH$_2$CH$_2$Ph | CH$_2$-(2-naphthyl) |
| A-48 | CH$_2$Ph | CH$_2$Ph | CH$_2$-(2-naphthyl) |
| A-49 | CH$_2$Ph | H | CH$_2$ C$_6$H$_4$(p-Cl) |
| A-50 | Ph | H | CH$_2$Ph |
| A-51 | CH$_2$Ph | H | Ph |

-continued

| Compound No. | $R^{A1}$ | $R^{A3}$ | $R^{A5}$ |
|---|---|---|---|
| A-52 | C$_6$H$_4$(p-CH$_3$) | H | CH$_2$Ph |
| A-53 | Ph | H | Ph |
| A-54 | CH$_2$Ph | H | CH$_2$ C$_6$H$_4$(p-CH$_3$) |
| A-55 | Ph | CH$_2$Ph | n-C$_4$H$_9$ |
| A-56 | n-C$_4$H$_9$ | H | CH$_2$Ph |
| A-57 | H | H | CH$_2$Ph |
| A-58 | CH$_3$ | H | CH$_2$Ph |
| A-59 | CH$_3$ | CH$_3$ | CH$_2$Ph |
| A-60 | H | H | Ph |
| A-61 | CH$_3$ | H | Ph |
| A-62 | CH$_3$ | CH$_3$ | Ph |
| A-63 | H | H | CH$_3$ |
| A-64 | H | H | n-C$_4$H$_9$ |
| A-65 | Ph | CH$_2$Ph | Cl |
| A-66 | Ph | Ph | OH |
| A-67 | H | H | CH$_2$ C$_6$H$_4$(p-OH) |
| A-68 | CH$_3$ | CH$_3$ | CH$_2$ C$_6$H$_4$(p-OH) |
| A-69 | H | H | CH$_2$ C$_6$H$_3$(3,4-OH) |
| A-70 | H | H | CH$_2$ C$_6$H$_4$(p-SO$_3$Na) |

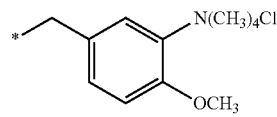

| Compound No. | $R^{A1}$ | $R^{A3}$ | $R^{A5}$ |
|---|---|---|---|
| A-71 | H | H | CH$_2$ C$_6$H$_3$(2,4-SO$_3$Na) |
| A-72 | H | H | CH$_2$ C$_6$H$_4$(p-COOH) |
| A-73 | H | H | CH$_2$ C$_6$H$_4$(p-COONa) |
| A-74 | H | H | CH$_2$ C$_6$H$_4$(p-SO$_2$NH$_2$) |
| A-75 | H | H | 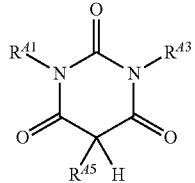 |
| A-76 | H | H |  |

-continued

| Compound No. | $R^{A1}$ | $R^{A3}$ | $R^{A5}$ |
|---|---|---|---|
| A-77 | H | H | 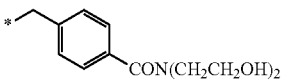 *-CH2-C6H4-CON(CH2CH2OH)2 |
| A-78 | H | H | 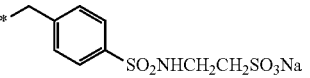 *-CH2-C6H4-SO2NHCH2CH2SO3Na |
| A-79 | H | H |  *-CH2-C6H4-SO2NHCH2CH2OCH2CH2OH |
| A-80 | H | H | 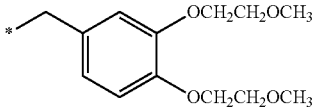 *-CH2-C6H3(OCH2CH2OCH3)2 |
| A-81 | H | C6H4(m-SO2NH2) | CH2 C6H4(p-SO2NH2) |
| A-82 | CH2CH2OCH2CH2OCH3 | CH2CH2OCH2CH2OCH3 | CH2Ph |
| A-83 | H | CH2SO3Na | CH2Ph |
| A-84 | H | H | CH2 C6H3(3,4-F) |
| A-85 | H | C6H3(3,4-F) | CH2 C6H3(2,4-SO3Na) |
| A-86 | H | 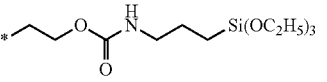 *-CH2CH2-O-C(=O)-NH-CH2CH2CH2-Si(OC2H5)3 | CH2Ph |
| A-87 | H | 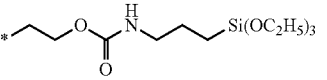 *-CH2CH2-O-C(=O)-NH-CH2CH2CH2-Si(OC2H5)3 | CH2 C6H3(2,4-SO3Na) |
| A-88 | H | CH2CH2CH2SO3Na | CH2 C6H4(p-CHO) |
| A-89 | H | CH2CH2CH2SO3Na | CH2 C6H4(p-COCH3) |
| A-90 | H | CH2 C6H4(p-CHO) | CH2 C6H3(2,4-SO3Na) |
| A-91 | H | CH2 C6H4(p-B(OH)2) | CH2 C6H3(2,4-SO3Na) |
| A-92 | H | H | CH2 C6H3(3,4-F) |
| A-93 | H | CH2Ph | 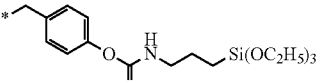 *-CH2-C6H4-O-C(=O)-NH-CH2CH2CH2-Si(OC2H5)3 |
| A-94 | Ph | CH2Ph | CH2 C6H4(p-CHO) |
| A-95 | Ph | CH2Ph | CH2 C6H4(p-COCH3) |

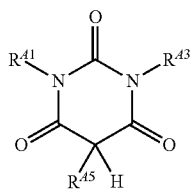

55

| Compound No. | $R^{A1}$ | $R^{A3}$ | $R^{A5}$ |
|---|---|---|---|
| A-96 | Ph | CH2Ph | CH2 C6H4(p-CH(OCH3)2) |
| A-97 | Ph | CH2Ph | CH2 C6H4(p-B(OH)2) |

-continued
| Compound No. | $R^{41}$ | $R^{43}$ | $R^{45}$ |
|---|---|---|---|
| A-98 | Ph | $CH_2Ph$ | 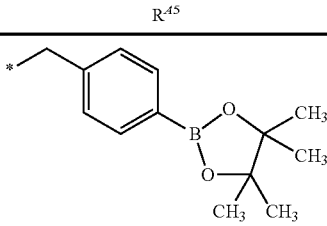 |
| A-99 | Ph | $CH_2Ph$ | 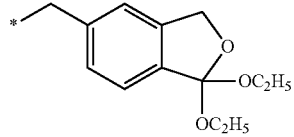 [SMILES: *Cc1ccc2c(c1)COC2(OCC)OCC] |
| A-100 | H | $CH_2 C_6H_4$(p-CHO) | $CH_3$ |
| A-101 | H | $CH_2 C_6H_4$(p-B(OH)$_2$) | $CH_3$ |
| A-102 | H | $CH_2 C_6H_3$(3,4-F) | $CH_3$ |
| A-103 | H | H | CHO |
| A-104 | H | $CH_2 C_6H_4$(p-SO$_3$Na) | CHO |
| A-105 | H | $CH_2 C_6H_4$(p-CHO) | CHO |
| A-106 | $CH_3$ | $CH_3$ | n-$C_4H_9$ |
| A-107 | $CH_2CH_2SO_3Na$ | $CH_2CH_2SO_3Na$ | n-$C_4H_9$ |
| A-108 | H | $CH_2Ph$ | $CH_2Ph$ |
| A-109 | cHex | cHex | n-$C_4H_9$ |
| A-110 | cHex | cHex | c$C_5H_{11}$ |
| A-111 | Ph | Ph | i-$C_3H_7$ |
| A-112 | Ph | Ph | $C_2H_5$ |
| A-113 | Ph | $CH_2Ph$ | $CH_3$ |
| A-114 | H | $CH_2CH_2OCONHPh$ | $CH_2Ph$ |
| A-115 | $CH_2COOCH_3$ | $CH_2COOCH_3$ | $CH_2Ph$ |
A-201
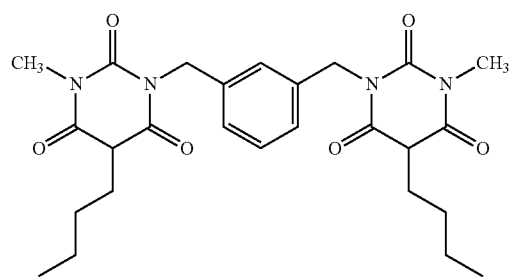
A-202
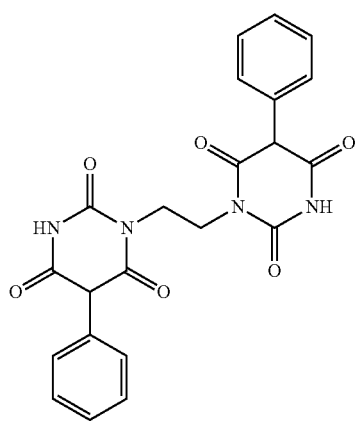

-continued
A-203
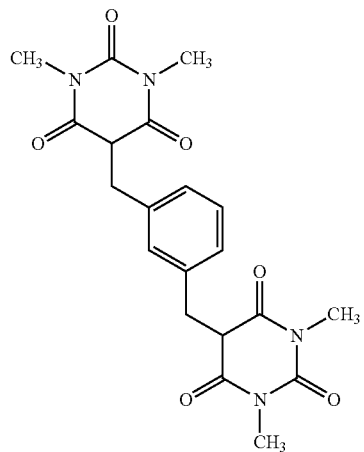
A-204
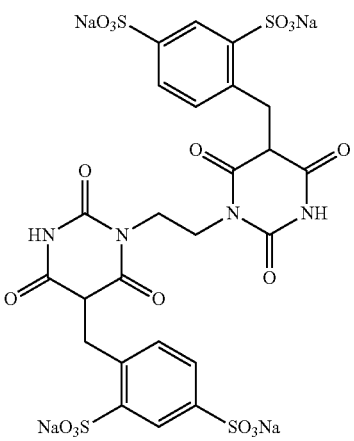
A-205
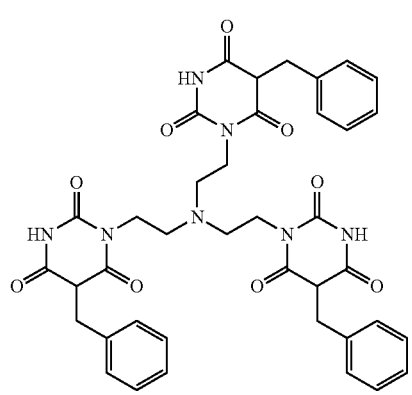
A-206
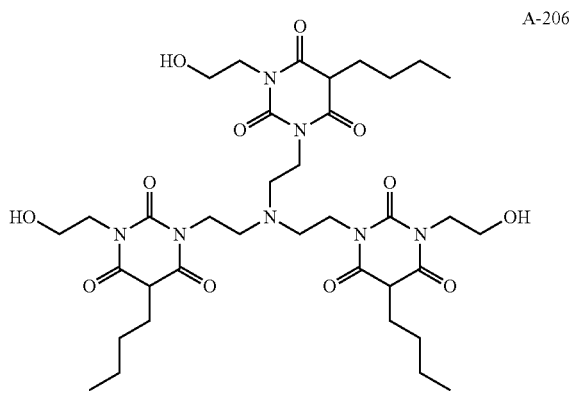
A-207
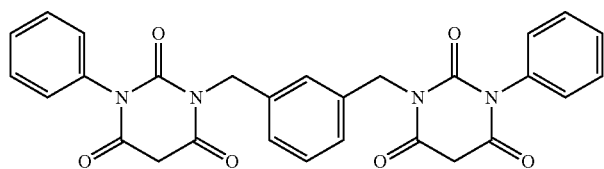
A-208
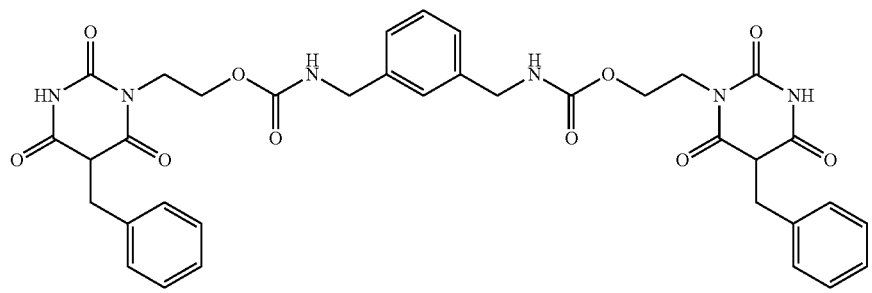
A-209
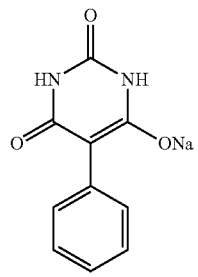
A-210
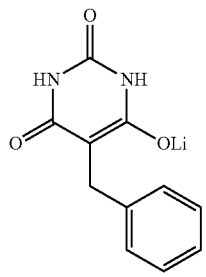

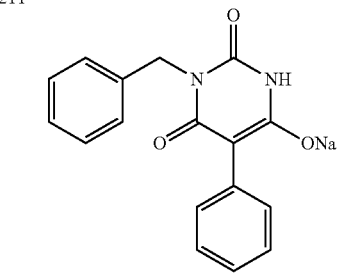

A-211

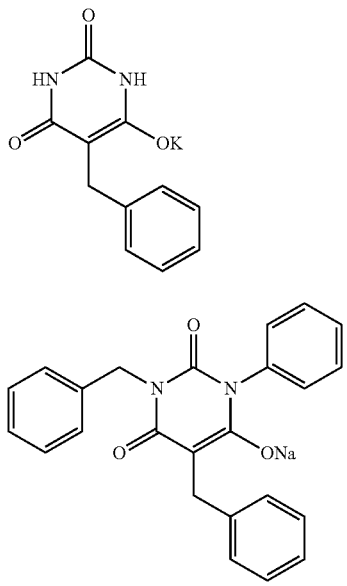

A-212

A-213

It is known that the compound represented by general formula (A) can be synthesized using a barbituric acid synthesis method which involves condensation of a urea derivative with a malonic acid derivative. Barbituric acid containing two substituents on nitrogen atoms is obtained by heating an N,N'-disubstituted urea and malonic acid chloride or by heating malonic acid and an activating agent such as acetic anhydride in combination. For example, methods described in Journal of the American Chemical Society, vol. 61, page 1015 (1939), Journal of Medicinal Chemistry, vol. 54, page 2409 (2011), Tetrahedron Letters, vol. 40, page 8029 (1999), and WO 2007/150011 and the like can be preferably used.

Further, the malonic acid for use in the condensation may be unsubstituted or have a substituent. The compound represented by general formula (A) can be synthesized by constructing barbituric acid with the use of malonic acid having a substituent corresponding to $R^{45}$. Alternatively, 5-unsubstituted barbituric acid is obtained by condensing unsubstituted malonic acid with a urea derivative. So, this barbituric acid may be modified to synthesize the compound represented by general formula (A).

As 5-position modification methods, a nucleophilic substitution reaction with an alkyl halide and an addition reaction such as a Michael addition reaction can be used. A method which involves dehydration condensation with an aldehyde or a ketone to produce an alkylidene or arylidene compound and then reducing double bonds can also be preferably used. For example, a reduction method using zinc is described in Tetrahedron Letters, vol. 44, page 2203 (2003); a reduction method using catalytic reduction is described in Tetrahedron Letters, vol. 42, page 4103 (2001) and Journal of the American Chemical Society, vol. 119, page 12849 (1997); and a reduction method using NaBH$_4$ is described in Tetrahedron Letters, vol. 28, page 4173 (1987). These are all synthesis methods that can be preferably used in a case where an aralkyl group is present at the 5-position or a case where a cycloalkyl group is present at the 5-position.

Methods of synthesizing the compound represented by general formula (A) are not limited to the above-described methods.

The amount of the compound represented by general formula (A) contained in the polarizing plate protective film is not particularly limited, and is preferably 0.1-20 parts by weight, more preferably 0.2-15 parts by weight, and particularly preferably 0.3-10 parts by weight with respect to 100 parts by weight of the resin constituting the polarizing plate protective film.

By adjusting the amount of the compound represented by general formula (A) to be added within the above-described range, the water vapor permeability can be effectively reduced and haze is prevented from occurring.

(Amide, Urethane, and Ureido-Based Additives)

The polarizing plate protective film according to the invention also preferably uses a compound represented by general formula (B-I) shown below or a compound represented by general formula (B-II) to be described later. The compound represented by general formula (B-I) shown below or the compound represented by general formula (B-II) to be described later has the effect of increasing the film hardness and the effect of minimizing performance deterioration of the polarizer with time under heat and humidity, and is preferred. This is particularly preferred in a case where the resin constituting the polarizing plate protective film is cellulose acylate.

General formula (B-I)

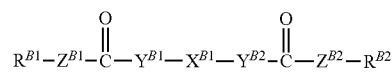

In general formula (B-I), $R^{B1}$ and $R^{B2}$ each independently represent an alkyl group containing 1-20 carbon atoms or an aryl group containing 6-20 carbon atoms. $Z^{B1}$ and $Z^{B2}$ each independently represent a single bond, —O— or —N($R^{Ba}$)—, where $R^{Ba}$ represents a hydrogen atom or an alkyl group containing 1-20 carbon atoms. $R^{Ba}$ and $R^{B1}$ or $R^{B2}$ may be taken together to form a ring. $X^{B1}$ represents a divalent linking group, and is preferably an alkylene group containing 1-6 carbon atoms, a cycloalkylene group containing 5-20 carbon atoms, an arylene group containing 6-20 carbon atoms, s-triazine-2,4,6-trione-1,3-diyl or a group obtained by combining any of these groups. $Y^{B1}$ and $Y^{B2}$ each independently represent —NH— or —O—.

The alkyl groups and the aryl groups in $R^{B1}$ and $R^{B2}$ are preferably the alkyl groups and the aryl groups in $R^{A1}$, $R^{A3}$ and $R^{A5}$ in general formula (A).

Each of $R^{B1}$, $R^{B2}$, $X^{B1}$ and $R^{Ba}$ groups may further have a substituent. Examples of such a substituent include a group of substituents with which each of $R^{A1}$, $R^{A3}$ and $R^{A5}$ groups in general formula (A) may be further substituted; carbamoyloxy groups (including alkylcarbamoyloxy groups and arylcarbamoyloxy groups, and preferably containing 2-20 carbon atoms, as exemplified by N-methylcarbamoyloxy, N,N-dimethylcarbamoyloxy, N-phenylcarbamoyloxy, and N-methyl-N-phenylcarbamoyloxy); carbamoylamino groups (including alkylcarbamoylamino groups, and arylcarbamoylamino groups, and preferably containing 2-20 carbon atoms, as exemplified by N-methylcarbamoylamino, N,N-dimethylcarbamoylamino, N-phenylcarbamoylamino, and N-methyl-N-phenylcarbamoylamino); alkoxycarbonylamino groups (preferably containing 2-20 carbon atoms, as exemplified by methoxycarbonylamino, ethoxycarbonylamino, and 2-ethylhexyloxycarbonylamino); and aryloxycarbonylamino groups (preferably containing 7-20 carbon atoms, as exemplified by phenoxycarbonylamino and naphthoxycarbonylamino).

Above all, the substituent with which each of $R^{B1}$, $R^{B2}$, $X^{B1}$, and $R^{Ba}$ groups may be substituted is preferably an alkyl group, a cycloalkyl group, an aryl group, an alkoxy group, an aryloxy group, a hydroxy group, a cyano group, a carbamoyl group, an acylamino group, an acyl group, an acyloxy group, a carbamoyloxy group, a carbamoylamino group, an alkoxycarbonylamino group, or an aryloxycarbonylamino group.

Particularly when $R^{B2}$ is an alkyl group, the alkyl group is preferably substituted with a carbamoyl group, an acylamino group, an acyl group, an acyloxy group, a carbamoyloxy group, a carbamoylamino group, an alkoxycarbonylamino group, or an aryloxycarbonylamino group.

$X^{B1}$ is preferably a group represented by any of X-1 to X-8 shown below.

In the formulas, * represents a position of bonding to $Y^{B1}$ or $Y^{B2}$ in —$Y^{B1}$—C(=O)— or —$Y^{B2}$—C(=O)—.

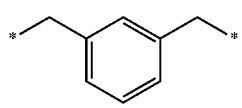

X-1

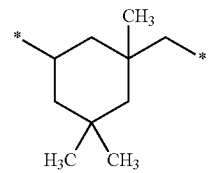

X-2

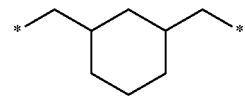

X-3

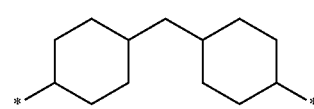

X-4

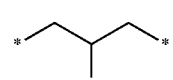

X-5

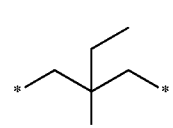

X-6

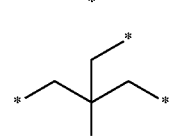

X-7

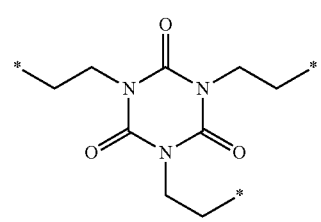

X-8

$R^{Ba}$ is preferably a hydrogen atom or an alkyl group containing 1-8 carbon atoms, more preferably a hydrogen atom or an alkyl group containing 1-3 carbon atoms, and even more preferably a hydrogen atom.

$R^{Ba}$ and $R^{B1}$ or $R^{B2}$ are taken together to form preferably a 5- or 6-membered ring, and exemplary rings include a pyrrolidine ring, a piperidine ring, a piperazine ring, a morpholine ring, and a thiomorpholine ring.

$Y^{B1}$ and $Y^{B2}$ are each preferably —NH—.

$Z^{B1}$ and $Z^{B2}$ are each preferably —O—.

Specific examples of the compound represented by general formula (B-I) are illustrated below but the present invention is not limited thereto.

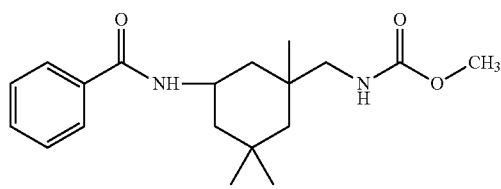

B-1

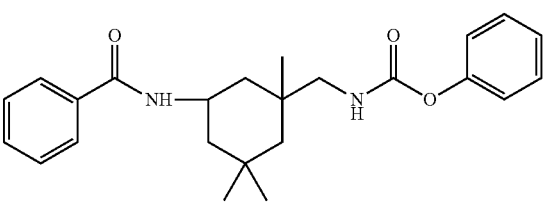

B-2

-continued

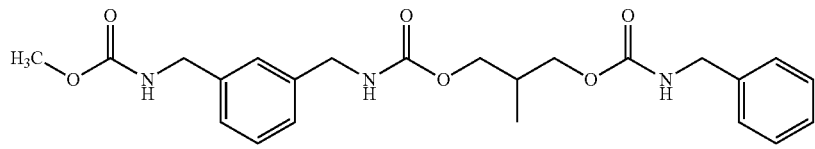
B-19
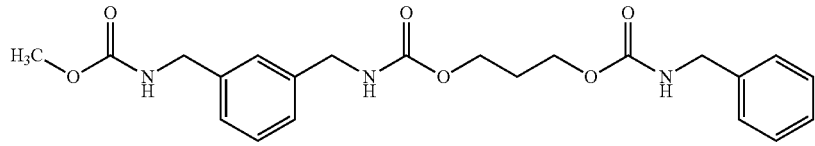
B-20
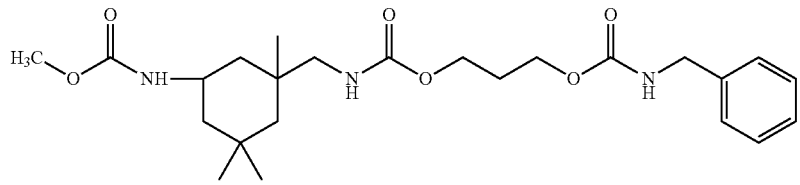
B-21
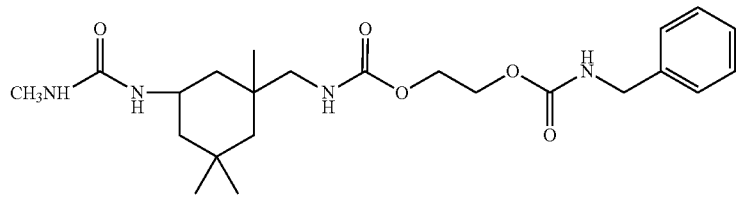
B-22
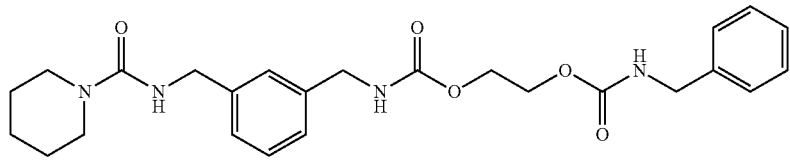
B-23
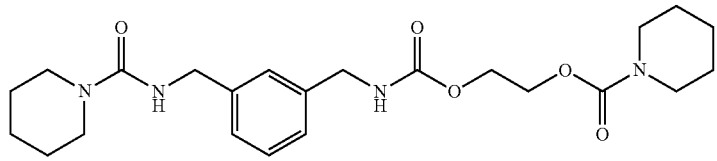
B-24
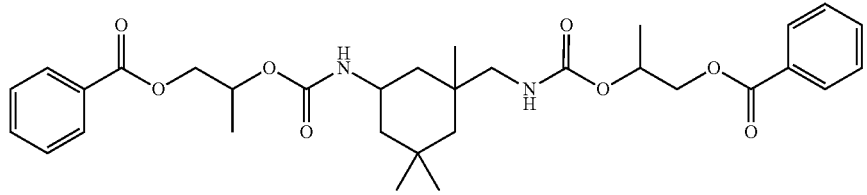
B-25
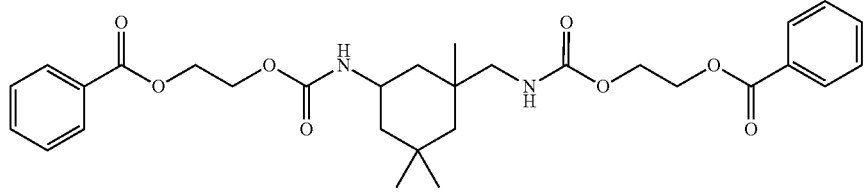
B-26

-continued
B-27
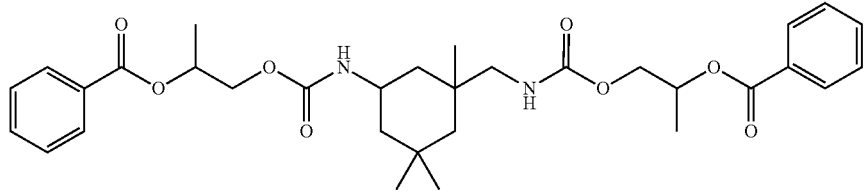
B-28
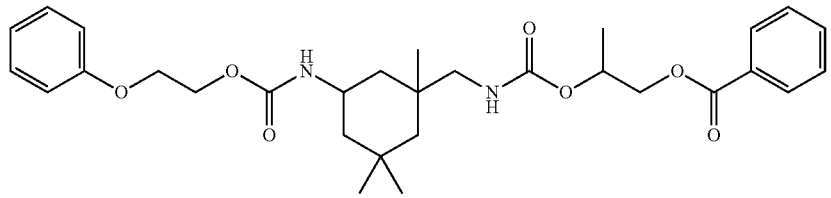
B-29
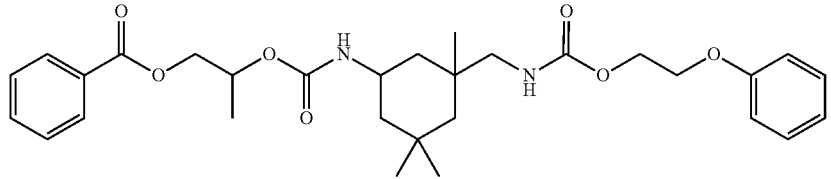
B-30
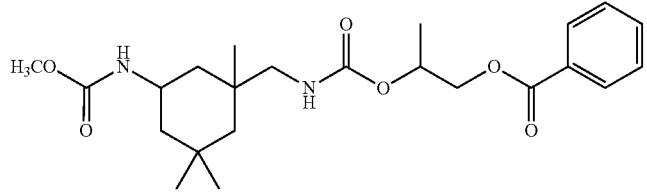
B-31
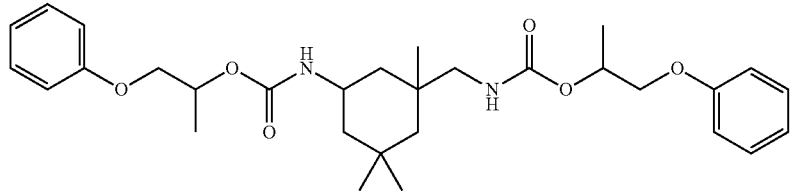
B-32    B-33
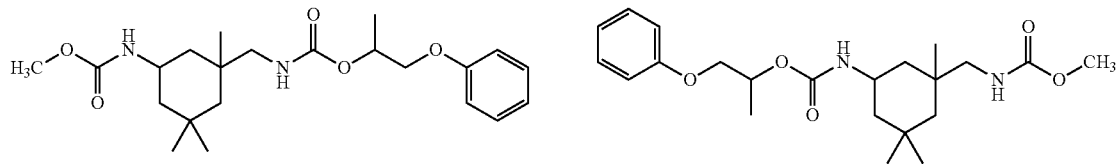
B-34
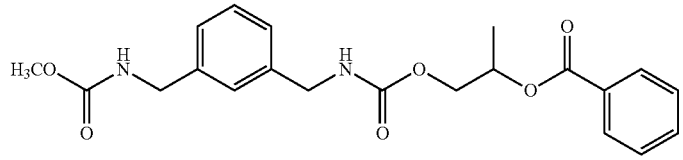
B-35
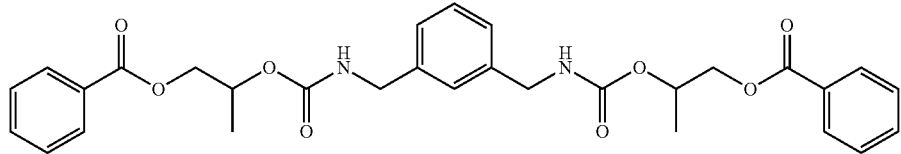

-continued
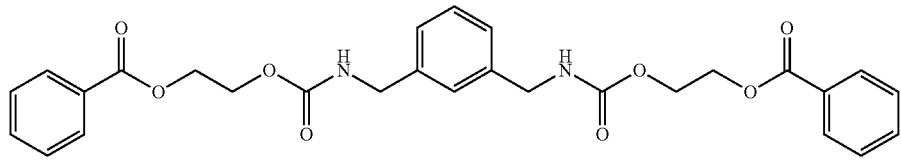
B-36
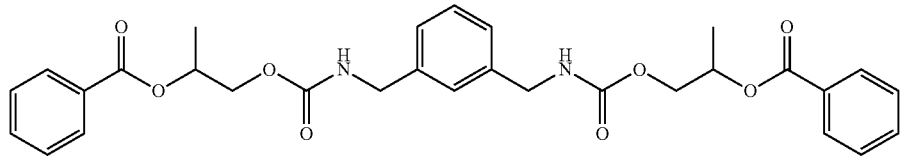
B-37
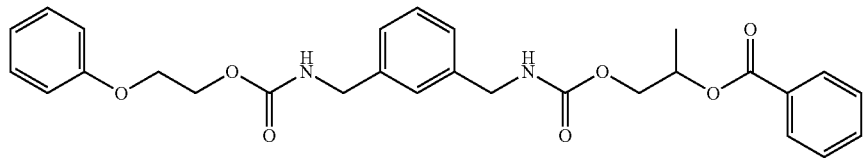
B-38
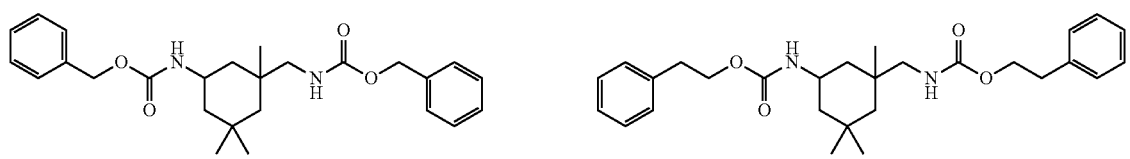
B-39   B-40
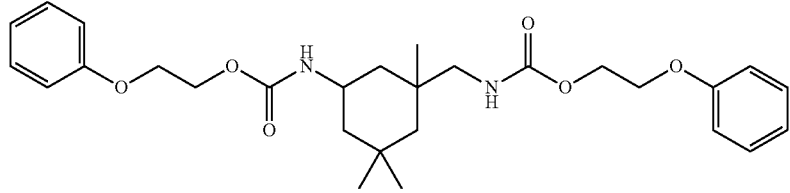
B-41
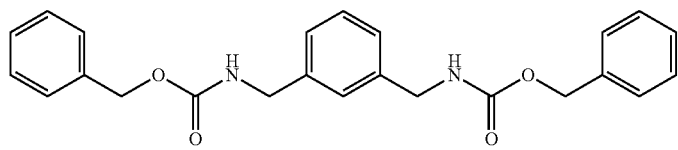
B-42
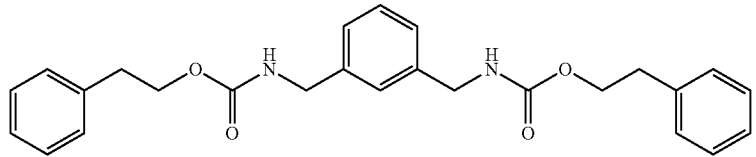
B-43
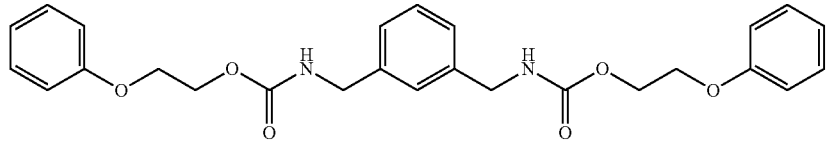
B-44
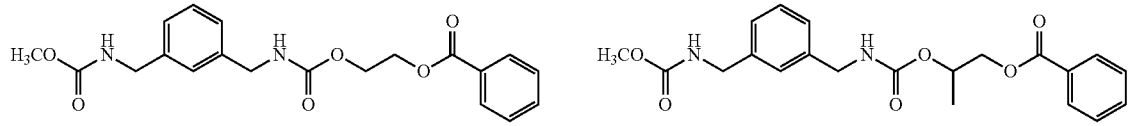
B-45   B-46

-continued
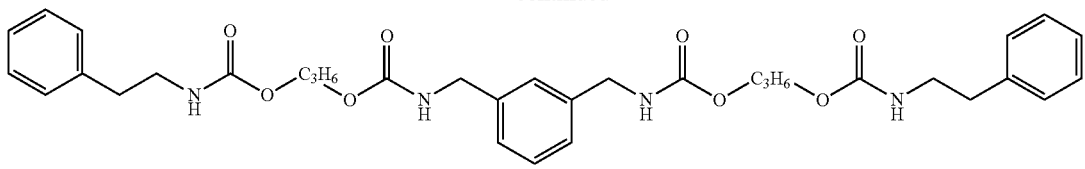
B-48
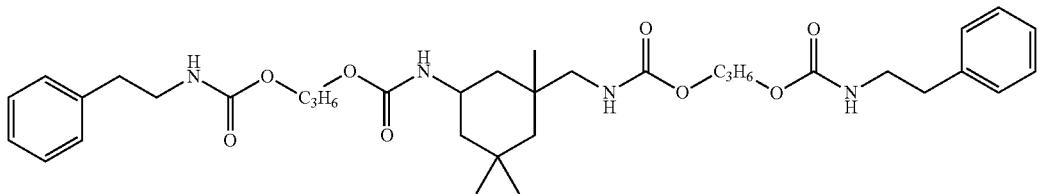
B-49
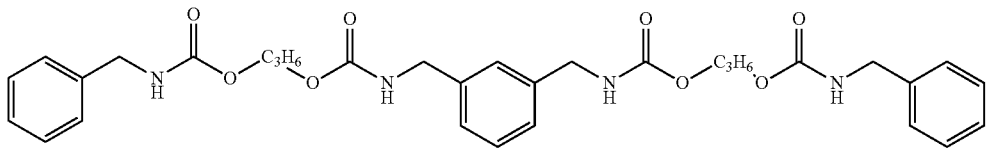
B-50
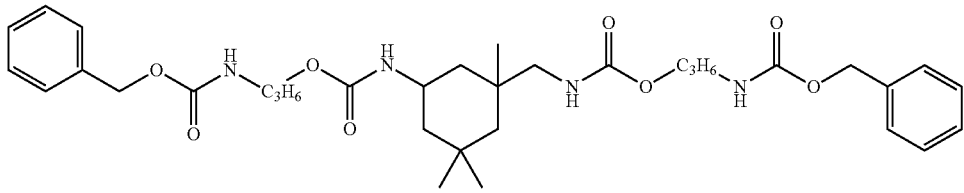
B-51
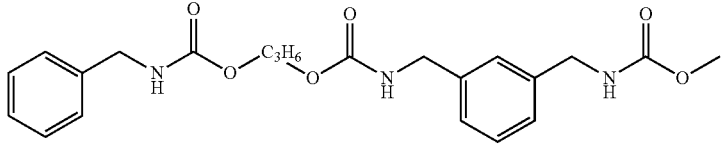
B-52
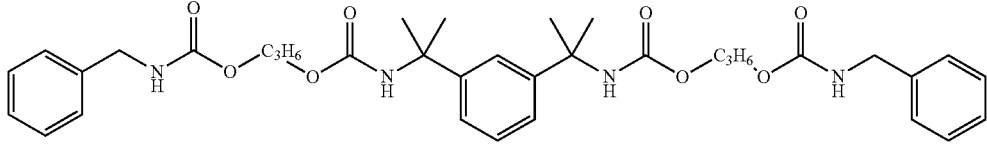
B-53
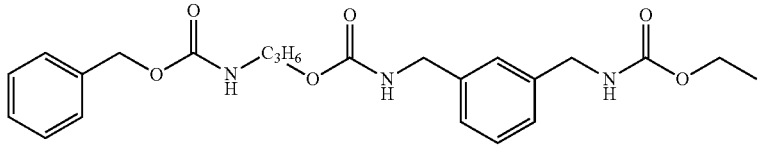
B-54
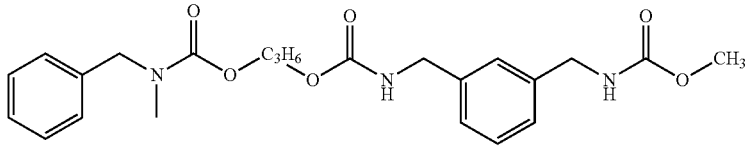
B-55
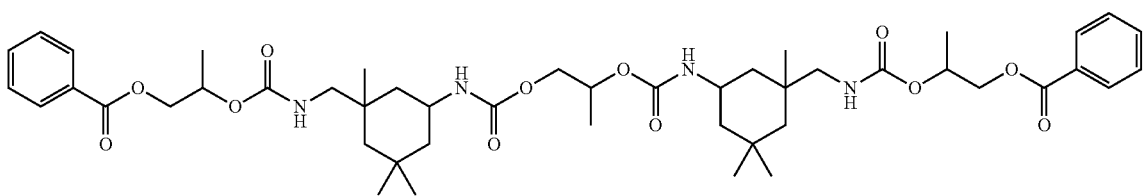

-continued
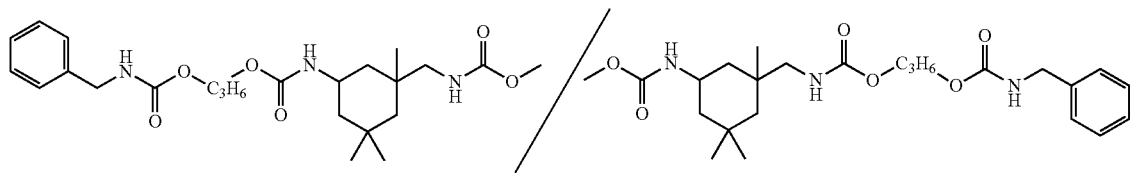
B-56 (Mixture)
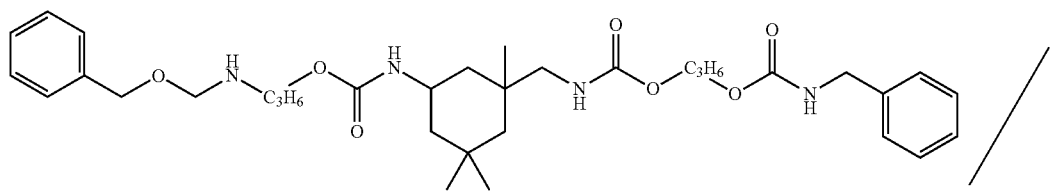
B-57 (Mixture)
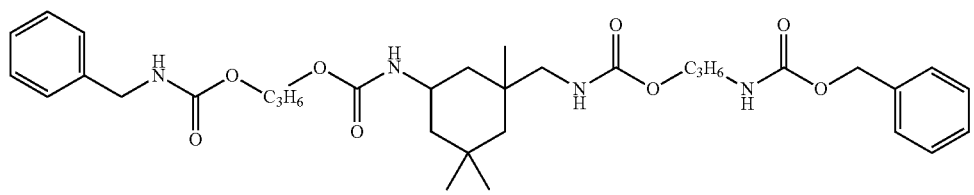
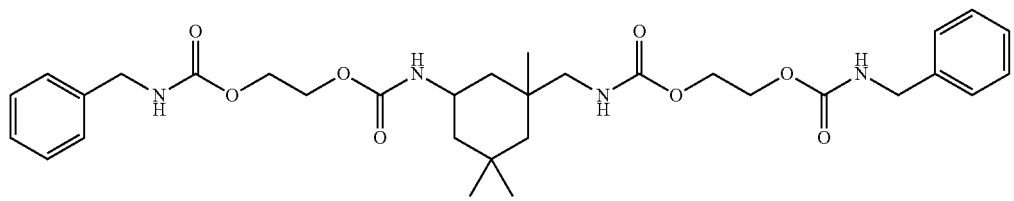
B-58
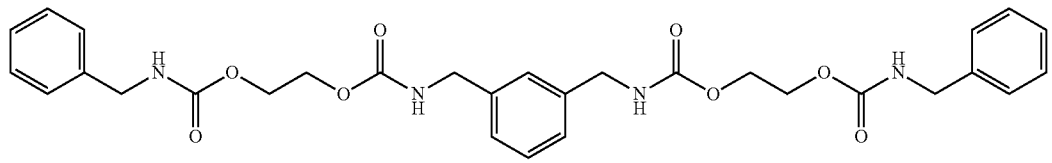
B-59
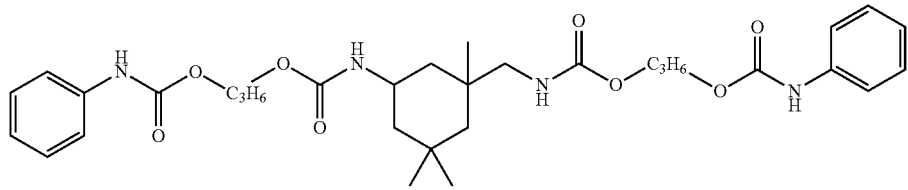
B-60
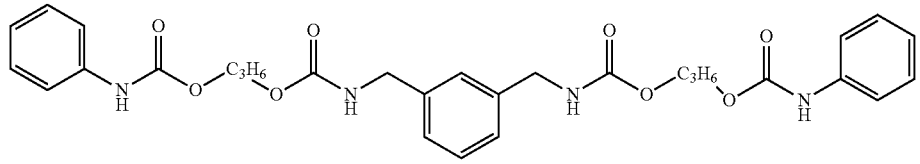
B-61
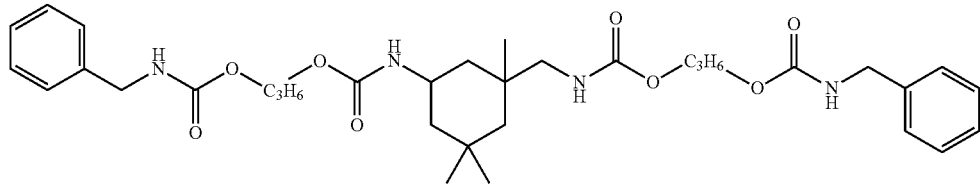
B-62

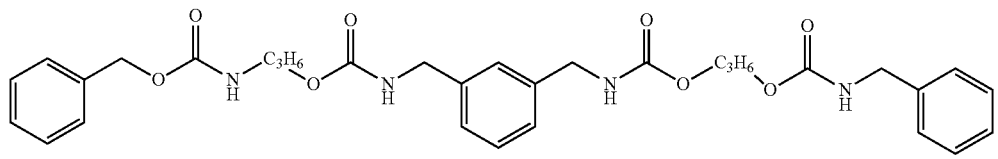
B-63
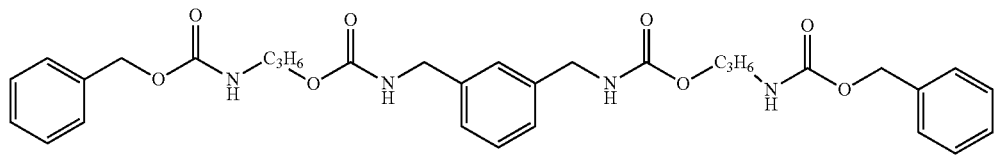
B-64
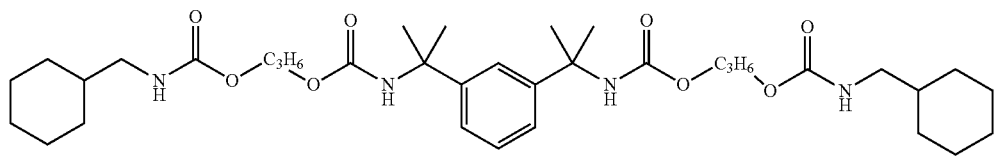
B-65
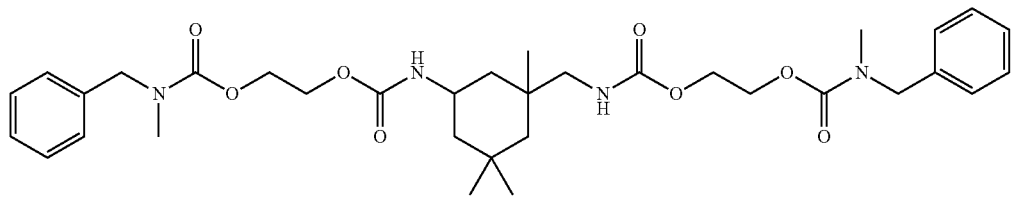
B-66
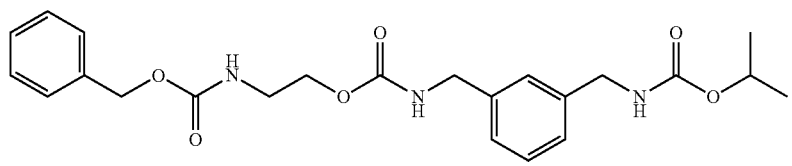
B-67
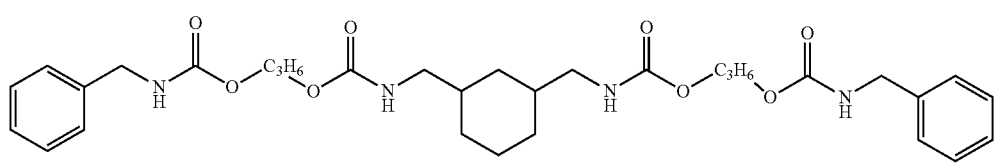
B-68
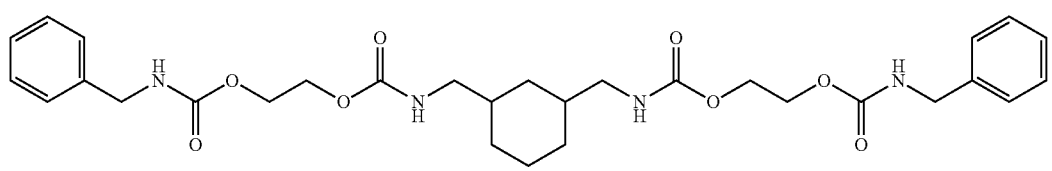
B-69
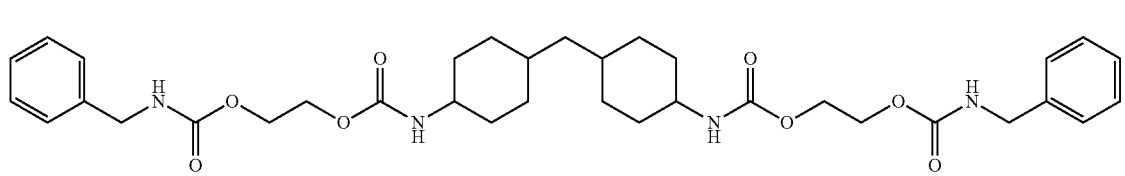
B-70
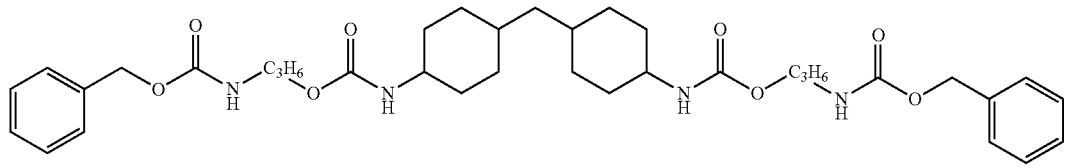
B-71

-continued
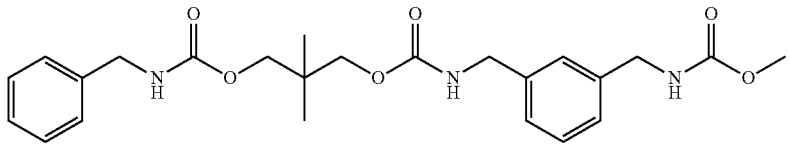
B-72
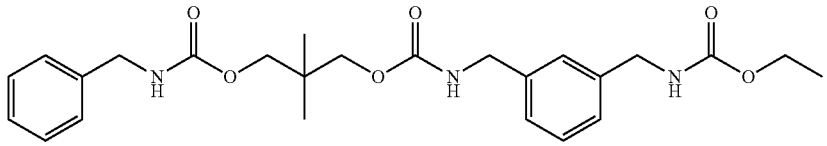
B-73
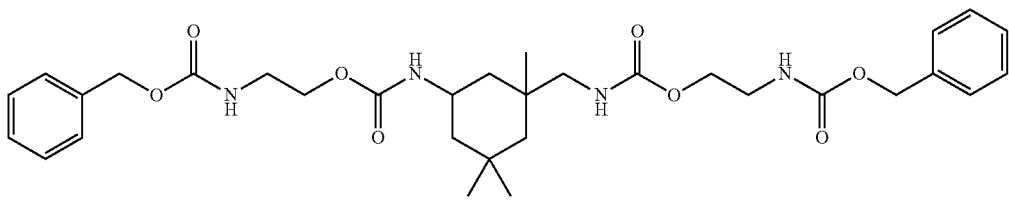
B-74
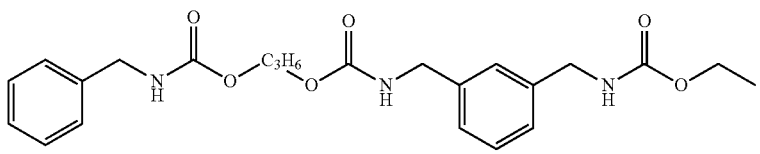
B-75
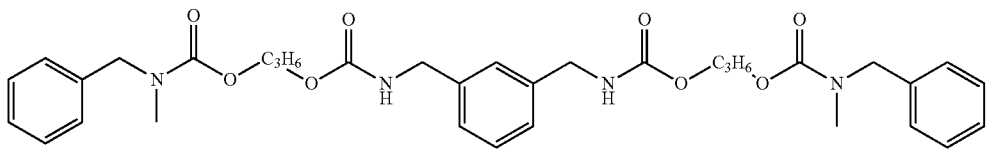
B-76
B-77 (Mixture)
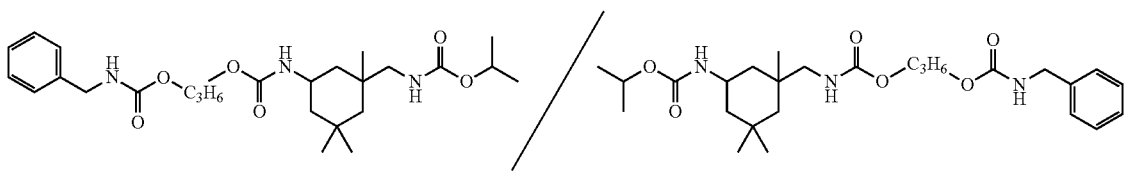
B-78 (Mixture)
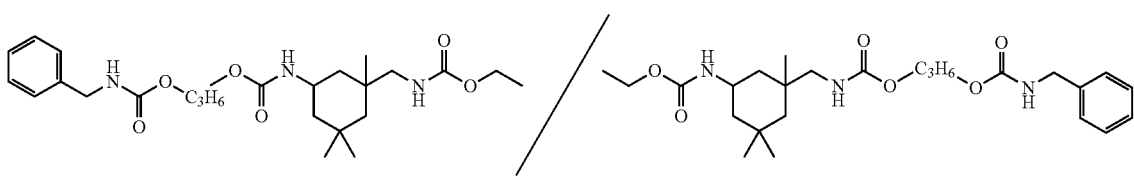
B-79 (Mixture)
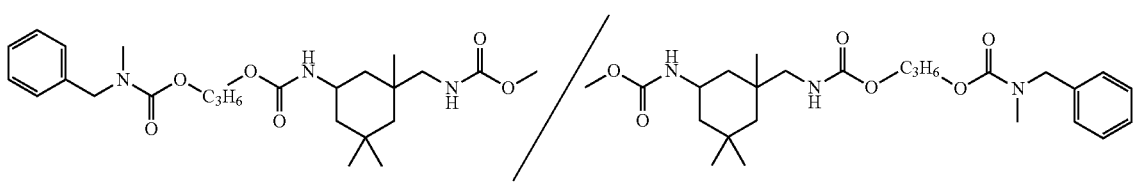

B-80 (Mixture)
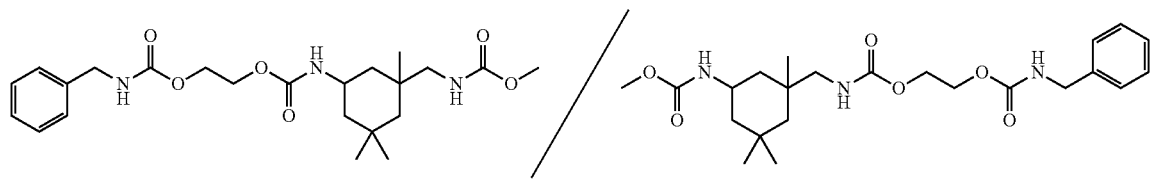
B-81
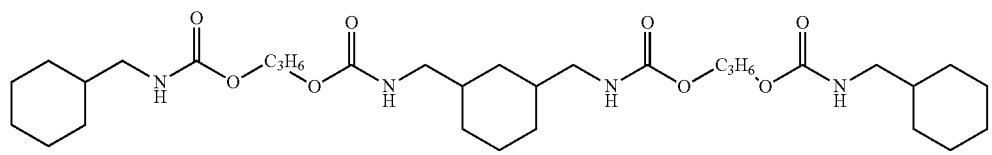
B-82
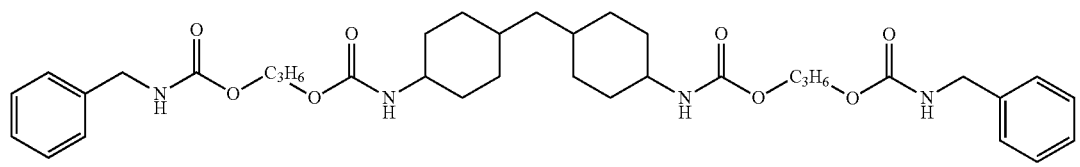
B-83
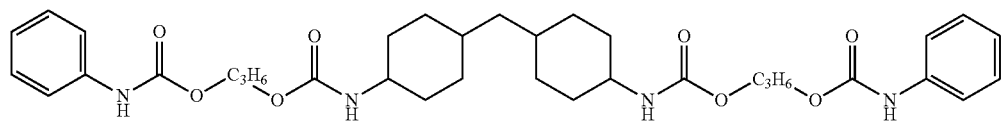
B-84
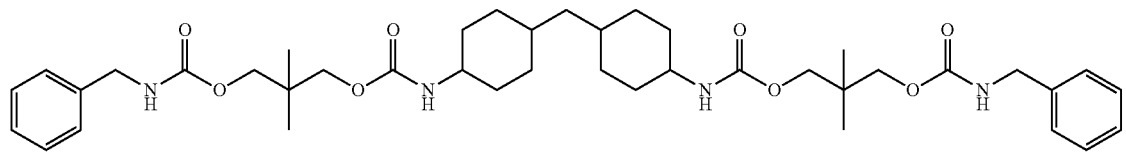
B-85
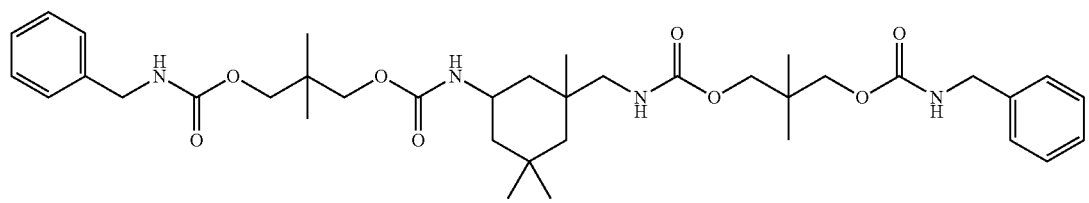
B-86
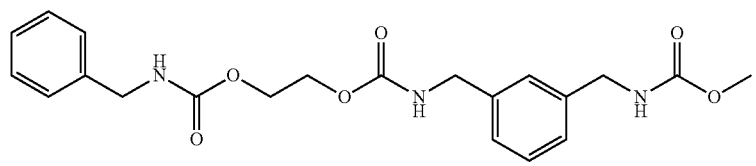
B-87
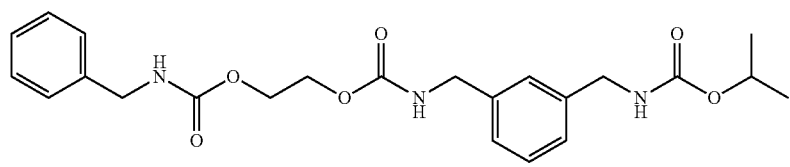
B-88
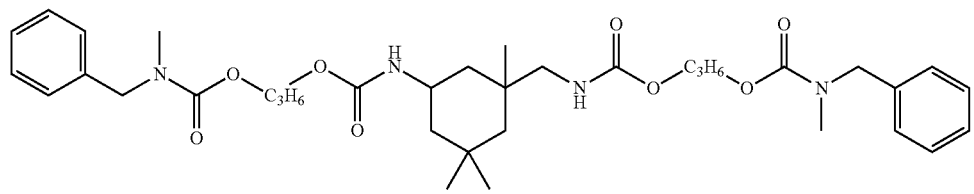

-continued
B-89
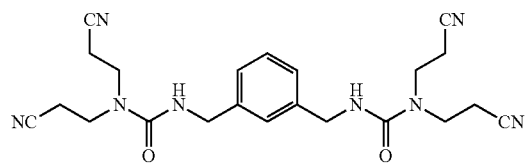
B-90
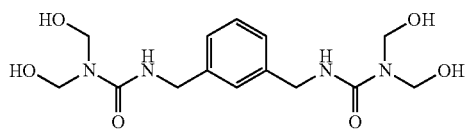
B-91
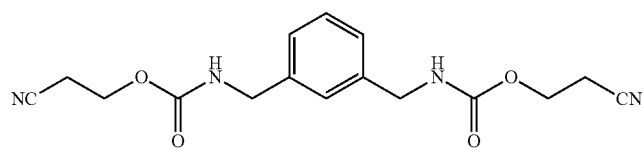
B-92
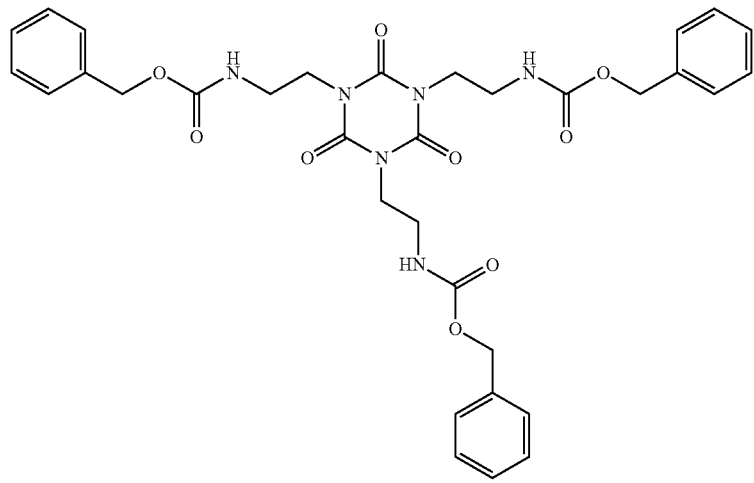
B-93
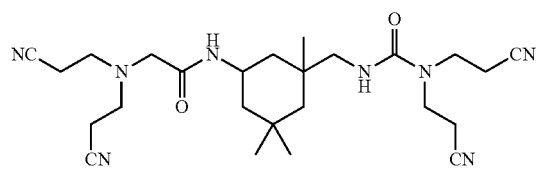
B-94
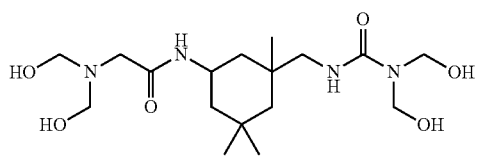
B-95
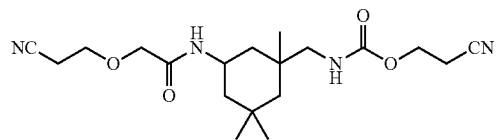
B-96
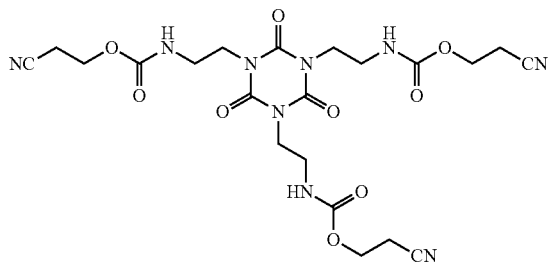

-continued
B-97
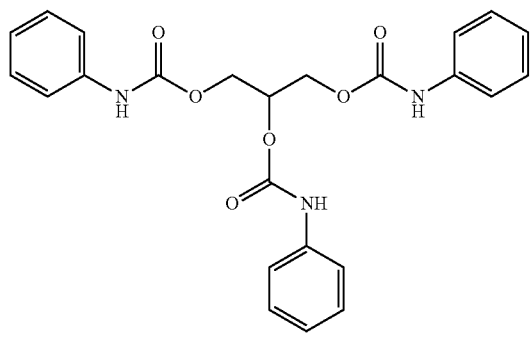
B-98
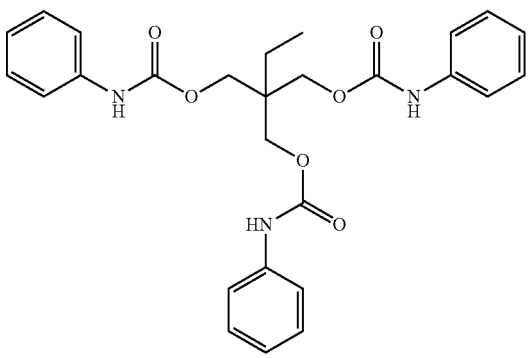
B-99
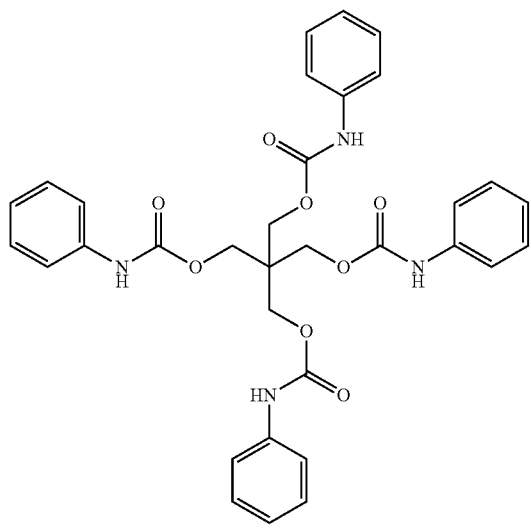
B-100
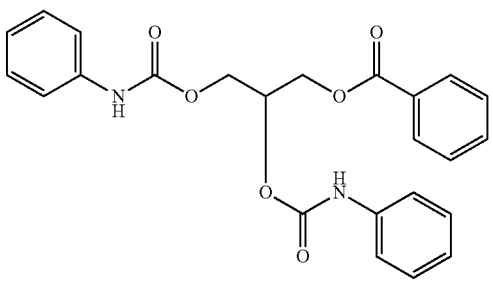
B-101
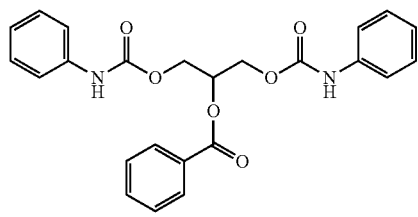
B-102
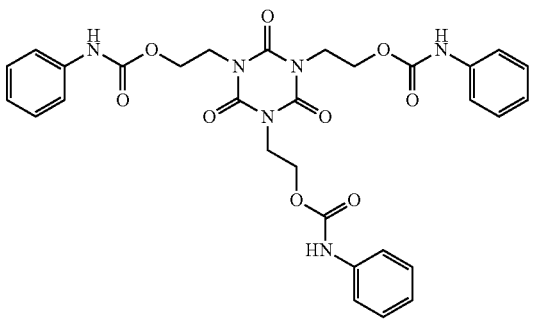
B-103
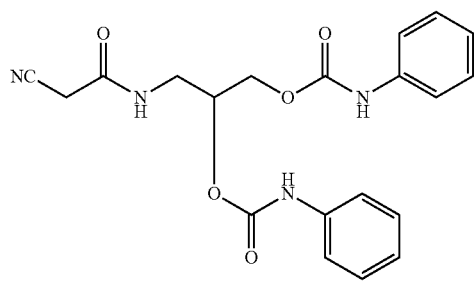

-continued
B-104
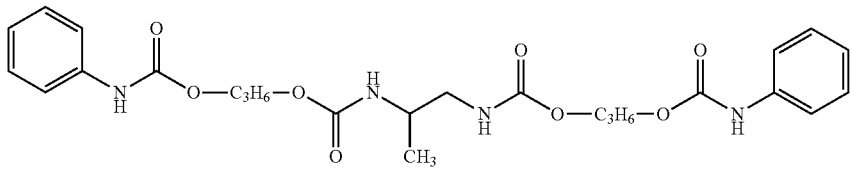
B-105
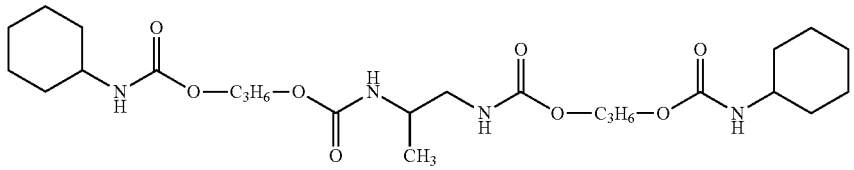
B-106
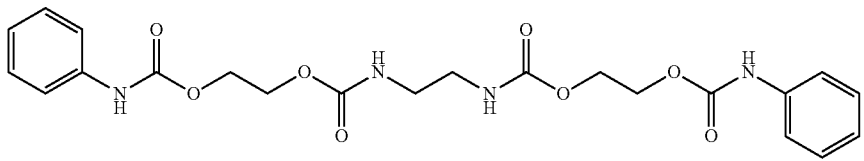
B-107
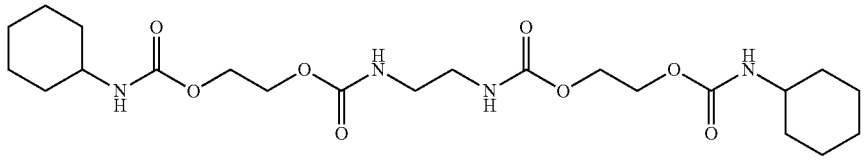
B-108
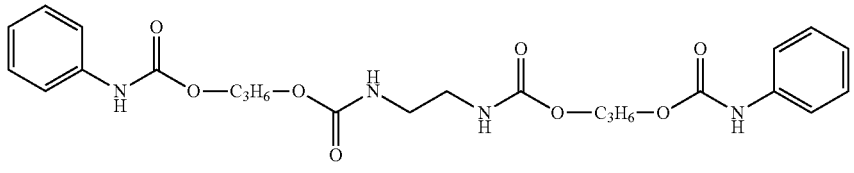
B-109
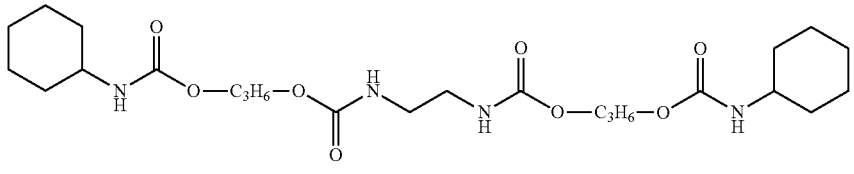
B-110
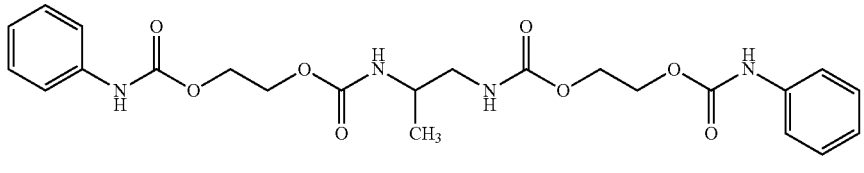
B-111
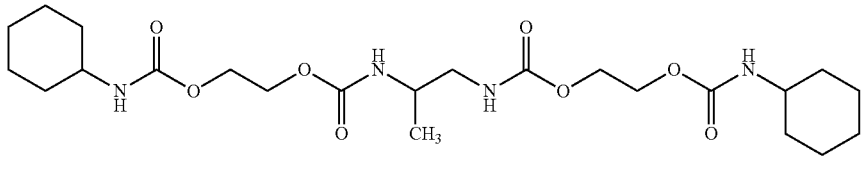
B-112
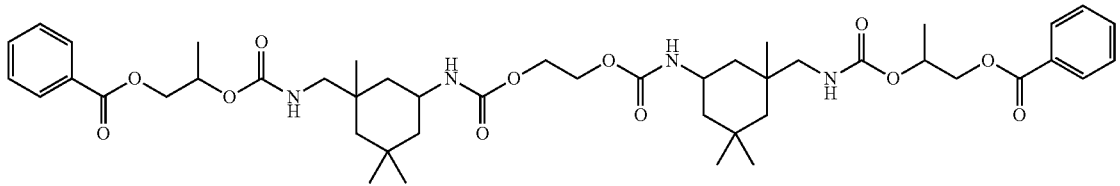

The compound represented by general formula (B-I) can be manufactured by a known method.

For example, the compound represented by general formula (B-I) can be obtained by an addition reaction of an alcohol to an alkyl or aryl isocyanate or a condensation reaction of an amine with a carbonate.

A catalyst is also preferably used in the addition reaction of an alcohol to an alkyl or aryl isocyanate. Exemplary catalysts that may be used include conventionally known urethanation catalysts such as amines, organic acid salts or chelate compounds of metals such as zinc and tin, and organic compounds of metals such as zinc, tin and bismuth. As the urethanation catalysts, for example, dibutyltin dilaurate and dibutyltin diacetate are preferably used.

The compound represented by general formula (B-I) can also be synthesized by acylation of a dihydric alcohol or a divalent amine compound.

According to the invention, not only the above-described compound represented by general formula (B-I) but also the compound represented by general formula (B-II) shown below is also preferred.

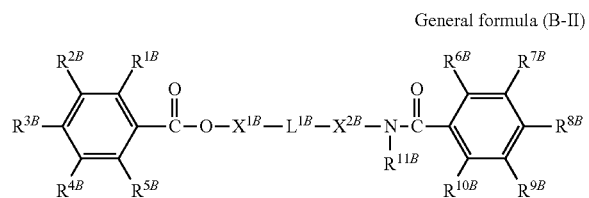

General formula (B-II)

In general formula (B-II), $R^{1B}$ to $R^{7B}$ and $R^{9B}$ to $R^{11B}$ each independently represent a hydrogen atom or a substituent, $R^{8B}$ represents a hydrogen atom or a non-conjugated substituent, $X^{1B}$ and $X^{2B}$ each independently represent a single bond or an aliphatic linking group, and $L^{1B}$ represents a single bond, $-N(R^{12B})-$, or $-C(R^{13B})(R^{14B})-$, where $R^{12B}$ to $R^{14B}$ each independently represent a hydrogen atom or a substituent.

The compound represented by general formula (B-II) is a compound represented by general formula (I) that is described in JP 2013-127058 A and $R^{1B}$ to $R^{14B}$, $X^{1B}$, $X^{2B}$, and $L^{1B}$ as described above can be replaced by their corresponding $R^1$ to $R^{14}$, $X^1$, $X^2$, and L, respectively. Through such replacement, paragraphs 0094 to 0116 of JP 2013-127058 A can be preferably incorporated herein by reference.

As in JP 2013-127058 A, illustrative compounds 1 to 31 described in paragraphs 0112 to 0115 are preferred compounds also in the present invention.

The amount of the compound represented by general formula (B-I) or (B-II) contained in the polarizing plate protective film is not particularly limited, and is preferably 2-20 parts by weight, and more preferably 5-15 parts by weight with respect to 100 parts by weight of the resin constituting the polarizing plate protective film.

(Phthalic Acid Ester Oligomer-Based Additive)

The polarizing plate protective film according to the invention also preferably uses a compound represented by general formula (E) shown below. The compound represented by general formula (E) shown below has the effect of increasing the film hardness and the effect of minimizing performance deterioration of the polarizer with time under heat and humidity, and is preferred. This is particularly preferred in a case where the resin constituting the polarizing plate protective film is cellulose acylate.

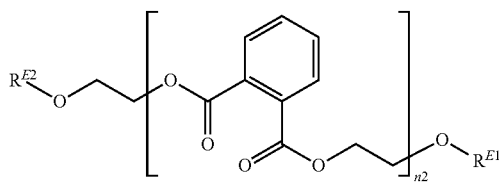

General formula (E)

In general formula (E), $R^{E1}$ and $R^{E2}$ each independently represent a hydrogen atom, an alkyl group, a cycloalkyl group, an aryl group or an acyl group. n2 represents a number of 2 or more.

The definitions of the alkyl group, the cycloalkyl group, and the aryl group are the same as those of the alkyl group, the cycloalkyl group, and the aryl group in each of $R^{A1}$ and $R^{A3}$ in general formula (A), and the preferred ranges are also the same.

The acyl group represents a formyl group, an alkylcarbonyl group, an alkenylcarbonyl group, a cycloalkylcarbonyl group, an arylcarbonyl group, or a heterocyclic carbonyl group, and the alkylcarbonyl group preferably contains 2-20 carbon atoms, the alkenylcarbonyl group preferably contains 3-20 carbon atoms, the cycloalkylcarbonyl group preferably contains 4-20 carbon atoms, the arylcarbonyl group preferably contains 7-20 carbon atoms, and the heterocyclic carbonyl group preferably contains 1-20 carbon atoms.

Examples of these groups include acetyl, propionyl, pivaloyl, myristoyl, acryloyl, methacryloyl, cyclopropylcarbonyl, cyclopentylcarbonyl, cyclohexylcarbonyl, benzoyl, naphthoyl, and nicotinoyl.

$R^{E1}$ and $R^{E2}$ are each preferably an acyl group, and more preferably an alkylcarbonyl group.

n2 represents a number of 2 or more, preferably 2-15, more preferably 2-10, even more preferably 3-10, and still even more preferably 3-8. A mixture in which n2s are different integers is also included, and in this case, n2 is usually not an integer but a number with a decimal point.

Specific examples of the compound represented by general formula (E) are illustrated below but the present invention is not limited thereto.

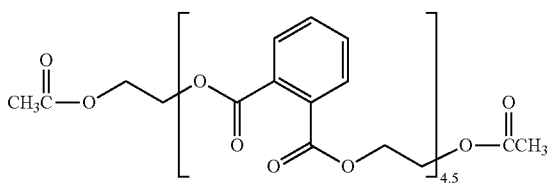

E-1

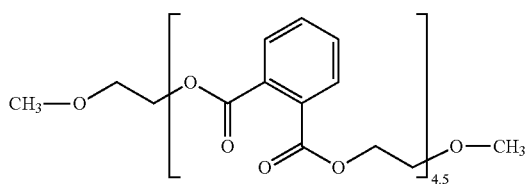

E-2

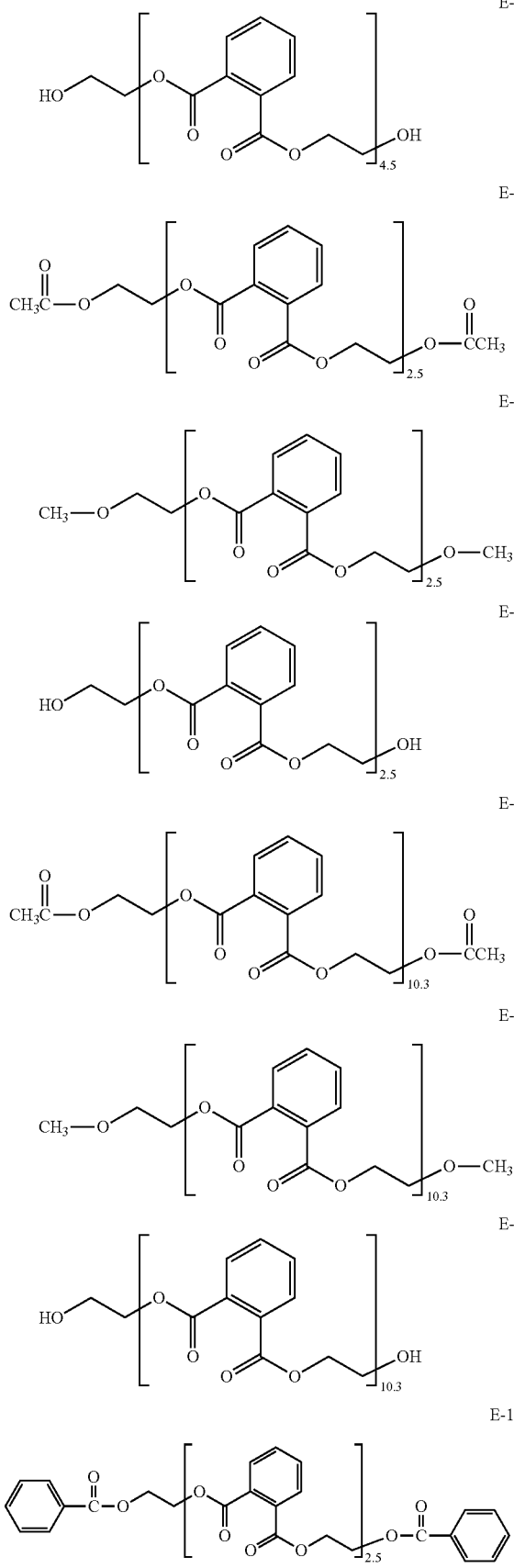
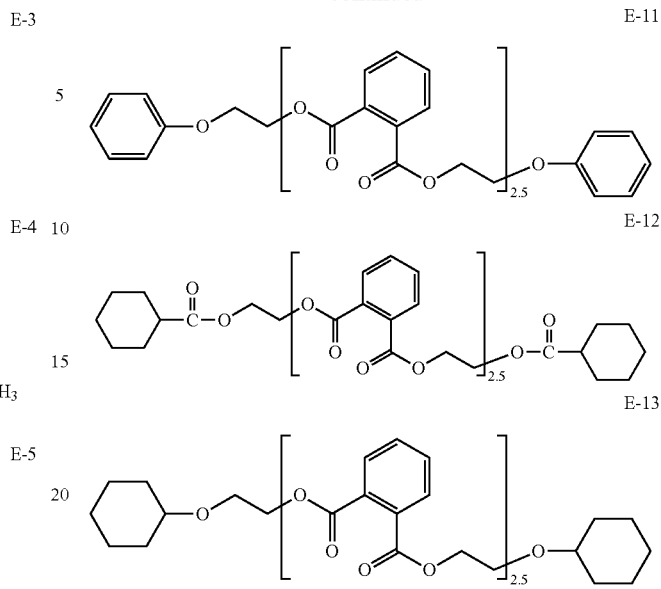

The amount of the compound represented by general formula (E) contained in the polarizing plate protective film is not particularly limited, and is preferably 2-20 parts by weight, and more preferably 5-15 parts by weight with respect to 100 parts by weight of the resin constituting the polarizing plate protective film.

<Method of Manufacturing Polarizing Plate Protective Film>

The polarizing plate protective film according to the invention can be manufactured by a solvent casting method. An embodiment using cellulose acylate as a main ingredient resin is taken below as an example to describe a method of manufacturing the polarizing plate protective film. However, the polarizing plate protective film can be manufactured also in a case where another resin is used.

According to the solvent casting method, a solution (dope) containing cellulose acylate dissolved in an organic solvent is used to manufacture the film.

A solvent selected from among an ether containing 3-12 carbon atoms, a ketone containing 3-12 carbon atoms, an ester containing 3-12 carbon atoms, and a halogenated hydrocarbon containing 1-6 carbon atoms is preferably contained as the organic solvent.

The ether, the ketone, and the ester may each have a ring structure. A compound having two or more groups as one of functional groups (i.e., —O—, —CO—, and —COO—) that the ether, the ketone, and the ester have can also be used as the organic solvent.

The organic solvent may have another functional group such as an alcoholic hydroxyl group. When the organic solvent has two or more types of functional groups, the number of carbon atoms is preferably 1-12, and more preferably 3-12.

The cellulose acylate content in the cellulose acylate solution is preferably adjusted so that the cellulose acylate is contained in the resulting solution in an amount of 10-40 wt %. The cellulose acylate content is more preferably 10-30 wt %. Optional additives to be described later may be added to the organic solvent (main solvent).

Drying methods in the solvent casting method are described in U.S. Pat. No. 2,336,310, U.S. Pat. No. 2,367,603, U.S. Pat. No. 2,492,078, U.S. Pat. No. 2,492,977, U.S.

Pat. No. 2,492,978, U.S. Pat. No. 2,607,704, U.S. Pat. No. 2,739,069, U.S. Pat. No. 2,739,070, GB 640731, GB 736892, JP 45-4554 B, JP 49-5614 B, JP 60-176834 A, JP 60-203430 A, and JP 62-115035 A. Drying on a band or a drum can be performed by blowing air or an inert gas such as nitrogen.

It is also possible to form a film by casting the prepared cellulose acylate solution (dope) into two or more layers. In this case, a cellulose acylate film is preferably prepared by the solvent casting method. The film is preferably formed by casting the dope on a drum or a band and evaporating the solvent. The dope before casting preferably has a concentration adjusted so that the solid content is in a range of 10-40 wt %. A surface of the drum or the band is preferably mirror finished.

In a case where a plurality of cellulose acylate solutions for two or more layers are to be cast, the plurality of cellulose acylate solutions can be cast, and a film may be formed by laminating while casting the respective cellulose acylate-containing solutions from a plurality of casting inlets formed at intervals in a support moving direction. For example, methods described in JP 61-158414 A, JP 1-122419 A, and JP 11-198285 A can be used. Further, it is also possible to form a film by casting a cellulose acylate solution from two casting inlets. For example, methods described in JP 60-27562 B, JP 61-94724 A, JP 61-947245 A, JP 61-104813 A, JP 61-158413 A, and JP 6-134933 A can be used. Further, use may also be made of a cellulose acylate film casting method described in JP 56-162617 A which involves wrapping a flow of a higher viscosity cellulose acylate solution with a lower viscosity cellulose acylate solution and simultaneously extruding the higher and lower viscosity cellulose acylate solutions.

A film can also be formed with the use of two casting inlets by peeling off a film formed on a support through a first casting inlet and subjecting the side of the film which was in contact with the support surface to second casting. For example, a method described in JP 44-20235 B can be used.

Casting may be performed with the use of one type of cellulose acylate solution or two or more different types of cellulose acylate solutions. In order for a plurality of cellulose acylate layers to have their respective functions, cellulose acylate solutions suitable to the functions may be extruded from their respective casting inlets. In addition, the cellulose acylate solution according to the invention can also be cast simultaneously with other functionality layers (e.g., an adhesion layer, a dye layer, an antistatic layer, an antihalation layer, a UV absorbing layer, and a polarizing layer).

(Addition of Additive)

The timing at which the additive such as the compound represented by general formula (II-1) or general formula (II-2) is to be added to the cellulose acylate solution as an example of the resin material of the polarizing plate protective film is not particularly limited as long as it is added at the time of film formation. For example, the additive may be added at the time of synthesis of the cellulose acylate or be mixed with the cellulose acylate at the time of preparation of the dope.

The process from the casting to post-drying may be performed in an air atmosphere or in an atmosphere of an inert gas such as nitrogen gas. A take-up machine that may be used to manufacture the polarizing plate protective film according to the invention may be a commonly used machine, and a film can be taken up by take-up methods such as a constant tension method, a constant torque method, a taper tension method, and a program tension control method at a constant internal stress.

(Stretching Treatment)

The polarizing plate protective film according to the invention can also be subjected to stretching treatment. The stretching treatment allows the polarizing plate protective film to have desired retardation. The cellulose acylate film may be preferably stretched in any of a width direction and a longitudinal direction.

Methods of stretching in the width direction are described in, for example, JP 62-115035 A, JP 4-152125 A, JP 4-284211 A, JP 4-298310 A, and JP 11-48271 A.

The film is stretched under a heating condition. The film can be stretched in a drying treatment and is particularly effective when a solvent remains in the film. In the case of stretching in the longitudinal direction, the film is stretched, for example, by making the film take-up speed higher than the film peel-off speed through adjustment of a film conveyor roller speed. In the case of stretching in the width direction, the film can also be stretched by conveying the film which is held by a tenter in its width direction and gradually increasing the width of the tenter. Drying of the film may also be followed by stretching using a stretching machine (preferably uniaxial stretching using a long stretching machine).

(Saponification Treatment)

Alkali saponification treatment allows the polarizing plate protective film or a laminate thereof to have adhesion to a material of the polarizer such as polyvinyl alcohol and to be used as such.

A saponification method described in paragraph 0211 and paragraph 0212 of JP 2007-86748 A can be used.

For example, the alkali saponification treatment is preferably performed on the polarizing plate protective film or a laminate thereof in a cycle including immersing a film surface in an alkali solution, then neutralizing in an acid solution, rinsing with water and drying. Examples of the alkali solution include potassium hydroxide solution and sodium hydroxide solution. The hydroxide ion concentration is preferably in a range of 0.1-5.0 mol/L and more preferably 0.5-4.0 mol/L. The alkali solution temperature is preferably in a range of room temperature-90° C. and more preferably 40-70° C.

The alkali saponification treatment may be replaced by processing for facilitating adhesion as described in JP 6-94915 A and JP 6-118232 A.

[Thickness of Polarizing Plate Protective Film]

The resin film which is the polarizing plate protective film according to the invention preferably has a thickness of at least 1 µm but up to 40 µm, more preferably at least 1 µm but up to 30 µm, and even more preferably at least 3 µm but up to 25 µm.

Adjustment of the thickness of the polarizing plate protective film in the range of at least 1 µm but up to 40 µm makes it possible to stably convey the film and the polarizing plate in conveying steps during the manufacture of the film and the preparation of the polarizing plate.

In addition, according to the invention, the effect of the invention can be effectively achieved when the film thickness is small as described above.

<<Functionality Layer>>

The polarizing plate protective film according to the invention may have functionality layers suitable to the intended purpose which are formed thereon as desired.

Exemplary functionality layers include a hardcoat layer, an antireflection layer, a light scattering layer, a stain-proof layer, an antistatic layer, an adhesion layer, a dye layer, an antihalation layer, an antiglare (antidazzle) layer, a gas barrier layer, a slipping layer, a UV absorbing layer, and a polarizing layer. One layer may have a plurality of functions the respective layers have.

As an example, the hardcoat layer is a layer for imparting hardness and scratch resistance to the polarizing plate protective film. For example, a hardcoat layer which has high adhesion to the polarizing plate protective film and particularly the cellulose acylate film in conjunction with the compound represented by general formula (II-1) or general formula (II-2) can be formed by applying a coating composition onto the polarizing plate protective film and curing the applied composition. Physical properties such as mechanical properties, electrical properties and optical properties, and chemical properties such as water repellency and oil repellency can also be imparted to the hardcoat layer itself by adding fillers and additives to the hardcoat layer. The hardcoat layer preferably has a thickness of 0.1-6 μm, and more preferably 3-6 μm. When the hardcoat layer has a small thickness falling within the above-defined range, the resulting polarizing plate protective film includes the hardcoat layer which has physical properties improved in brittleness and curling suppression while also achieving weight reduction and manufacturing cost reduction.

The hardcoat layer is preferably formed by curing a curable composition. The curable composition is preferably prepared as a liquid coating composition. An example of the coating composition contains a monomer or oligomer for a matrix-forming binder, polymers and an organic solvent. The hardcoat layer can be formed by curing the coating composition after application. A crosslinking reaction or a polymerization reaction can be used for curing.

<Characteristics of Polarizing Plate Protective Film>

The polarizing plate protective film is required to be low in water vapor permeability, be high in hardness such as Knoop hardness or pencil hardness, be low in UV transmittance, and be low in haze value.

(Water Vapor Permeability)

The polarizing plate protective film according to the invention preferably has a water vapor permeability of 1,050 g/m² or less, and more preferably 990 g/m² or less after a lapse of 24 hours at 40° C. and a relative humidity of 90%. Deterioration of the polarization performance in the polarizing plate including the polarizing plate protective film according to the invention under a high-temperature and high-humidity environment can be minimized by adjusting the water vapor permeability within the above-defined range.

The water vapor permeability value in the specification is a value obtained according to the JIS Z 0208 water vapor permeability test (cup method) which involves measuring the weight (g) of water vapor passing through a sample in 24 hours in an atmosphere of a temperature of 40° C. and a relative humidity of 90% and converting the measured value to a value per square meter area of the sample.

(Hardness)

(1) Knoop Hardness

The polarizing plate protective film according to the invention preferably has a surface hardness, as measured using a Knoop indenter at an indentation load of 50 mN, of 185 N/mm² or more. More preferably, the Knoop hardness as measured by rotating the Knoop indenter at the same indentation position at an indentation load of 50 mN according to the JIS Z 2251 method has a minimum value of 210 N/mm² or more. The surface hardness (Knoop hardness) is measured by a nanoindentation method. JIS Z 2251 is one of the Japanese Industrial Standards created based on ISO 4545. For example, the Knoop hardness as measured in a total of 18 directions by rotating the Knoop indenter in steps of 10° at the same indentation position has a minimum value of 210 N/mm² or more. The polarizing plate protective film preferably has a surface hardness of 220 N/mm² or more and more preferably 230 N/mm² or more.

The surface hardness of the polarizing plate protective film can be adjusted by the type and amount of addition of the additive, the polymerization degree of the resin, the composition of the dope solvent, the stretching treatment of the film, and the like.

(2) Pencil Hardness

The polarizing plate protective film according to the invention preferably also has a high pencil hardness.

The pencil hardness is determined based on the pencil hardness evaluation specified in JIS K 5400. To be more specific, the polarizing plate protective film is moisture-conditioned at a temperature of 25° C. and a relative humidity of 60% for 2 hours and is then evaluated at a load of 500 g using a 3H test pencil defined in JIS S 6006; and this is repeated 20 times to evaluate the pencil hardness.

In practical use, a result of 3H or higher is necessary.

(UV Transmittance)

The polarizing plate protective film according to the invention preferably has a high ability to block out UV rays in order to protect the polarizer and a drive liquid crystal in a liquid crystal cell from deterioration due to the UV rays. Therefore, the UV transmittance in a wavelength region of 290-300 nm is preferably 10% or less, and more preferably 5% or less. The UV transmittance in the wavelength region of 290-300 nm is adjusted to 10% or less to suppress photoexcitation of $I_3^-$ having absorption maximum in the vicinity of the wavelengths of 290-300 nm, so that deterioration of the polarization performance due to light can be effectively minimized.

(Haze)

The polarizing plate protective film according to the invention preferably has a haze value of 0.01-1.00%, and more preferably 0.05-0.80%. A haze value of 1.00% or less is preferred because a liquid crystal display device has a higher contrast.

The haze can be determined by measuring according to JIS K-7136 using a haze meter, for example, a haze meter (HGM-2DP manufactured by Suga Test Instruments Co., Ltd.).

A polarizing plate protective film or a laminate thereof to be measured is cut into a size of 40 mm×80 mm and is subjected to measurement under conditions of 25° C. and a relative humidity of 60%.

<<Polarizing Plate>>

The polarizing plate according to the invention includes a polarizer and one or more polarizing plate protective films of the invention formed on one or both surfaces of the polarizer.

In general, a polarizing plate including a polarizer and polarizing plate protective films formed on both surfaces of the polarizer is widely used. In such a case where the polarizer includes polarizing plate protective films on both surfaces thereof, a polarizing plate protective film different from the polarizing plate protective film according to the invention or a known polarizing plate protective film may be used on a surface opposite to a surface on which the polarizing plate protective film according to the invention is provided.

Examples of the polarizing plate protective film different from the polarizing plate protective film according to the invention include the one different in the type or content of the additive contained, the one different in characteristics, and the one including or not including any of functionality layers or different in functionality layers.

<Phase Difference Film>

The polarizing plate according to the invention preferably includes a phase difference film on a surface opposite to a surface on which the polarizing plate protective film according to the invention is formed, the phase difference film having an in-plane retardation ($Re_{590}$) at a wavelength of 590 nm of −5-5 nm and a retardation ($Rth_{590}$) in a thickness direction of −30-30 nm in an environment of 25° C. and a relative humidity of 60%. With such a structure, the effect of the invention is more effectively achieved when the polarizing plate is incorporated in a liquid crystal display device of an IPS (In-Plane-Switching) mode. $Re_{590}$ is preferably in a range of 0-3 nm and more preferably 0-2 nm. $Rth_{590}$ is preferably in a range of −20-20 nm and more preferably −10-10 nm.

Examples of such a phase difference film include films described in paragraphs 0066 to 0068 of JP 2014-41371 A.

Also in another drive mode, the polarizing plate may have a phase difference film having an optical compensation ability taking the drive mode and retardation of the liquid crystal cell into account.

In the present specification, $Re(\lambda)$ and $Rth(\lambda)$ represent an in-plane retardation and a retardation in a thickness direction at a wavelength $\lambda$, respectively. $Re(\lambda)$ is measured by allowing light at a wavelength of $\lambda$ nm to enter in a film normal direction in KOBRA 21ADH or WR (manufactured by Oji Scientific Instruments Co., Ltd.). As for selecting the measurement wavelength of $\lambda$ nm, measurement can be made by manually exchanging a wavelength selecting filter or converting a measured value using a program or the like. In a case where a film to be measured is represented by a uniaxial or biaxial index ellipsoid, $Rth(\lambda)$ is calculated by the following method.

$Re(\lambda)$ is measured at in total 6 points by allowing light at a wavelength of $\lambda$ nm to enter from directions respectively inclined in steps of 10° up to 50° on one side from a film normal direction with respect to the normal direction assuming that the in-plane slow axis (determined by KOBRA 21ADH or WR) is an inclined axis (rotational axis) (in a case where there is no slow axis, it is assumed that an arbitrary direction in a film plane is a rotational axis). KOBRA 21ADH or WR calculates $Rth(\lambda)$ based on the thus measured retardation values, an assumed average refractive index value and an input film thickness value. In the above, in the case of a film having a direction in which the retardation value is 0 at an angle inclined from the normal direction assuming that the in-plane slow axis is a rotational axis, the retardation value at a larger inclined angle than the above inclined angle is changed to have a negative sign and then KOBRA 21ADH or WR calculates the $Rth(\lambda)$. It is also possible to measure retardation values from two arbitrary inclined directions assuming that the slow axis is an inclined axis (rotational axis) (in a case where there is no slow axis, it is assumed that an arbitrary direction in a film plane is a rotational axis), and calculate Re and Rth from the following expression (A) and expression (β) based on the retardation values, an assumed average refractive index value and an input film thickness value.

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)}$$

Expression (A)

$Re(\theta)$ shown above represents a retardation value in a direction inclined by an angle θ from the normal direction. nx in expression (A) represents a refractive index in an in-plane slow axis direction, ny represents a refractive index in an in-plane direction orthogonal to nx, and nz represents a refractive index in a direction orthogonal to nx and ny.

$$Rth = ((nx+ny)/2 - nz) \times d$$

expression (β)

In a case where a film to be measured cannot be represented by a uniaxial or biaxial index ellipsoid, namely in a case of a so-called film having no optic axis, $Rth(\lambda)$ is calculated by the following method. $Re(\lambda)$ is measured at 11 points by allowing light at a wavelength of $\lambda$ nm to enter from directions respectively inclined in steps of 10° from −50° to +50° with respect to a film normal direction assuming that the in-plane slow axis (determined by KOBRA 21ADH or WR) is an inclined axis (rotational axis). KOBRA 21ADH or WR calculates $Rth(\lambda)$ based on the thus measured retardation values, an assumed average refractive index value and an input film thickness value.

In the above measurement, values in Polymer Handbook (JOHN WILEY & SONS, INC) and catalogs of various films can be used for the assumed average refractive index value. When the average refractive index value is not known, it can be measured by an Abbe refractometer. Average refractive index values of main phase difference films are illustrated below: cellulose acylate (1.48), cycloolefin polymer (1.52), polycarbonate (1.59), polymethyl methacrylate (1.49), and polystyrene (1.59). These assumed average refractive index values and a film thickness are input to calculate nx, ny and nz in KOBRA 21ADH or WR. From the thus calculated nx, ny and nz, $Nz=(nx-nz)/(nx-ny)$ is further calculated.

Unless otherwise specified, Re and Rth values are obtained at a measurement wavelength $\lambda$ of 590 nm in a visible light range.

<Polarizer>

The polarizer includes at least a dichroic pigment and a resin.

(Resin)

A polyvinyl alcohol-based resin is preferably used in the polarizer according to the invention. The polarizer according to the invention consists primarily of the polyvinyl alcohol resin, which usually accounts for at least 80 wt % of the polarizer. Polyvinyl alcohol is usually obtained by saponifying polyvinyl acetate but may contain ingredients copolymerizable with vinyl acetate, as exemplified by unsaturated carboxylic acids, unsaturated sulfonic acids, olefins, and vinyl ethers. Modified polyvinyl alcohol-based resins containing acetoacetyl group, sulfo group, carboxy group, oxyalkylene group, and the like can also be used.

The saponification degree of the polyvinyl alcohol-based resin is not particularly limited and is preferably 80-100 mol %, and particularly preferably 90-100 mol % in terms of solubility. The polymerization degree of the polyvinyl alcohol-based resin is not particularly limited and is preferably 1,000-10,000, and particularly preferably 1,500-5,000.

Before stretching, the polyvinyl alcohol-based resin film preferably has a modulus of elasticity expressed by Young's modulus of at least 0.1 MPa but up to 500 MPa, and more preferably at least 1 MPa but up to 100 MPa.

When the modulus of elasticity is within the above range, the polyvinyl alcohol-based resin film that can be manufactured is highly effective in suppressing occurrence of wrinkles after stretching and has a sufficient strength.

The thickness of the polyvinyl alcohol-based resin film before stretching is not particularly limited and is preferably 1 μm-1 mm, and particularly preferably 20-200 μm in terms of film holding stability and stretching uniformity. The thickness of the polyvinyl alcohol-based resin film after stretching is preferably 2-100 μm, and is preferably 7-25 μm to improve light leakage. This thickness determines the thickness of the polarizer film.

(Dichroic Pigment)

The polarizer according to the invention contains a dichroic pigment. The dichroic pigment as used herein refers to a pigment in which the absorbance varies with the direction, and examples thereof include an iodine ion, a diazo-based pigment, a quinone-based pigment, and other known dichroic dyes. As the dichroic pigment, a higher-order iodine ion such as $I_3^-$ or $I_5^-$ or a dichroic dye can be preferably used.

According to the invention, a higher-order iodine ion is particularly preferably used. The higher-order iodine ion can be produced in a state adsorbed and aligned on polyvinyl alcohol by immersing the polyvinyl alcohol in a solution obtained by dissolving iodine in an aqueous potassium iodide solution and/or an aqueous boric acid solution, as described in "Application of Polarizing Plates," Ryo Nagata ed., CMC Publishing Co., Ltd., and "Industrial Materials," vol. 28, No. 7, pp. 39 to 45.

The dichroic pigment content is preferably 0.1-50 parts by weight, more preferably 0.5-20 parts by weight, and even more preferably 1.0-5.0 parts by weight with respect to the polyvinyl alcohol-based resin.

The polarizer according to the invention may optionally include a plasticizer and a surfactant in addition to the polyvinyl alcohol-based resin and the dichroic pigment.

<Method of Manufacturing Polarizer>

A method of manufacturing the polarizer according to the invention preferably includes, for example, forming a polyvinyl alcohol-based resin into a film and then introducing iodine to form the polarizer. The polyvinyl alcohol-based resin film can be manufactured by reference to methods described in paragraphs 0213 to 0237 of JP 2007-86748 A, JP 3342516 B, JP 09-328593 A, JP 2001-302817 A, and JP 2002-144401 A.

According to the invention, the method of manufacturing the polarizer particularly preferably includes a step of forming a polyvinyl alcohol-based resin solution containing a polyvinyl alcohol-based resin into a film; a step of stretching the polyvinyl alcohol-based resin film; a step of dyeing the stretched polyvinyl alcohol-based resin film with a dichroic pigment; and a step of crosslinking the dyed polyvinyl alcohol-based resin film using boric acid.

In the step of forming a polyvinyl alcohol-based resin solution into a film, a polyvinyl alcohol-based resin is preferably added to water with stirring to prepare a stock solution containing the polyvinyl alcohol-based resin dissolved in water or an organic solvent. The concentration of the polyvinyl alcohol-based resin in the stock solution is preferably 5 wt %-20 wt %. The obtained slurry may be dehydrated to prepare a wet cake of the polyvinyl alcohol-based resin having a water content of approximately 40%. Further, when an additive is to be added later, for example, a method which involves putting the polyvinyl alcohol wet cake into a dissolution bath, adding a plasticizer and water thereto, and stirring the mixture while blowing water vapor from the bottom of the bath is preferred. The resin is preferably heated to an internal resin temperature in a range of 50-150° C. and pressure may be applied to the inside of the system.

According to the invention, in general, a film forming method which involves casting the stock solution of the polyvinyl alcohol-based resin solution prepared as above is preferably used. The casting method is not particularly limited and a film is preferably formed by supplying the heated stock solution of the polyvinyl alcohol-based resin solution to a twin-screw extruder and casting the stock solution on a support from a discharge unit (preferably a die, and more preferably a T-slit die) using a gear pump. The temperature of the resin solution discharged from the die is not particularly limited.

As the support, a cast drum is preferred. The diameter, width, rotating speed, and surface temperature of the drum are not particularly limited. In particular, the cast drum preferably has a diameter of 2,000-5,000 mm, more preferably 2,500-4,500 mm, and particularly preferably 3,000-3,500 mm.

The cast drum preferably has a width of 2-6 m, more preferably 3-5 m, and particularly preferably 4-5 m.

The cast drum preferably has a rotating speed of 2-20 m/min, more preferably 4-12 m/min, and particularly preferably 5-10 m/min.

The cast drum preferably has a surface temperature of 40-140° C., more preferably 60-120° C., and particularly preferably 80-100° C.

The resin temperature at an outlet of the T-slit die is preferably 40-140° C., more preferably 60-120° C., and particularly preferably 80-100° C.

Then, the obtained roll is preferably dried while allowing front and back surfaces of the roll to alternately pass on drying rolls. The diameter, width, rotating speed, and surface temperature of the drying rolls are not particularly limited. Above all, the drying rolls each preferably have a diameter of 200-450 mm, more preferably 250-400 mm, and particularly preferably 300-350 mm.

In addition, the length of the obtained film is also not particularly limited, and the film may have a length as long as at least 2,000 m, and preferably at least 4,000 m. The width of the film is also not particularly limited and is preferably 2-6 m and more preferably 3-5 m.

After the polyvinyl alcohol-based resin solution is formed into a film, the film is stretched. In stretching, a longitudinal uniaxial stretching method as described in U.S. Pat. No. 2,454,515 or a tenter method as described in JP 2002-86554 A can be preferably used. The stretch ratio is preferably 2 times to 12 times and more preferably 3 times to 10 times. In addition, a relationship between the stretch ratio, the original thickness of the film, and the thickness of the polarizer may preferably satisfy "(Thickness of Polarizer after Being Applied to Polarizing Plate Protective Film/Original Thickness of Film)×(Total Stretch Ratio)>0.17" as described in JP 2002-040256 A; and a relationship between the width of the polarizer when being pulled out from a final bath and the width of the polarizer when being applied to the polarizing plate protective film may preferably satisfy "0.80≤(Width of Polarizer When Being Applied to Polarizing Plate Protective Film/Width of Polarizer When Being Pulled Out from Final Bath)≤0.95" as described in JP 2002-040247 A.

Stretching is followed by dyeing of the polyvinyl alcohol-based resin film with a dichroic pigment. Dyeing is performed by gas-phase or liquid-phase adsorption. In an exemplary case where a liquid phase is applied, when iodine is used as the dichroic pigment, dyeing is performed by immersing a polymer film for the polarizer in an iodine-potassium iodide aqueous solution. It is preferred that the iodine content be 0.1-20 g/L, the potassium iodide content be 1-200 g/L, and the weight ratio between iodine and potassium iodide be 1-200. The dyeing time is preferably 10-5,000 seconds and the solution temperature is preferably 5-60° C. In addition to immersion, any dyeing method such as application or spraying of iodine or a dyeing solution can be used. The dyeing step may be performed before or after the stretching step according to the invention. However, it is particularly preferred to perform liquid-phase dyeing before the stretching step because the film is suitably swelled to facilitate stretching.

In dyeing, a method described in JP 2002-86554 A can be used. In addition to immersion, any dyeing method such as application or spraying of iodine or a dyeing solution can be used. A method which involves controlling the iodine concentration, the temperature of a dyeing bath, and the stretch ratio in the bath, and dyeing a film while stirring a solution in the bath as described in JP 2002-290025 A may also be used.

As described in JP 3145747 B, a boric compound such as boric acid or borax may be added to a dyeing solution.

Other steps such as a swelling step, a film curing step and a drying step may be performed. These steps are described in paragraphs 0039 to 0050 of JP 2011-237580 A, the disclosure of which is incorporated herein by reference.

<Shape and Configuration>

With respect to the shape of the polarizing plate according to the invention, the polarizing plate includes not only a cut film sheet having a size capable of direct incorporation into a display device but also a long film continuously produced and taken up into a roll (for example, an embodiment having a roll length of 2,500 m or more, or 3,900 m or more). For use in a large screen liquid crystal display device, the polarizing plate preferably has a width of 1,470 mm or more.

The polarizing plate according to the invention includes a polarizer and at least one polarizing plate protective film according to the invention. The polarizing plate is also preferably formed by applying a protect film (which is not a polarizing plate protective film according to the invention) to one surface of the polarizing plate and a separate film to the opposite surface of the polarizing plate.

The protect film and the separate film are used for the purpose of protecting the polarizing plate, for example, at the shipment of the polarizing plate or at the product inspection. In this case, the protect film is applied for the purpose of protecting a surface of the polarizing plate and is used on the surface of the polarizing plate opposite to a surface to be applied to a liquid crystal plate. The separate film is used for the purpose of covering an adhesion layer to be applied to a liquid crystal plate and is used on a surface of the polarizing plate to be applied to the liquid crystal plate.

<Stacking Method of Polarizer and Polarizing Plate Protective Film>

In the method of manufacturing the polarizing plate according to the invention, at least one polarizing plate protective film according to the invention is stacked on at least one surface of the polarizer obtained as described above.

In the method of manufacturing the polarizing plate according to the invention, preferably, a surface of each of one or more polarizing plate protective films is subjected to an alkali treatment and then applied to at least one surface and preferably both surfaces of the polarizer which is prepared by immersing a polyvinyl alcohol film in an iodine solution and stretching, using an aqueous solution of a completely saponified polyvinyl alcohol, thereby manufacturing the polarizing plate.

Examples of the adhesive used for applying the treated surface of the polarizing plate protective film to the polarizer include polyvinyl alcohol-based adhesives such as polyvinyl alcohol and polyvinyl butyral adhesives and vinyl-based latexes such as butyl acrylate.

The polarizing plate protective film according to the invention is preferably applied to the polarizer so that the transmission axis of the polarizer is orthogonal or parallel to or at 45° with respect to the slow axis of the polarizing plate protective film.

As for parallel and orthogonal as used herein, an error range acceptable in the technical field to which the present invention belongs is included. For example, this means that in parallel and orthogonal directions, errors from the strict angles are each within a range of ±10° exclusive, and is preferably up to 5°, and more preferably up to 3°.

The term "parallel" as used in the transmission axis of the polarizer and the slow axis of the polarizing plate protective film means that the direction of the main refractive index nx of the polarizing plate protective film and the direction of the transmission axis of the polarizer intersect with each other at an angle of ±10°. This angle is preferably within 5°, more preferably within 3°, even more preferably within 1°, and most preferably within 0.5°.

The term "orthogonal" as used in the transmission axis of the polarizer and the slow axis of the polarizing plate protective film means that the direction of the main refractive index nx of the polarizing plate protective film and the direction of the transmission axis of the polarizer intersect with each other at an angle of 90°±10°. This angle is preferably 90°±5°, more preferably 90°±3°, even more preferably 90°±1°, and most preferably 90°±0.1°. The angle is preferably within the above-defined range because deterioration of the polarization degree performance in a crossed-Nicols state of the polarizing plate is minimized and light leakage is reduced.

<Functionalization of Polarizing Plate>

The polarizing plate according to the invention is preferably used as a functionalized polarizing plate including in combination an antireflection film for improving the visibility of a display device, a luminance enhancing film, or a polarizing plate protective film having functionality layers such as a forward scattering layer and an antiglare (antidazzle) layer. The antireflection film, the luminance enhancing film and other functional optical films, the forward scattering layer, and the antiglare layer used for the functionalization are described in paragraphs 0257 to 0276 of JP 2007-86748 A, and the functionalized polarizing plate can be produced according to these descriptions.

<Performance of Polarizing Plate>

(Polarization Degree)

The polarizing plate according to the invention preferably has a polarization degree of at least 95.0%, more preferably at least 98%, and most preferably at least 99.5%.

According to the invention, the polarization degree of the polarizing plate can be determined by calculating the polarization degree spectrum through an expression shown below from the crossed transmittance and the parallel transmittance as measured at a wavelength of 380 nm-700 nm using an automatic polarizing film measuring device VAP-7070 manufactured by JASCO Corporation and further calculating the weighted average of an illuminant (Supplementary standard illuminant C) and CIE luminous efficiency (Y).

Polarization degree (%)={(parallel transmittance−crossed transmittance)/(parallel transmittance+crossed transmittance)}$^{1/2}$×100

(Change in Polarization Degree)

The polarizing plate according to the invention is excellent in durability over time under heat and humidity. Therefore, the amount of change in polarization degree between before and after the polarizing plate durability test to be described later is small.

In the polarizing plate of the invention, the crossed transmittance and the parallel transmittance are measured using an automatic polarizing film measuring device VAP-7070 manufactured by JASCO Corporation and the polarization degree is calculated by the expression shown above, and the change in the polarization degree in a case where the polarizing plate is stored for 144 hours in an environment of 80° C. and a relative humidity of 90% is preferably less than 5%.

Two samples (5 cm×5 cm) each including a polarizing plate according to the invention applied to glass with pressure-sensitive adhesives are prepared. In this step, the polarizing plate is applied to the glass so that a polarizing plate protective film according to the invention faces the glass side. The crossed transmittance is measured by setting the samples with their glass side toward an illuminant. Measurement is made for the two respective samples and average values thereof are taken as the crossed transmittance and the parallel transmittance, respectively. A more specific description will be given in Examples.

(Crystallinity Index of Polyvinyl Alcohol in Polarizer)

According to the invention, the polarizer-constituting resin is preferably polyvinyl alcohol, and the polyvinyl alcohol preferably has a crystallinity index of 0.05 or less after a polarizing plate including a polarizer composed of the polyvinyl alcohol is allowed to stand at a temperature of 80° C. and a relative humidity of 90% for 144 hours.

The crystallinity index of the polyvinyl alcohol as used herein indicates to what degree the polyvinyl alcohol is crystallized. According to the invention, a method in which the absorbance at a wave number of 1,141 cm$^{-1}$ known as a crystallization band in an infrared absorption spectrum is used to determine the crystallinity index is used.

According to the invention, the crystallinity index is calculated from expression ($\alpha$) shown below based on the absorbance at a wave number of 1,134 cm$^{-1}$.

Crystallinity index of polyvinyl alcohol={$A$(1,141 cm$^{-1}$)-$A$(1,134 cm$^{-1}$)}/$A$(1,134 cm$^{-1}$)   Expression ($\alpha$)

In expression ($\alpha$), A (1,141 cm$^{-1}$) represents the absorbance at a wave number of 1,141 cm$^{-1}$ and A (1,134 cm$^{-1}$) represents the absorbance at a wave number of 1,134 cm$^{-1}$.

A peak at a wave number of 1,141 cm$^{-1}$ indicates framework vibrations of a crystalline band of polyvinyl alcohol, namely, a carbon-carbon zigzag chain extending in a crystal region, and a peak region at a wave number of 1,134 cm$^{-1}$ (base of C—O stretching vibrations in an amorphous portion) is a region based on the absorbance with respect to the absorbance of the crystalline band of polyvinyl alcohol.

The present invention assumes that the compound represented by general formula (II-1) or general formula (II-2) of the invention in the polarizing plate protective film is diffused and moved to the polarizer at high temperature and high humidity to suppress crystallization of polyvinyl alcohol and uneven distribution of iodine ions.

Therefore, the infrared absorption spectrum at the surface of the polarizer after being stored at high temperature and high humidity is measured to determine the crystallinity index, thereby examining the effect.

To be more specific, the ATR-IR spectrum is measured by an ATR (Attenuated Total Reflection) method using, for example, an infrared spectrometer (e.g., Nicolet 6700 manufactured by Thermo Fisher Scientific Inc.) capable of FT-IR (Fourier-Transform Infrared Spectroscopy) ATR.

A more specific description will be given in Examples.
(Other Characteristics)

Other preferred optical characteristics and the like of the polarizing plate according to the invention are described in paragraphs 0238 to 0255 of JP 2007-086748 A and it is preferred to fulfill these characteristics.

<<Display Device>>

The present invention is preferably used in a display device making use of the polarizer.

The present invention is applied for antireflection in such display devices as liquid crystal display devices and organic electroluminescence display devices.

A description is given by taking a liquid crystal display device as an example. The liquid crystal display device according to the invention includes at least a liquid crystal cell and one or more polarizing plates according to the invention. The liquid crystal display device has a structure in which a liquid crystal cell is disposed between two polarizing plates such as a first polarizing plate and a second polarizing plate. The drive mode of the liquid crystal cell is not particularly limited and drive modes such as TN (Twisted Nematic), OCB (Optically Compensated Bend), VA (Vertical Alignment), and IPS (In-Plane-Switching) are commonly used. Further, an optically-anisotropic layer that performs optical compensation in accordance with the drive mode of the liquid crystal cell is preferably used, and is disposed between the liquid crystal cell and the polarizing plate. The polarizing plate protective film may have the function of the optically-anisotropic layer.

FIG. 1 is a schematic view illustrating an example of a display device of the invention as a liquid crystal display device. In FIG. 1, a liquid crystal display includes a liquid crystal cell having a liquid crystal layer 5, and a liquid crystal cell upper electrode substrate 3 and a liquid crystal cell lower electrode substrate 6 disposed above and below the liquid crystal layer 5, respectively (in FIG. 1, reference number 4 refers to an alignment control direction of the upper electrode substrate 3, whereas reference number 7 refers to an alignment control direction of the lower electrode substrate 6), as well as an upper polarizing plate 1 and a lower polarizing plate 8 disposed on both sides of the liquid crystal cell. A color filter may be provided between the liquid crystal cell and each polarizing plate. In a case where the liquid crystal display device 10 is used as a transmissive display device, a backlight using a cold or hot cathode fluorescent tube, a light emitting diode, a field emission element, or an electroluminescent element as an illuminant is disposed on the back surface.

Each of the upper polarizing plate 1 and the lower polarizing plate 8 has a structure in which a polarizer is sandwiched between two polarizing plate protective films (in FIG. 1, reference number 2 refers to an absorption axis direction of the upper polarizing plate 1, whereas reference number 9 refers to an absorption axis direction of the lower polarizing plate 8), and in the liquid crystal display device 10 according to the invention, at least one of the polarizing plates is preferably the polarizing plate according to the invention. In a case where the polarizing plate according to the invention is applied to the liquid crystal display device 10 according to the invention, the polarizing plate may be in the form of a laminate formed in the order of the polarizing plate protective film according to the invention, the polarizer, and a common transparent protective film in a direction separating from the liquid crystal cell, or in the form of a laminate formed in the order of a common transparent protective film, the polarizer, and the polarizing plate protective film according to the invention in the direction separating from the liquid crystal cell.

Examples

The present invention is described below more specifically based on examples.

The materials, reagents, amounts of substances, their ratios, and operations illustrated in examples below may be modified as appropriate as long as they do not depart from the scope and spirit of the present invention. Therefore, the scope of the present invention should not be construed as being limited to the following examples.

A polarizing plate protective film was prepared as described below and the polarizing plate protective film was used to prepare a polarizing plate.

A. Preparation of Polarizing Plate Protective Film
(1) Preparation of Polarizing Plate Protective Film 101
(Preparation of Cellulose Acylate Solution 101)

The following ingredients were introduced into a mixing tank. The respective ingredients were stirred and dissolved to prepare a cellulose acylate solution 101.

| Composition of Cellulose Acylate Solution 101 | |
|---|---|
| Cellulose acetate having an acetyl substitution degree of 2.87 | 100.0 parts by weight |
| Agent for improving durability of polarizing plate (P-1) | 6.5 parts by weight |
| Methylene chloride (first solvent) | 389.0 parts by weight |
| Methanol (second solvent) | 58.2 parts by weight |

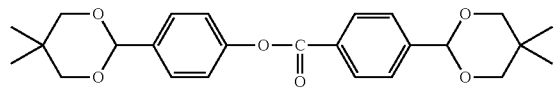

P-1

(Preparation of Matting Agent Solution 102)

The following ingredients were introduced into a disperser. The respective ingredients were stirred and dissolved to prepare a matting agent solution 102.

| Composition of Matting Agent Solution 102 | |
|---|---|
| Silica particles with an average particle size of 20 nm (AEROS1L R972 manufactured by Nippon Aerosil Co., Ltd.) | 2.0 parts by weight |
| Methylene chloride (first solvent) | 75.5 parts by weight |
| Methanol (second solvent) | 11.3 parts by weight |
| Cellulose acylate solution 101 | 0.9 part by weight |

<Casting>

The matting agent solution 102 (1.3 parts by weight) and the cellulose acylate solution 101 (98.7 parts by weight) were added and mixed using an in-line mixer to prepare a resin solution (dope). A band casting machine was used to cast the prepared dope on a stainless steel casting support (support temperature: 22° C.). At a point in time when the amount of solvent remaining in the dope reached approximately 20 wt %, a formed film was peeled off. Both ends of the peeled film in the width direction were held with a tenter and the film in which the amount of remaining solvent was 5-10 wt % was dried while being stretched to 1.10 times (by 10%) in the width direction at a temperature of 120° C. Then, the film was conveyed between rolls in a heat treatment device to be further dried, thereby obtaining a polarizing plate protective film 101 in an example. The resulting polarizing plate protective film 101 had a thickness of 25 μm, a width of 1,480 mm, and a roll-up length of 2,700 m.

(2) Preparation of Polarizing Plate Protective Films 102 to 111 and c01 to c02

The procedure for the polarizing plate protective film 101 was repeated except that the type and the amount of addition of the agent for improving the durability of the polarizing plate were changed as shown in Table 2 below in the preparation of the polarizing plate protective film 101, thereby preparing polarizing plate protective films 102 to 111 in examples and polarizing plate protective films c01 to c02 in comparative examples.

Agents for improving the durability of the polarizing plates contained in the polarizing plate protective films 102 to 111 according to the invention and the comparative polarizing plate protective films c01 to c02 are illustrated below.

P-1

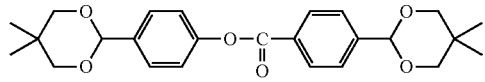

P-2

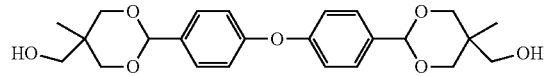

P-3

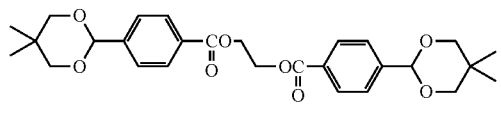

P-4

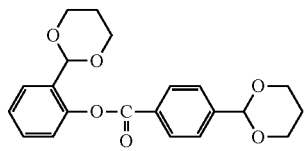

P-5

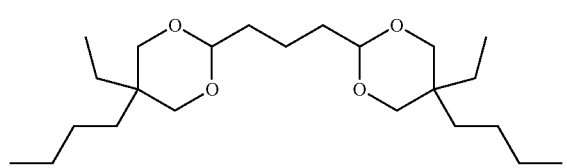

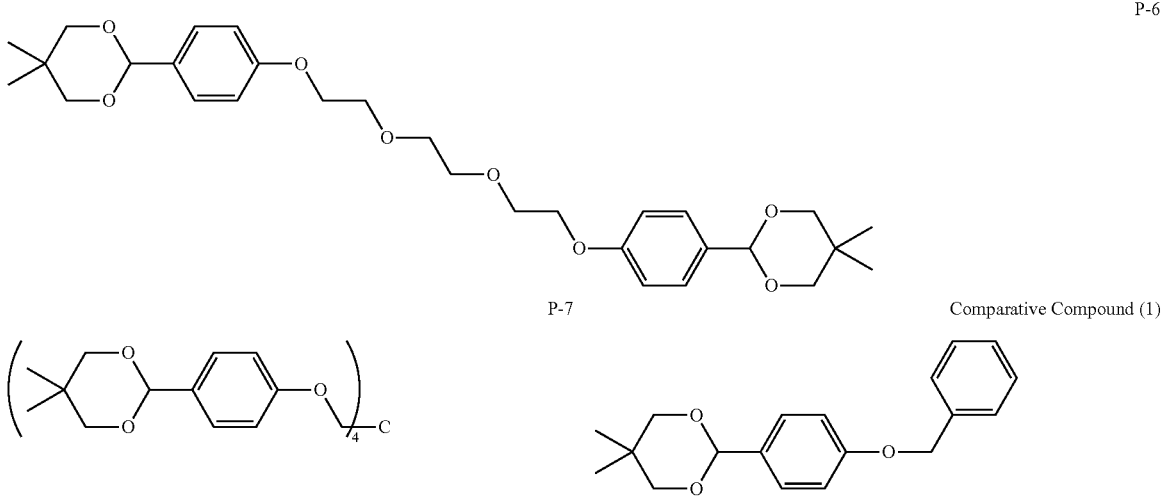

P-6

P-7

Comparative Compound (1)

(3) Preparation of Cellulose Acylate Film S01
(Preparation of Cellulose Acylate Solution 301)

The following ingredients were introduced into a mixing tank. The respective ingredients were stirred and dissolved to prepare a cellulose acylate solution 301.

| Composition of Cellulose Acylate Solution 301 | |
|---|---|
| Cellulose acetate having an acetyl substitution degree of 2.87 | 100.0 parts by weight |
| Additive E-1 | 8.0 parts by weight |
| SEESORB 706 (trade name) manufactured by Shipro Kasei Kaisha, Ltd. | 4.0 parts by weight |
| Methylene chloride (first solvent) | 389.0 parts by weight |
| Methanol (second solvent) | 58.2 parts by weight |

Additive E-1

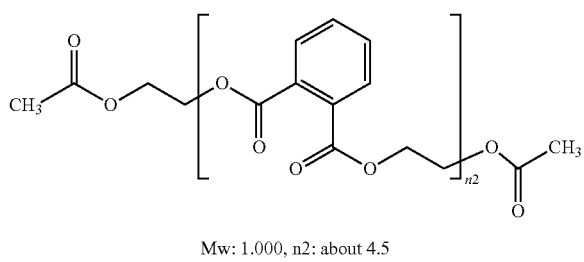

Mw: 1,000, n2: about 4.5

(Preparation of Matting Agent Solution 302)

The following ingredients were introduced into a disperser. The respective ingredients were stirred and dissolved to prepare a matting agent solution 302.

| Composition of Matting Agent Solution 302 | |
|---|---|
| Silica particles with an average particle size of 20 nm (AEROSIL R972 manufactured by Nippon Aerosil Co., Ltd.) | 2.0 parts by weight |
| Methylene chloride (first solvent) | 75.5 parts by weight |
| Methanol (second solvent) | 11.3 parts by weight |
| Cellulose acylate solution 301 | 0.9 part by weight |

(Preparation of Barbituric Acid-Based Additive Solution 303)

The following ingredients were introduced into a mixing tank. The respective ingredients were stirred with heating and dissolved to prepare a barbituric acid-based additive solution 303.

| Composition of Barbituric Acid-Based Additive Solution 303 | |
|---|---|
| Additive A-3 | 20.0 parts by weight |
| Methylene chloride (first solvent) | 69.6 parts by weight |
| Methanol (second solvent) | 10.4 parts by weight |

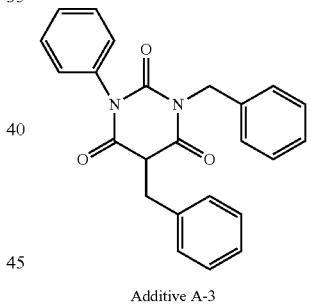

Additive A-3

<Casting>

The matting agent solution 302 (1.3 parts by weight) and the barbituric acid-based additive solution 303 (3.4 parts by weight) were filtered, respectively, and mixed using an in-line mixer. The cellulose acylate solution 301 (95.3 parts by weight) was further added and mixed using the in-line mixer to prepare a resin solution (dope). A band casting machine was used to cast the prepared dope on a stainless steel casting support (support temperature: 22° C.). At a point in time when the amount of solvent remaining in the dope reached approximately 20 wt %, a formed film was peeled off. Both ends of the peeled film in the width direction were held with a tenter and the film in which the amount of remaining solvent was 5-10 wt % was dried while being stretched to 1.15 times (by 15%) in the width direction at a temperature of 120° C. Then, the film was conveyed between rolls in a heat treatment device to be further dried, thereby obtaining a cellulose acylate film S01. The resulting cellulose acylate film S01 had a thickness of 25 μm, a width of 1,480 mm, and a roll-up length of 2,700 m.

(4) Preparation of Cellulose Acylate Film S02

The procedure for the cellulose acylate film S01 was repeated except that the additive E-1 was replaced by a compound B-97 in the preparation of the cellulose acylate film S01, thereby preparing a cellulose acylate film S02.

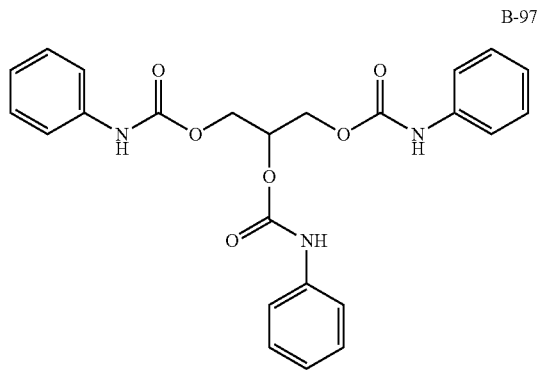 [SMILES: O=C(Nc1ccccc1)OCC(COC(=O)Nc1ccccc1)OC(=O)Nc1ccccc1]

B-97

(5) Preparation of Cellulose Acylate Film S03

The procedure for the cellulose acylate film S02 was repeated except that the additive A-3 was not added in the preparation of the cellulose acylate film S02, thereby preparing a cellulose acylate film S03.

B. Preparation of Polarizing Plate

<<Preparation of Polarizer>>

A polarizer A was prepared as described below.

<Preparation of Polarizer>

Polyvinyl alcohol (PVA) powder having an average polymerization degree of 2,400 and a saponification degree of 99.9% or more was dissolved in pure water and adjusted to account for 10 wt %. The thus obtained aqueous solution was applied onto a polyester film and dried at 40° C. for 3 hours and further at 110° C. for 60 minutes to obtain a polyvinyl alcohol film with a thickness of 32 μm. The resulting film was swelled in hot water at 30° C. for 1 minute, immersed in an aqueous solution of potassium iodide/iodine (weight ratio; 10:1) at 30° C., and uniaxially stretched to 1.5 times in a longitudinal direction. The aqueous solution of potassium iodide/iodine (weight ratio: 10:1) had an iodine concentration of 0.38 wt %. Then, the film was uniaxially stretched in a longitudinal direction to a total stretch ratio of 7 times in a 4.25 wt % boric acid aqueous solution at 50° C. The film was then immersed in a water bath at 30° C. to be washed with water and dried at 50° C. for 4 minutes to obtain the polarizer A with a thickness of 8 μm.

<Saponification Treatment of Polarizing Plate Protective Film (Cellulose Acylate Film)>

The polarizing plate protective films 101 to 111 and c01 to c02, and the cellulose acylate films S01 to S03 prepared as above were immersed in a 2.3 mol/L sodium hydroxide aqueous solution at 55° C. for 3 minutes, respectively. Then, the films were washed in a water washing bath at room temperature (25° C.) and neutralized with 0.05 mol/L sulfuric acid at 30° C. The films were washed again in the water washing bath at room temperature (25° C.) and further dried with hot air at 100° C. The polarizing plate protective films 101 to 111 and c01 to c02, and the cellulose acylate films S01 to S03 were thus subjected to the film surface saponification treatment.

(1) Preparation of Polarizing Plate H01

The saponified polarizing plate protective film 101 was applied to one side of the polarizer A prepared above using a polyvinyl alcohol-based adhesive. The saponified cellulose acylate film S01 was further applied to the opposite side of the polarizer A to the polarizing plate protective film 101. In this step, the polarizer and the prepared polarizing plate protective film or cellulose acylate film were disposed so that the transmission axis of the polarizer was parallel to the width direction of the polarizing plate protective film or cellulose acylate film.

A polarizing plate H01 in an example was thus prepared.

(2) Preparation of Polarizing Plates H02 to H11 and Hc1 to Hc2

The procedure for the polarizing plate H01 was repeated except that the polarizing plate protective film and the cellulose acylate film were changed to those shown in Table 2 below in the preparation of the polarizing plate H01, thereby preparing polarizing plates H02 to H11 in examples and polarizing plates Hc1 to Hc2 in comparative examples.

C. Evaluation of Polarizing Plate Protective Films and Polarizing Plates

Each polarizing plate including a polarizing plate protective film was evaluated for the durability of the polarizing plate and the crystallinity index of PVA in the polarizer, and checked for the performance of the polarizing plate protective film as described below.

(Evaluation of Durability of Polarizing Plates)

An automatic polarizing film measuring device VAP-7070 (wavelength range: 380 nm-700 nm) manufactured by JASCO Corporation was used to measure the crossed transmittance and the parallel transmittance of each of the polarizing plates prepared above and the polarization degree was calculated by the following expression.

Polarization degree (%)={(parallel transmittance−crossed transmittance)/(parallel transmittance+crossed transmittance)}$^{1/2}$×100

Two samples (5 cm×5 cm) each including a polarizing plate applied to glass with pressure-sensitive adhesives were prepared. In this step, the polarizing plate was applied to the glass so that any of the cellulose acylate films S01 to S03 was opposite to the glass (on the air interface side). The crossed transmittance was measured by setting the samples with their glass side toward an illuminant. Measurement was made for the two respective samples and average values thereof were taken as the crossed transmittance and the parallel transmittance, respectively.

Then, the polarization degree was also measured in the same manner after each sample was stored for 144 hours in an environment of 80° C. and a relative humidity of 90%. The amount of change in polarization degree between before and after the time period was determined and evaluated based on the following criteria.

In Table 2 shown below, the amount of change in polarization degree was indicative of the durability of the polarizing plate.

The smaller the amount of change in polarization degree is, the better the durability of the polarizing plate is. Rank C or higher is a practical level, and rank B or higher is more preferred.

A+: The amount of change in polarization degree is less than 0.5%;

A: The amount of change in polarization degree is 0.5% or more but less than 2.0%;

B: The amount of change in polarization degree is 2.0% or more but less than 3.0%;

C: The amount of change in polarization degree is 3.0% or more but less than 5.0%;
D: The amount of change in polarization degree is 5.0% or more.

The results obtained are all shown in Table 2 below.

TABLE 2

| | | Glass-side polarizing plate protective film | | | Air-side polarizing plate protective film | | | | | |
|---|---|---|---|---|---|---|---|---|---|---|
| | | | Agent for improving durability of polarizing plate | | | | Additive B or E | | Barbituric acid-based additive | Durability of |
| Polarizing plate No. | Polarizing plate protective film No. | Type | Amount of addition *) | Cellulose acylate film No. | Type | Amount of addition *) | Type | Amount of addition *) | polarizing plate | Remarks |
| H01 | 101 | P-1 | 6.5 | S01 | E-1 | 8 | A-3 | 4 | A | Invention |
| H02 | 102 | P-2 | 6.5 | S01 | E-1 | 8 | A-3 | 4 | A | Invention |
| H03 | 103 | P-3 | 6.5 | S01 | E-1 | 8 | A-3 | 4 | A | Invention |
| H04 | 104 | P-4 | 6.5 | S01 | E-1 | 8 | A-3 | 4 | A | Invention |
| H05 | 105 | P-1 | 3.6 | S01 | E-1 | 8 | A-3 | 4 | A | Invention |
| H06 | 106 | P-1 | 14 | S01 | E-1 | 8 | A-3 | 4 | A+ | Invention |
| H07 | 107 | P-5 | 12.5 | S01 | E-1 | 8 | A-3 | 4 | B | Invention |
| H08 | 108 | P-6 | 12.5 | S01 | E-1 | 8 | A-3 | 4 | C | Invention |
| H09 | 109 | P-7 | 12.5 | S01 | E-1 | 8 | A-3 | 4 | C | Invention |
| H10 | 110 | P-1 | 7.3 | S02 | B-97 | 8 | A-3 | 4 | A+ | Invention |
| H11 | 111 | P-2 | 7.3 | S03 | B-97 | 8 | — | 0 | A | Invention |
| Hc1 | c01 | — | 0 | S01 | E-1 | 8 | A-3 | 4 | D | Comparative Example |
| Hc2 | c02 | Comparative compound (1) | 7.3 | S01 | E-1 | 8 | A-3 | 4 | D | Comparative Example |

* Amount of addition with respect to 100 parts by weight of cellulose acylate resin (parts by weight)

(Crystallinity Index of Polyvinyl Alcohol in Polarizer)

The crystallinity index of polyvinyl alcohol in the polarizing plate after a lapse of time was measured by the following method. In the polarizing plates according to the invention, the crystallinity index takes smaller values than in the polarizing plates Hc1 and Hc2 in comparative examples, and it was suggested that the crystallization could be suppressed.

Measurement Method:

The polarizing plate which was allowed to stand at a temperature of 80° C. and a relative humidity of 90% for 144 hours was immersed in methylene chloride at room temperature (25° C.) for 30 minutes to dissolve the polarizing plate protective film and any of the cellulose acylate films S01 to S03 and the polarizer was taken out as a film. The ATR-IR spectrum of a surface of the polarizer which had been in contact with any of the cellulose acylate films S01 to S03 was measured by an attenuated total reflection method (ATR method) according to the following method, and the crystallinity index of polyvinyl alcohol was determined by the following expression. Polyvinyl alcohol preferably has a lower crystallinity index. The crystallinity index is more preferably 0.05 or less, and particularly preferably takes a negative value.

Measurement device: Nicolet 6700 manufactured by Thermo Fisher Scientific Inc.
Prism: germanium
Wavelength range: 400 cm$^{-1}$-4,000 cm$^{-1}$ Crystallinity index of polyvinyl alcohol=
$\{A(1,141\ cm^{-1}) - A(1,134\ cm^{-1})\}/A(1,134\ cm^{-1})$   Expression (α)

In expression (α), A (1,141 cm$^{-1}$) represents the absorbance at a wave number of 1,141 cm$^{-1}$ and A (1,134 cm$^{-1}$) represents the absorbance at a wave number of 1,134 cm$^{-1}$.

According to Table 2 shown above, the polarizing plates each including the polarizing plate protective film according to the invention which contains the compound represented by general formula (II-1) or general formula (II-2) are all excellent in polarizing plate durability as compared to the polarizing plate Hc1 including the comparative polarizing plate protective film which does not contain the compound represented by general formula (II-1) or general formula (II-2) (indicated as the agent for improving the durability of the polarizing plate in Table 2). It is presumed that, in the polarizing plate including the polarizing plate protective film containing the compound represented by general formula (II-1) or general formula (II-2) according to the invention, the compound represented by general formula (II-1) or general formula (II-2) in the polarizing plate protective film is diffused into the polarizer under heat and humidity conditions, thereby suppressing crystallization of polyvinyl alcohol in the polarizer.

The polarizing plate durability was not improved in the compound having only one acetal group, as indicated by the polarizing plate Hc2 using the comparative compound (1).

In addition, a comparison between the polarizing plates H01, H05, and H06 showed that higher polarizing plate durability is obtained by adding the agent for improving the polarizing plate durability in an amount of 0.1-30 parts by weight (preferably 1-25 parts by weight, and more preferably 1.5-20 parts by weight) with respect to 100 parts by weight of the resin. The comparison between the polarizing plates H01, H05, and H06 also showed that the agent for improving the polarizing plate durability is sufficiently effective in improving the durability even in smaller amounts of addition (polarizing plates H01 and H05) but higher durability is obtained by further increasing the amount of addition (polarizing plate H06).

On the other hand, a comparison between the polarizing plates H01 to H06 and the polarizing plates H07 to H09 showed that higher polarizing plate durability is obtained in the polarizing plates H01 to H06. This is presumably due to the structures of the agents for improving the polarizing plate durability P-1 to P-4 which are contained in the polarizing plate protective films in the polarizing plates H01 to H06. In other words, this is presumably because the structures of P-1 to P-4 have $R^1$ or $Z^2$ which is an electron-withdrawing group with respect to acetal group and/or the number of atoms in the shortest linking path between acetal groups is comparatively small.

According to the above results, use of the polarizing plate of the invention allows a liquid crystal display device having excellent polarizing plate durability to be prepared.

What is claimed is:

1. A polarizing plate protective film comprising:
a compound represented by general formula (II-1) or (II-2) shown below:

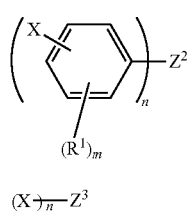

General formula (II-1)

$(X)_{\overline{n}}-Z^3$       General formula (II-2)

[(in general formulas (II-1) and (II-2), X represents a group represented by general formula (I-A-3) shown below; n represents an integer of 2 or more; and a plurality of Xs are identical or different;
in general formula (II-1), $Z^2$ represents a linking group having a valence of n; $R^1$ represents a substituent; m represents an integer of 0-4; and the plurality of $R^1$s are identical or different;
in general formula (II-2), $Z^3$ represents an alkylene group having a valence of n, provided that $Z^3$ does not have a ring structure;

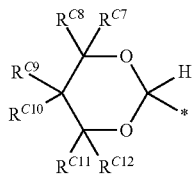

General formula (I-A-3)

(in general formula (I-A-3), $R^{C7}$ to $R^{C12}$ each independently represent a hydrogen atom, an alkyl group, a cycloalkyl group, an aryl group, an acyl group, an alkoxy group, or an alkoxycarbonyl group; * indicates a bonding arm which is bonded to a benzene ring in general formula (II-1) or $Z^3$ in general formula (II-2))].

2. The polarizing plate protective film according to claim 1, wherein the compound represented by general formula (II-1) or (II-2) has 2 to 4 Xs and a total number of carbon atoms in a constituent moiety other than the Xs is 40 or less.

3. The polarizing plate protective film according to claim 1, wherein a number of atoms in a shortest linking path linking two Xs together is 20 or less in every path between two Xs.

4. The polarizing plate protective film according to claim 2, wherein a number of atoms in a shortest linking path linking two Xs together is 20 or less in every path between two Xs.

5. The polarizing plate protective film according to claim 1, wherein $Z^2$ shown above is any one of or any combination of —O—, —S—, —SO—, —SO$_2$—, —C(=O)—, —OC(=O)—, —C($R^{11}$)($R^{12}$)—, >C<, (—OCH$_2$CH$_2$)$_2$C(CH$_2$CH$_2$O—)$_2$, >C($R^{13}$)—, >N—, and —N(Ra)—, where $R^{11}$ to $R^{13}$ each independently represent a hydrogen atom, an alkyl group or an aryl group, and Ra represents a hydrogen atom, an alkyl group, an aryl group, or an acyl group.

6. The polarizing plate protective film according to claim 2, wherein $Z^2$ shown above is any one of or any combination of —O—, —S—, —SO—, —SO$_2$—, —C(=O)—, —OC(=O)—, —C($R^{11}$)($R^{12}$)—, >C<, (—OCH$_2$CH$_2$)$_2$C(CH$_2$CH$_2$O—)$_2$, >C($R^{13}$)—, >N—, and —N(Ra)—, where $R^{11}$ to $R^{13}$ each independently represent a hydrogen atom, an alkyl group or an aryl group, and Ra represents a hydrogen atom, an alkyl group, an aryl group, or an acyl group.

7. The polarizing plate protective film according to claim 3, wherein $Z^2$ shown above is any one of or any combination of —O—, —S—, —SO—, —SO$_2$—, —C(=O)—, —OC(=O)—, —C($R^{11}$)($R^{12}$)—, >C<, (—OCH$_2$CH$_2$)$_2$C(CH$_2$CH$_2$O—)$_2$, >C($R^{13}$)—, >N—, and —N(Ra)—, where $R^{11}$ to $R^{13}$ each independently represent a hydrogen atom, an alkyl group or an aryl group, and Ra represents a hydrogen atom, an alkyl group, an aryl group, or an acyl group.

8. The polarizing plate protective film according to claim 4, wherein $Z^2$ shown above is any one of or any combination of —O—, —S—, —SO—, —SO$_2$—, —C(=O)—, —OC(=O)—, —C($R^{11}$)($R^{12}$)—, >C<, (—OCH$_2$CH$_2$)$_2$C(CH$_2$CH$_2$O—)$_2$, >C($R^{13}$)—, >N—, and —N(Ra)—, where $R^{11}$ to $R^{13}$ each independently represent a hydrogen atom, an alkyl group or an aryl group, and Ra represents a hydrogen atom, an alkyl group, an aryl group, or an acyl group.

9. The polarizing plate protective film according to claim 1, further comprising cellulose acylate.

10. The polarizing plate protective film according to claim 2, further comprising cellulose acylate.

11. The polarizing plate protective film according to claim 3, further comprising cellulose acylate.

12. The polarizing plate protective film according to claim 4, further comprising cellulose acylate.

13. A polarizing plate comprising:
a polarizer; and
one or more polarizing plate protective films applied on one or both surfaces of the polarizer,
wherein at least one of the one or more polarizing plate protective films is the polarizing plate protective film according to claim 1.

14. A polarizing plate comprising:
a polarizer; and
one or more polarizing plate protective films applied on one or both surfaces of the polarizer,
wherein at least one of the one or more polarizing plate protective films is the polarizing plate protective film according to claim 2.

15. The polarizing plate according to claim 13, wherein the at least one of the one or more polarizing plate protective films contains a compound represented by general formula (A) shown below:

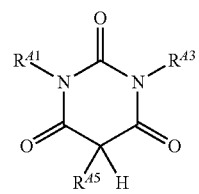

General formula (A)

(in general formula (A), $R^{A1}$ and $R^{A3}$ each independently represent a hydrogen atom, an alkyl group, a cycloalkyl group, an alkenyl group or an aromatic group, and the alkyl group, the cycloalkyl group, the alkenyl group and the aromatic group may each have a substituent; $R^{45}$ represents a hydrogen atom or a substituent).

16. The polarizing plate according to claim 14, wherein the at least one of the one or more polarizing plate protective films contains a compound represented by general formula (A) shown below:

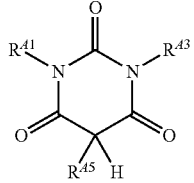

General formula (A)

(in general formula (A), $R^{41}$ and $R^{43}$ each independently represent a hydrogen atom, an alkyl group, a cycloalkyl group, an alkenyl group or an aromatic group, and the alkyl group, the cycloalkyl group, the alkenyl group and the aromatic group may each have a substituent; $R^{45}$ represents a hydrogen atom or a substituent).

17. A display device comprising:
at least one polarizing plate according to claim 13.
18. A display device comprising:
at least one polarizing plate according to claim 14.
19. A display device comprising:
at least one polarizing plate according to claim 15.
20. A display device comprising:
at least one polarizing plate according to claim 16.

* * * * *